(12) United States Patent
Koo et al.

(10) Patent No.: US 11,665,368 B2
(45) Date of Patent: May 30, 2023

(54) METHOD AND DEVICE FOR PROCESSING VIDEO SIGNAL BY USING TRANSFORM HAVING LOW COMPLEXIFY

(71) Applicant: LG ELECTRONICS INC., Seoul (KR)

(72) Inventors: Moonmo Koo, Seoul (KR); Jaehyun Lim, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/311,525

(22) PCT Filed: Dec. 6, 2019

(86) PCT No.: PCT/KR2019/017232
§ 371 (c)(1),
(2) Date: Jun. 7, 2021

(87) PCT Pub. No.: WO2020/117011
PCT Pub. Date: Jun. 11, 2020

(65) Prior Publication Data
US 2022/0030277 A1 Jan. 27, 2022

Related U.S. Application Data

(60) Provisional application No. 62/788,963, filed on Jan. 7, 2019, provisional application No. 62/787,355, filed (Continued)

(51) Int. Cl.
*H04N 19/625* (2014.01)
*H04N 19/176* (2014.01)

(52) U.S. Cl.
CPC ......... *H04N 19/625* (2014.11); *H04N 19/176* (2014.11)

(58) Field of Classification Search
None
See application file for complete search history.

(56) References Cited

U.S. PATENT DOCUMENTS

2009/0196185 A1* 8/2009 Stipanovich ............ H04L 43/16
370/241
2012/0307893 A1* 12/2012 Reznik ................ G10L 19/0212
375/E7.243

(Continued)

FOREIGN PATENT DOCUMENTS

| KR | 100839310 | 6/2008 |
| KR | 1020130098360 | 9/2013 |
| KR | 1020180025284 | 3/2018 |

OTHER PUBLICATIONS

LG Electronics, "Description of SDR video coding technology proposal by LG Electronics," JVET-J0017-v1, Joint Video Experts Team (JVET) of ITU-T SG 16 WP 3 and ISO/IEC JTC 1/SC 29/WG11, 10$^{th}$ Meeting, San Diego, CA, Apr. 10-20, 2018, 70 pages.

(Continued)

*Primary Examiner* — Chikaodili E Anyikire
(74) *Attorney, Agent, or Firm* — Fish & Richardson P.C.

(57) ABSTRACT

An embodiment of the present specification provides a method and device for processing video data. A method for processing a video signal according to an embodiment of the present specification may comprise the steps of: acquiring a transform index related to one of a plurality of transform combinations including combinations of one or more transform kernels for transforming of a current block of the video signal; deriving a transform combination including a vertical transform and a horizontal transform related to the transform index; and applying each of the vertical transform and horizontal transform of the transform combination to the current block.

12 Claims, 27 Drawing Sheets

Related U.S. Application Data on Jan. 1, 2019, provisional application No. 62/775,919, filed on Dec. 6, 2018.

(56) References Cited

U.S. PATENT DOCUMENTS

| | | | |
|---|---|---|---|
| 2015/0145874 A1 | 5/2015 | Han et al. | |
| 2019/0306522 A1* | 10/2019 | Said | H04N 19/176 |
| 2019/0342580 A1* | 11/2019 | Zhao | H04N 19/157 |
| 2020/0099924 A1* | 3/2020 | Seregin | H04N 19/61 |
| 2020/0112734 A1* | 4/2020 | Zhao | H04N 19/96 |
| 2020/0177901 A1* | 6/2020 | Choi | H04N 19/186 |

OTHER PUBLICATIONS

PCT International Search Report in International Appln. No. PCT/KR2019/017232, dated Mar. 17, 2020, 5 pages.

* cited by examiner

[FIG. 1]
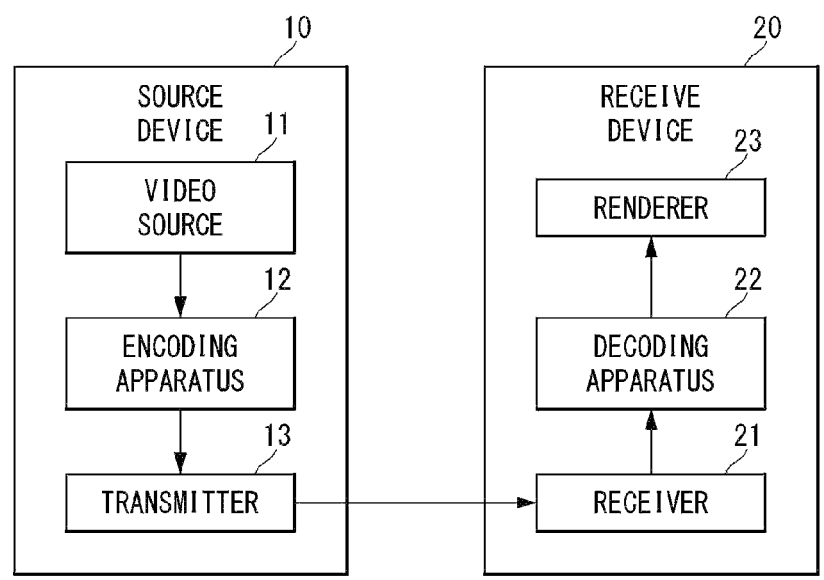

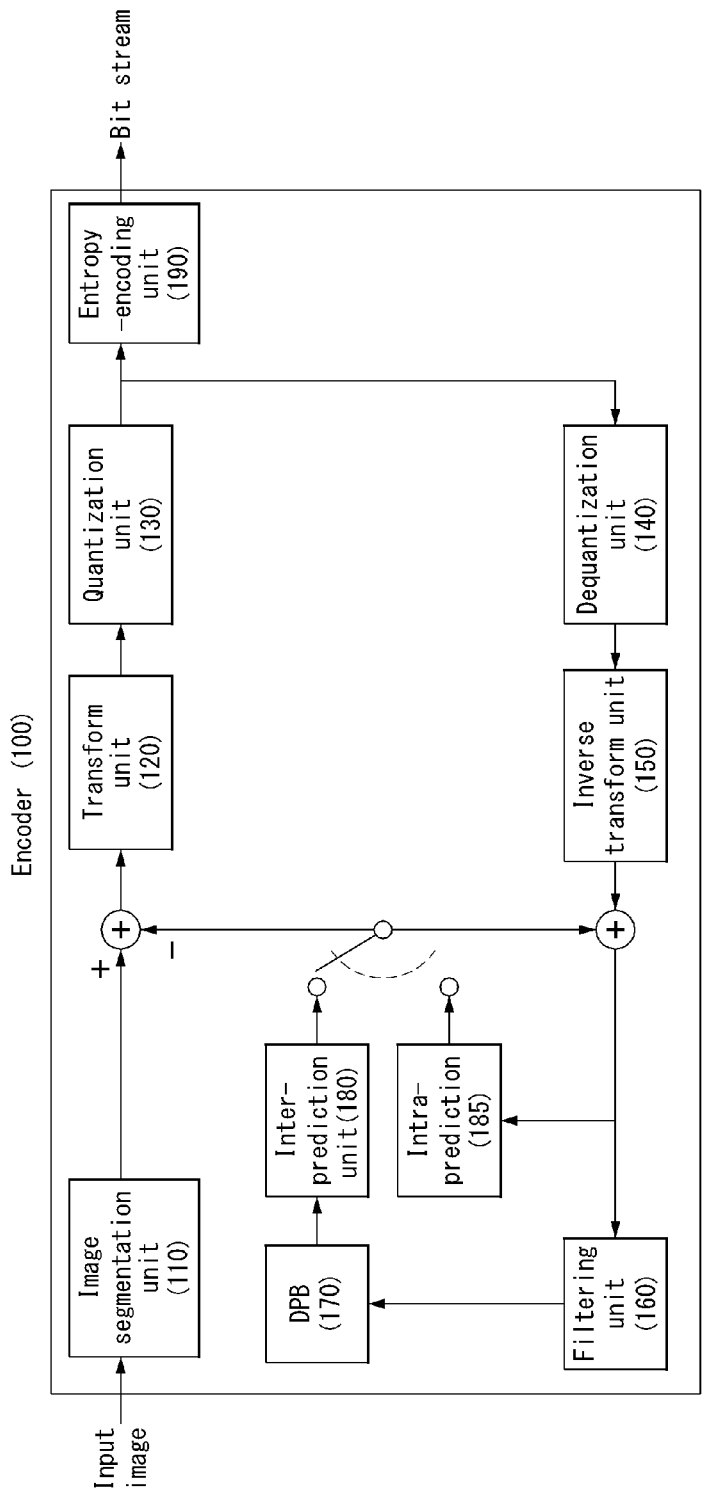
[FIG. 2]

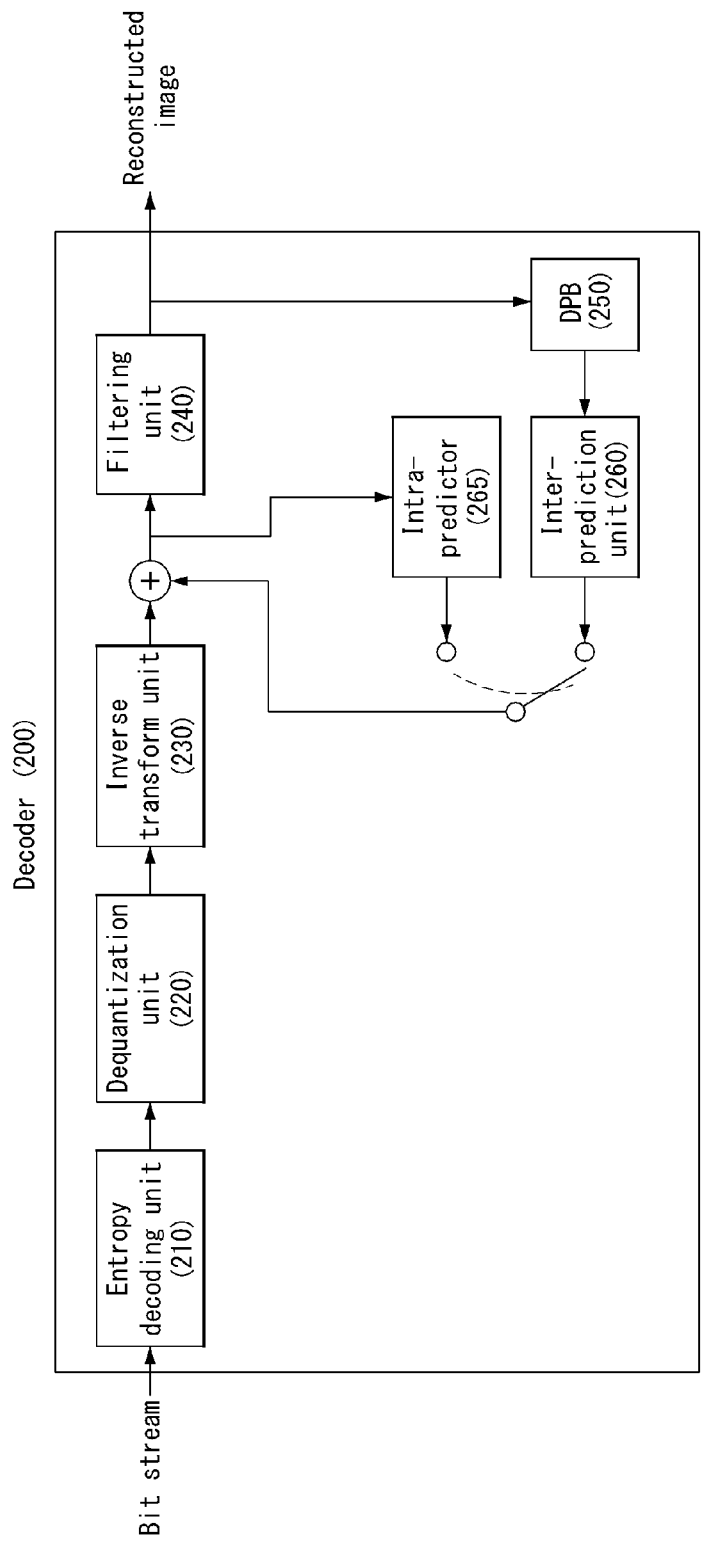
[FIG. 3]

[FIG. 4]
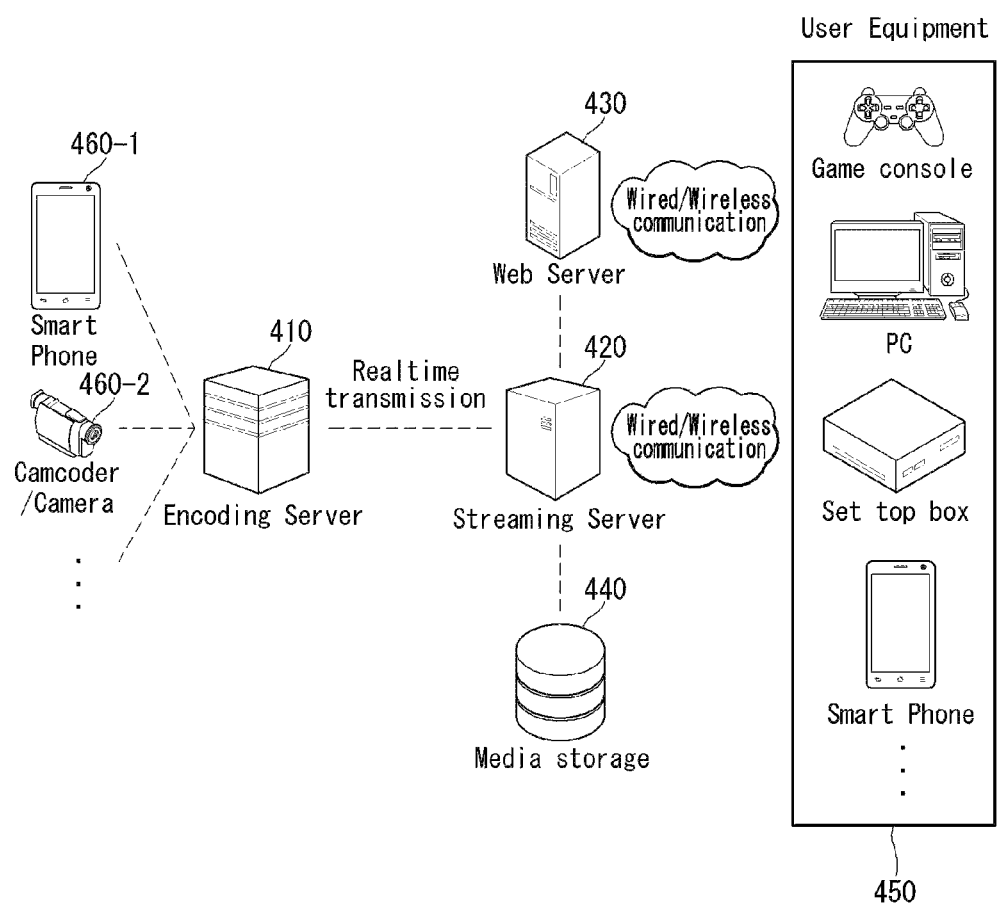

[FIG. 5]
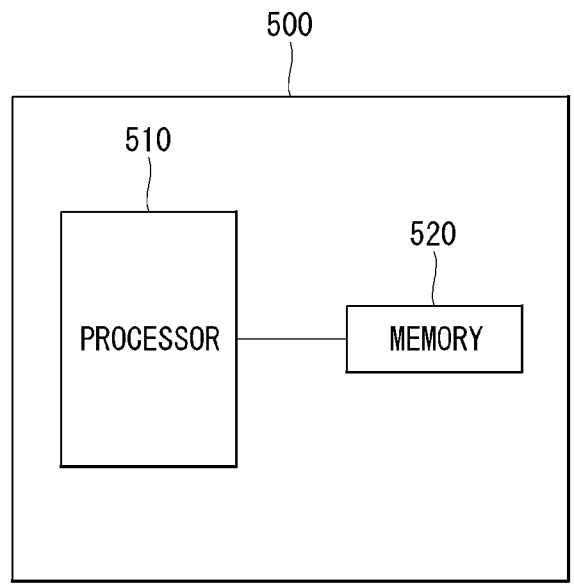
[Fig. 6A]
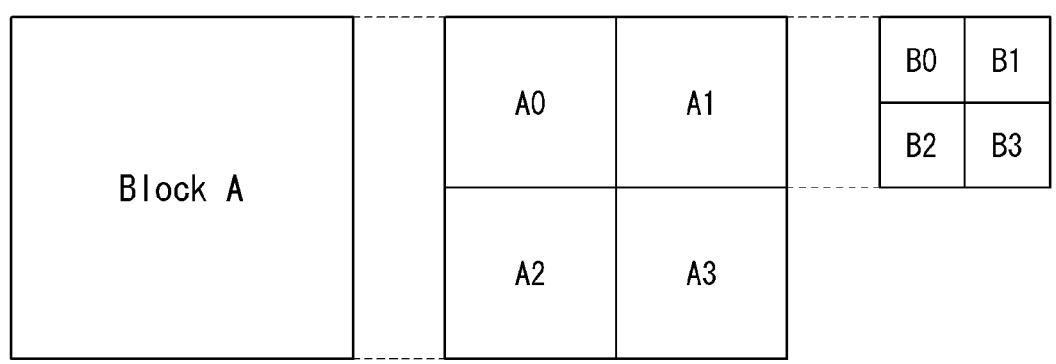

[Fig. 6B]
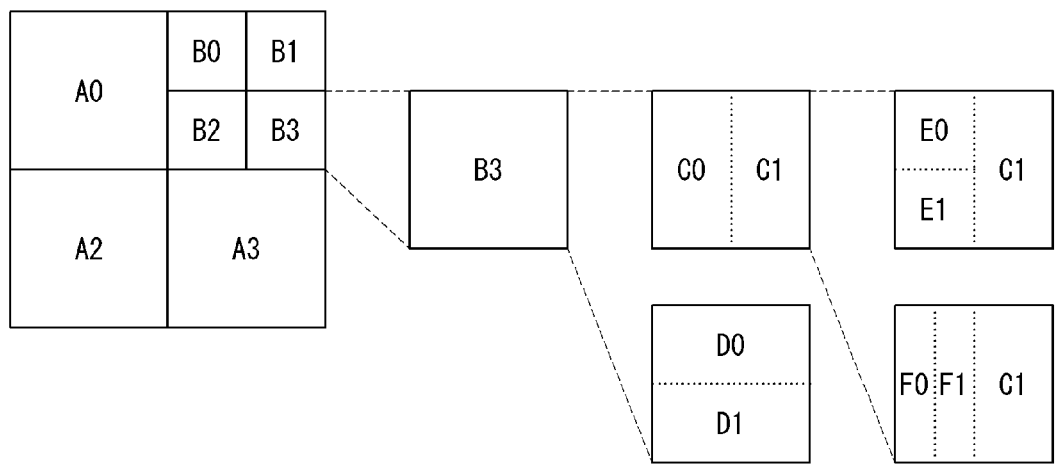
[Fig. 6C]
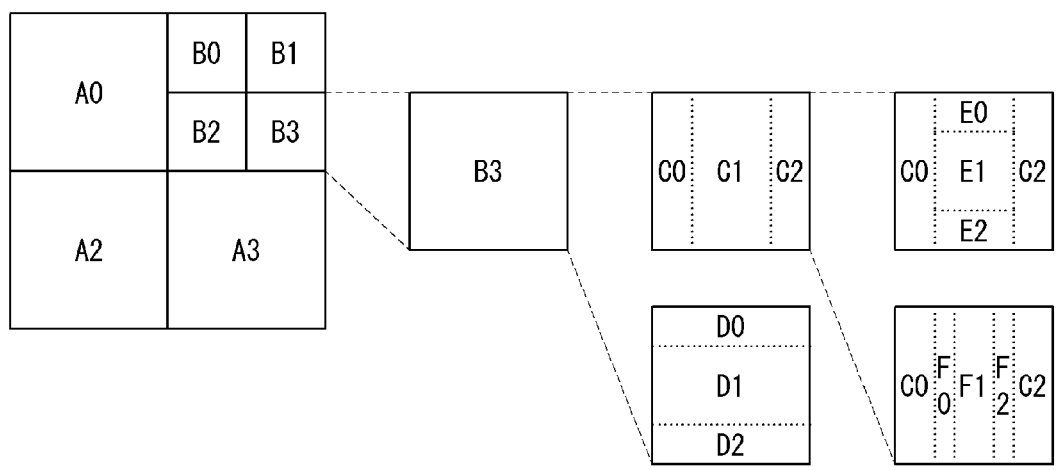

[Fig. 6D]
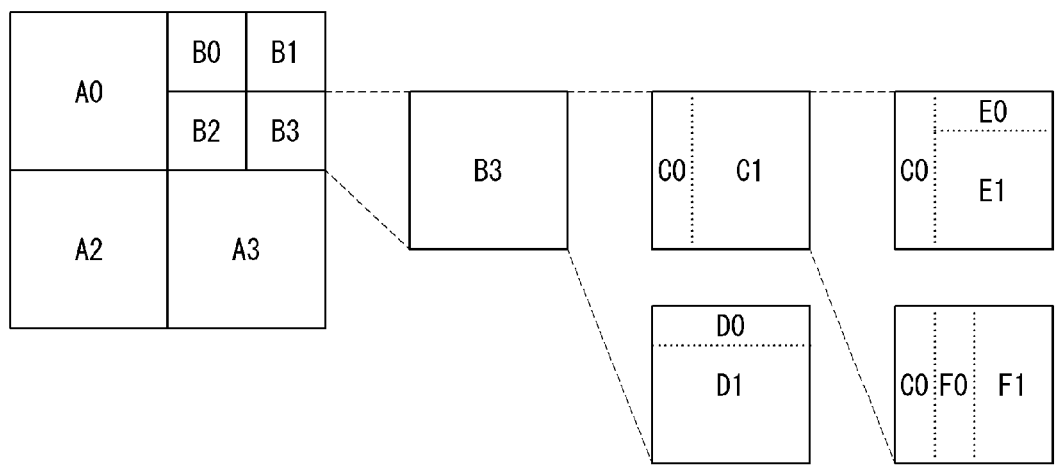

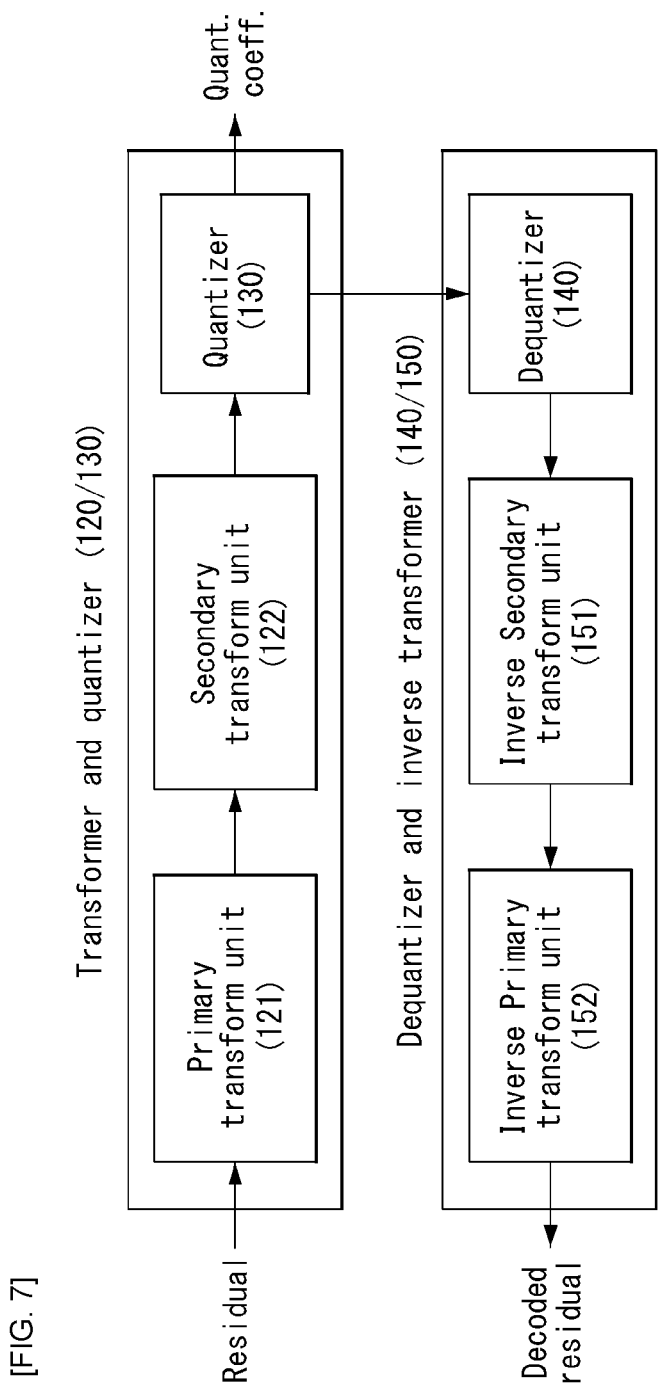
[FIG. 7]

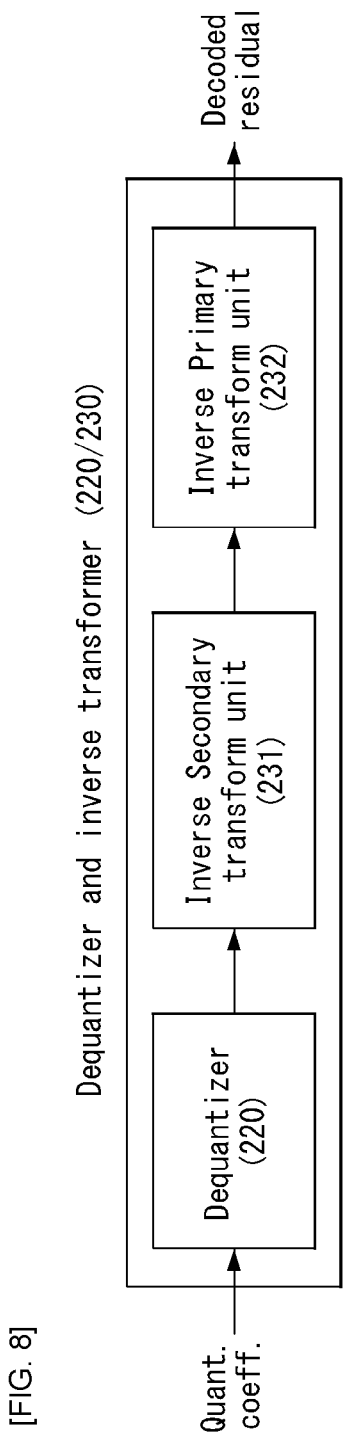
[FIG. 8]

[FIG. 9]

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT5 | | |
| | 3 | DCT5 | DCT5 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

[Fig. 10]
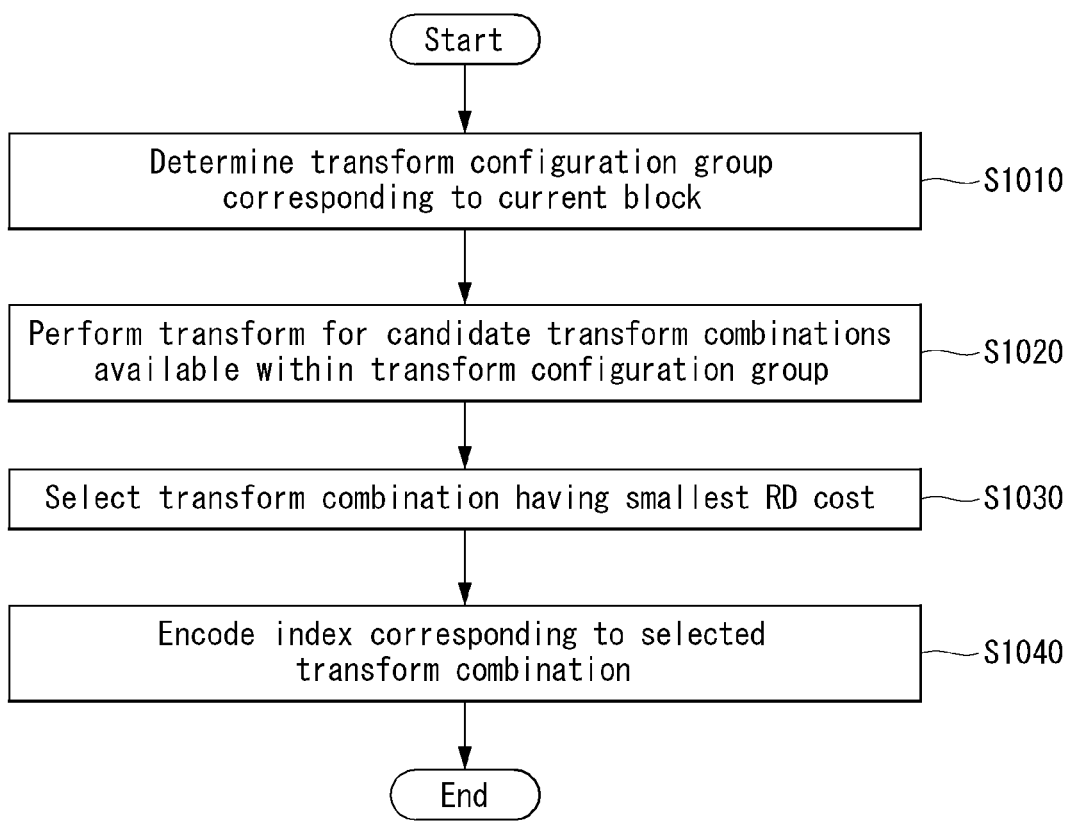

[Fig. 11]
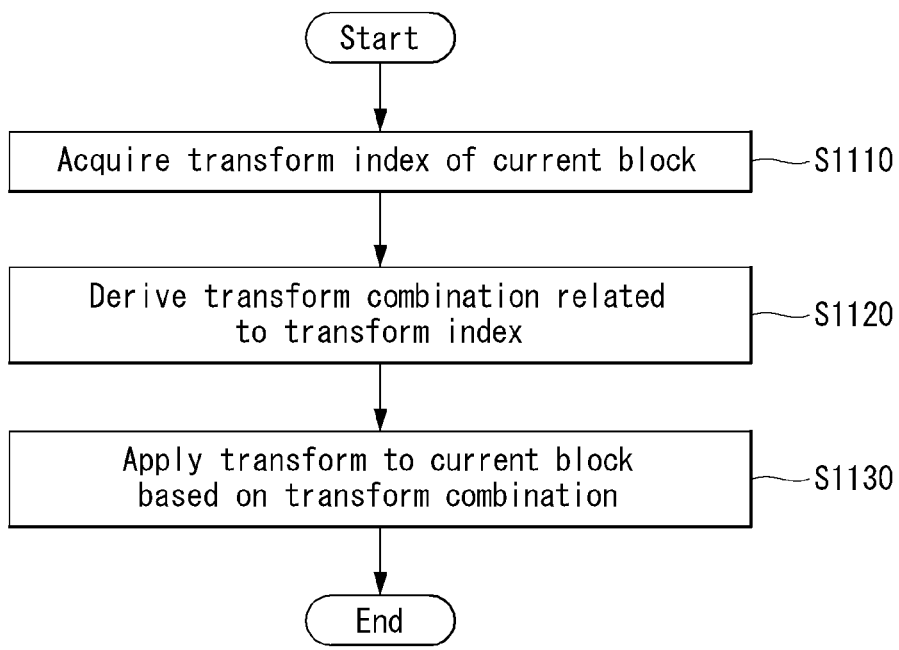
[Fig. 12]
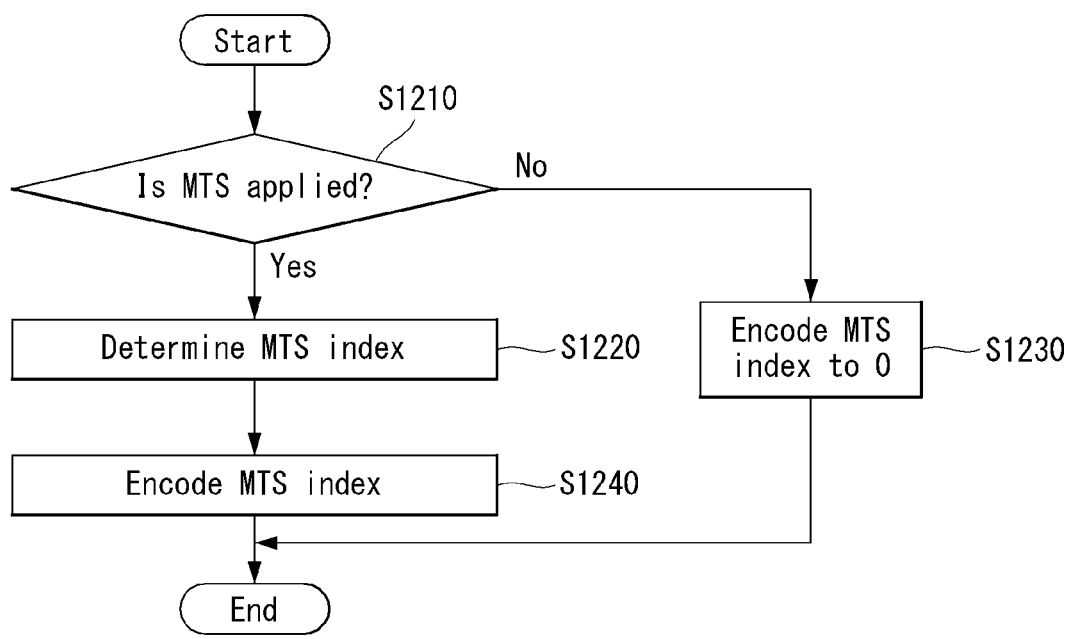

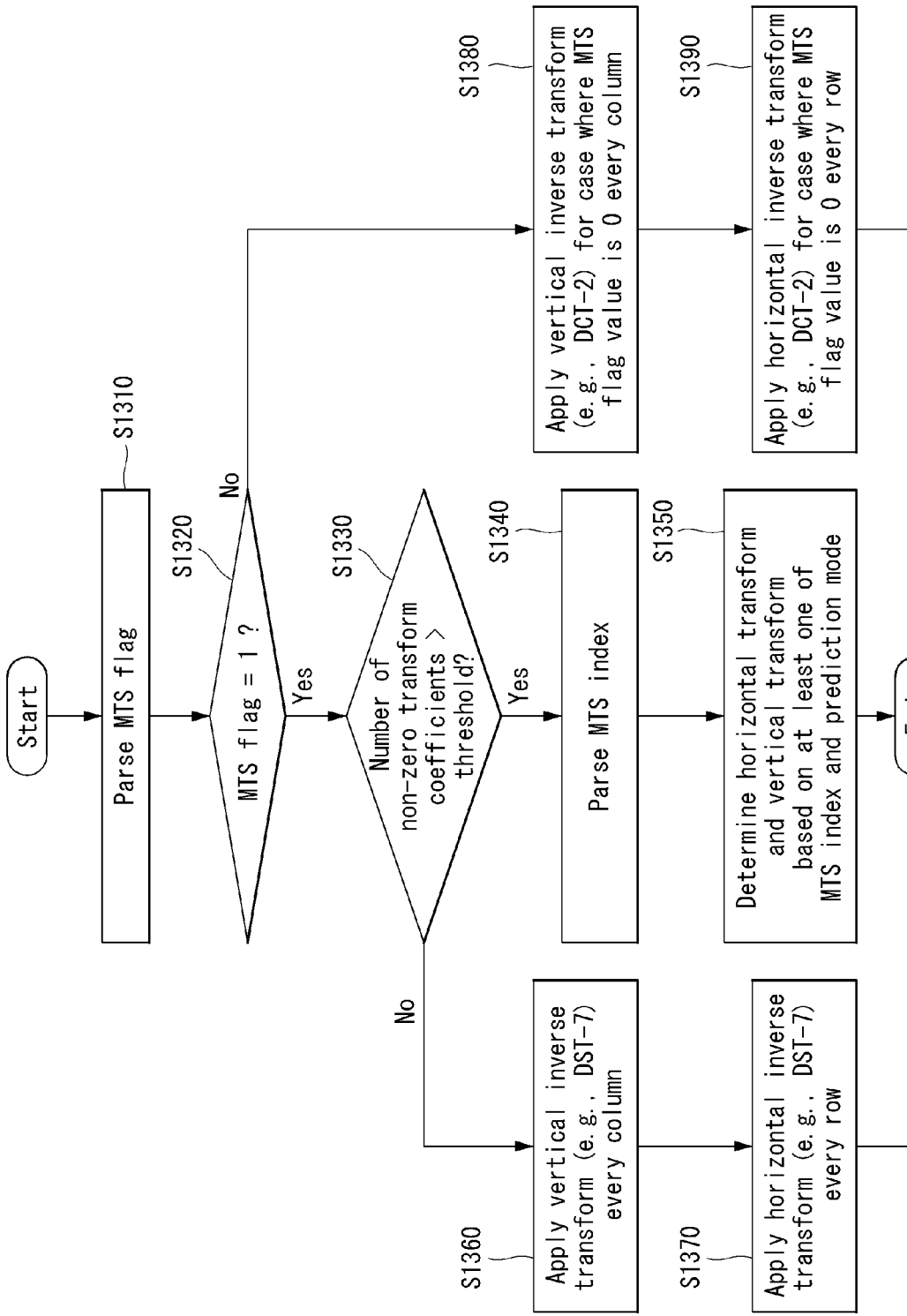
[FIG. 13]

[Fig. 14]
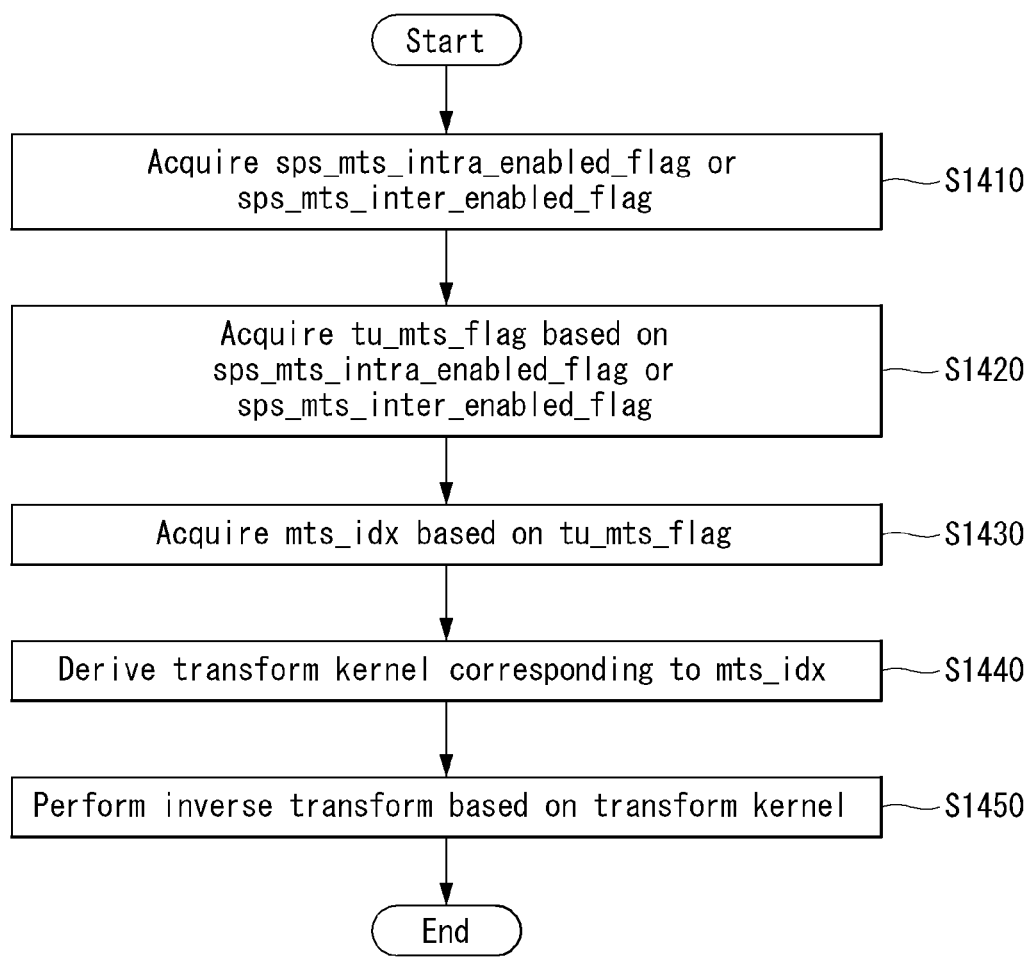

[Fig. 15]
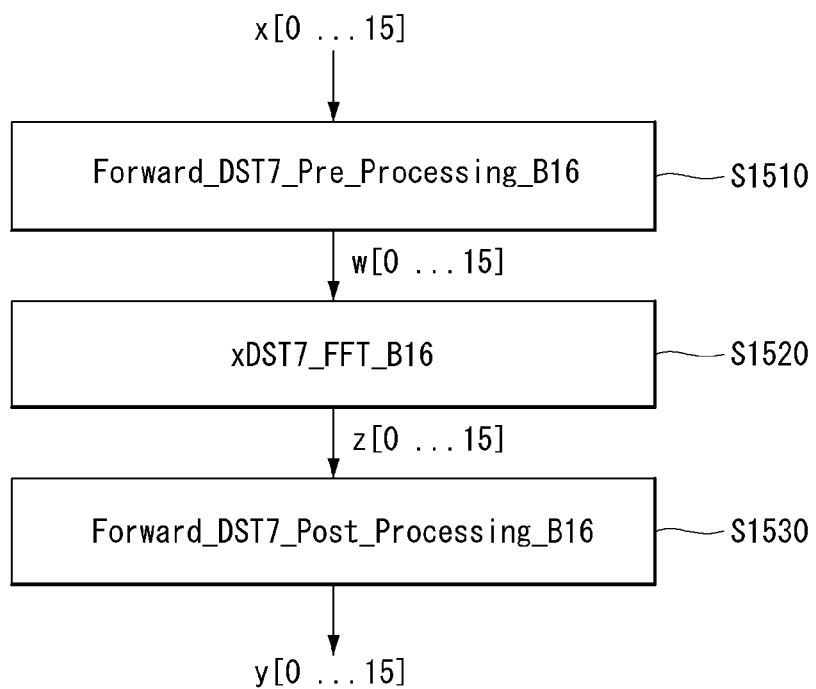

[Fig. 16]
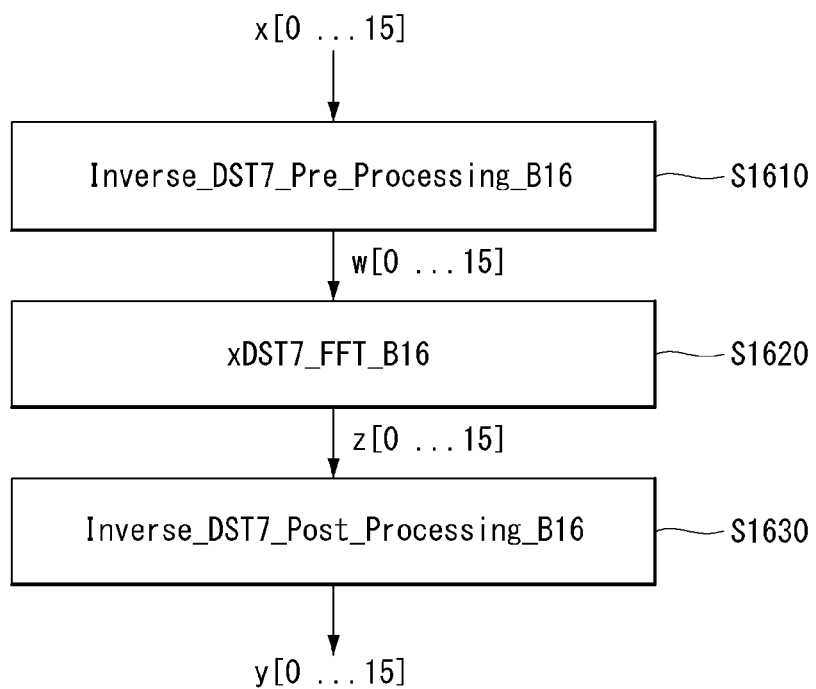

[Fig. 17]
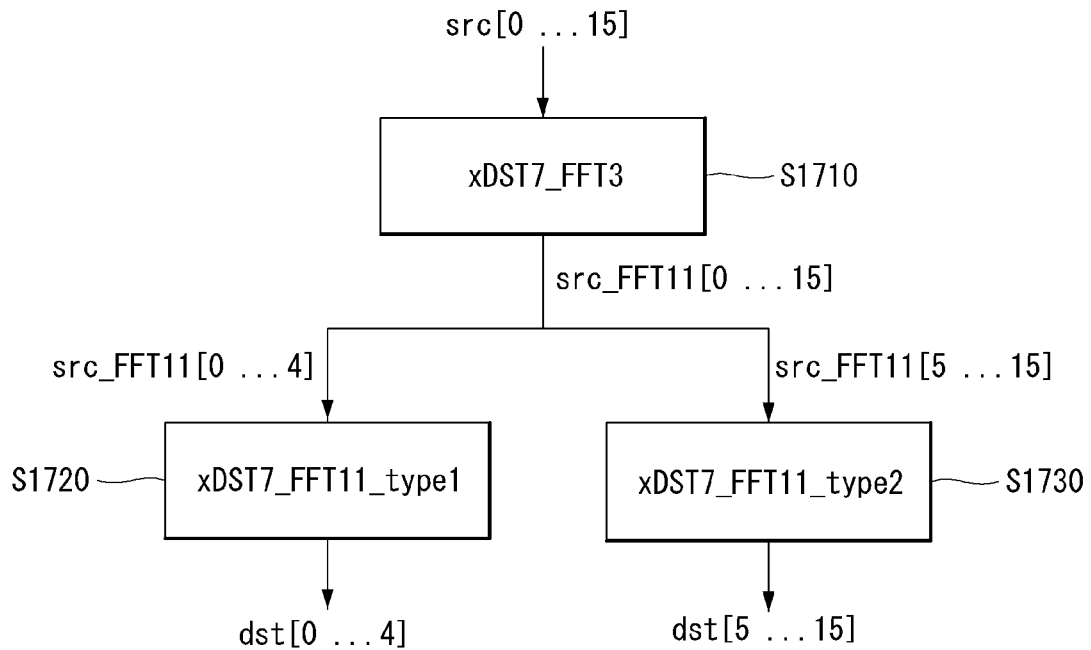
[Fig. 18]
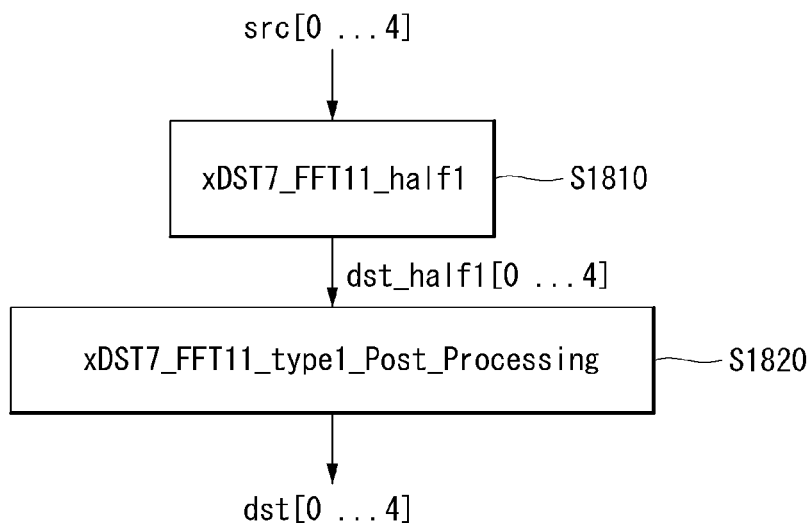

[Fig. 19]
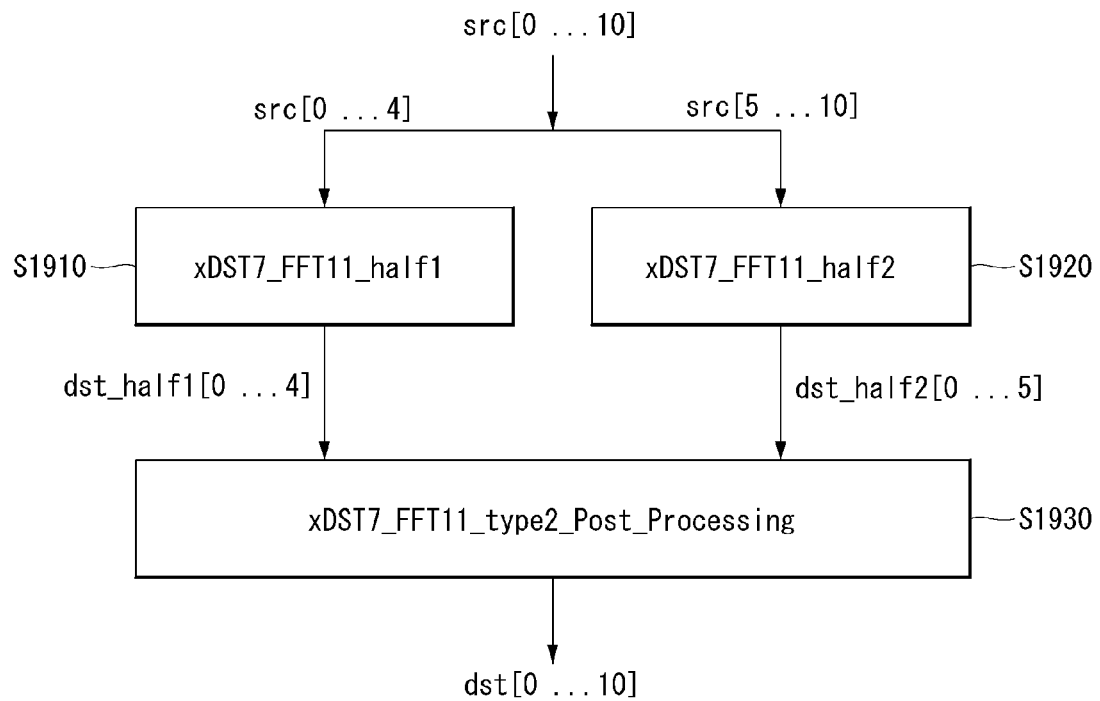

[Fig. 20]
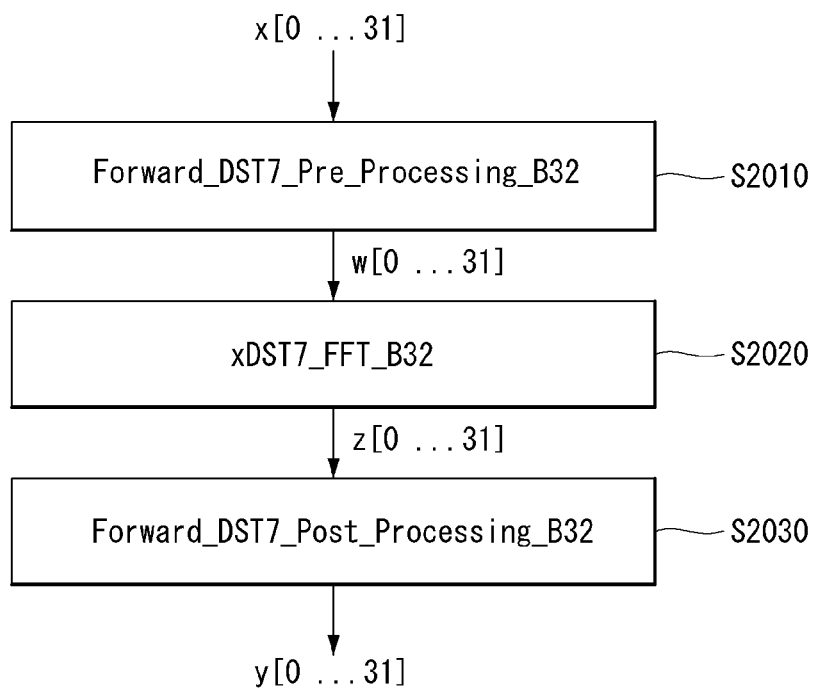

[Fig. 21]
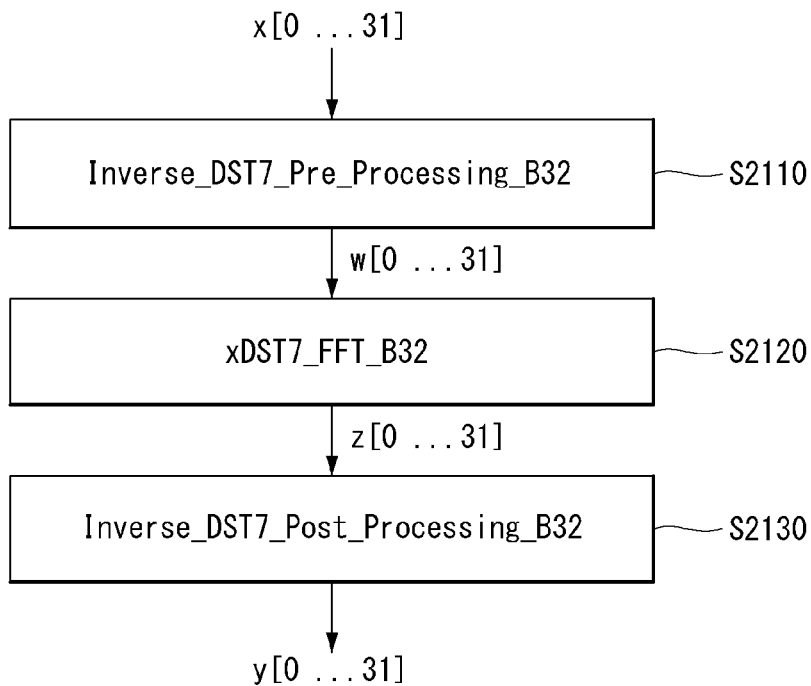
[Fig. 22]
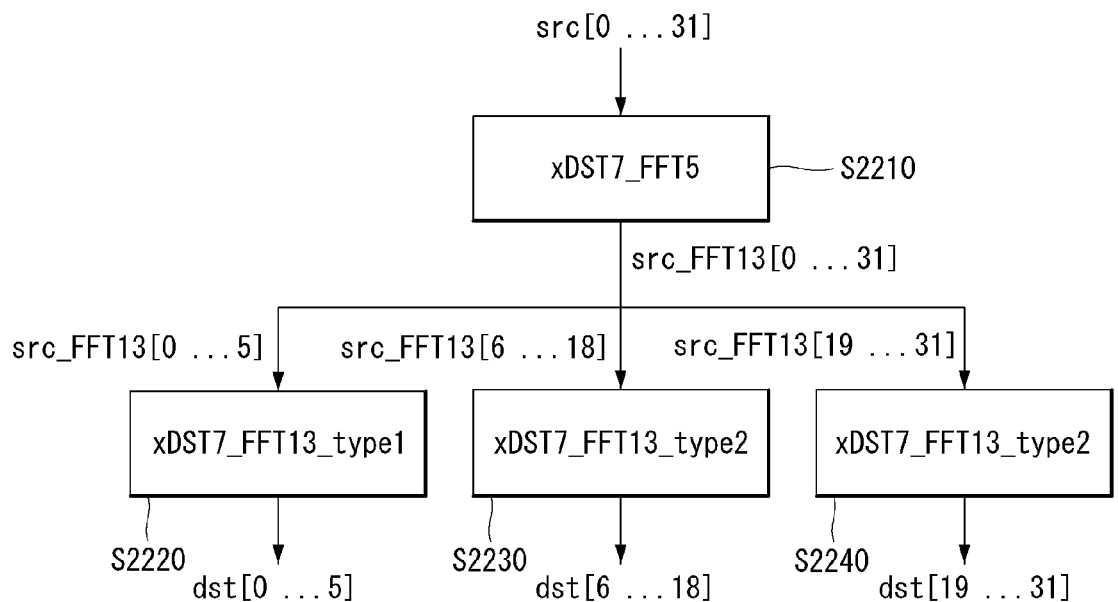

[Fig. 23]
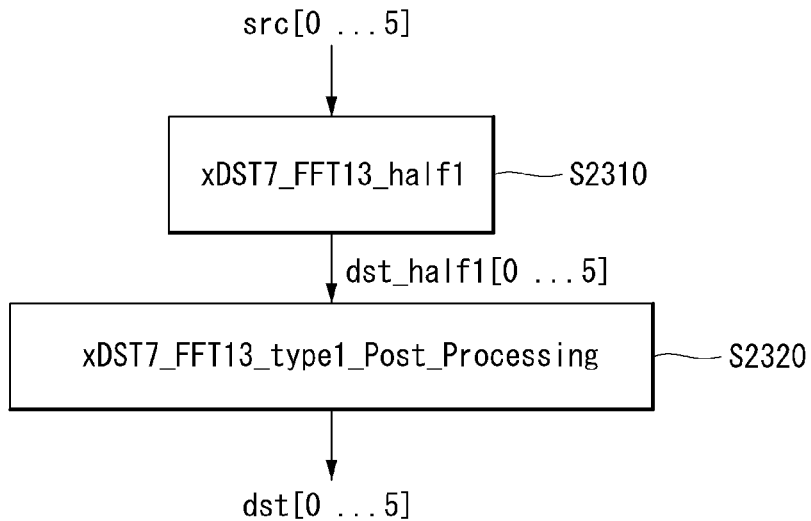
[Fig. 24]
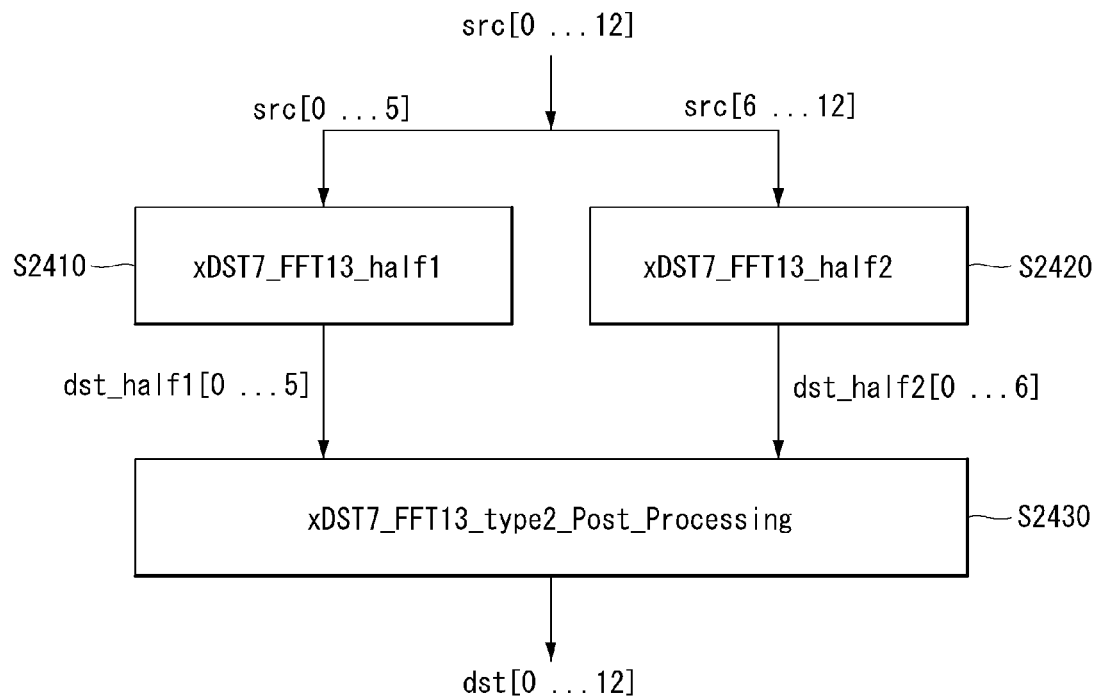

[Fig. 25]
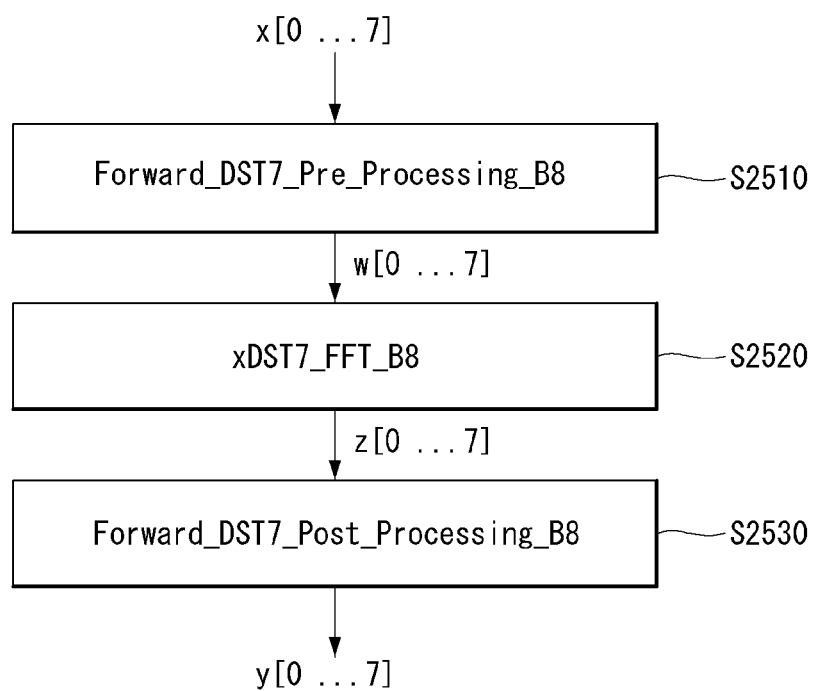

[Fig. 26]
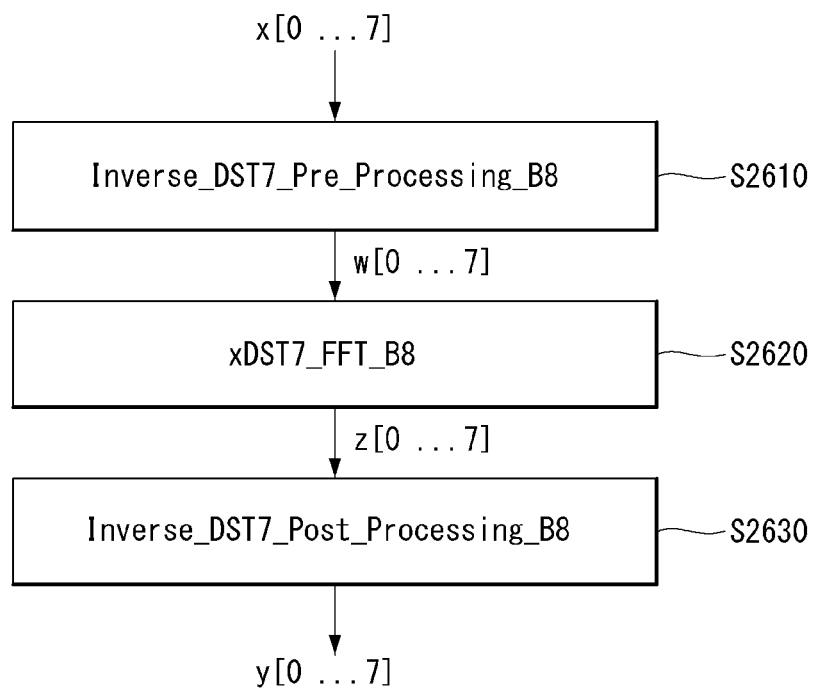

[Fig. 27]
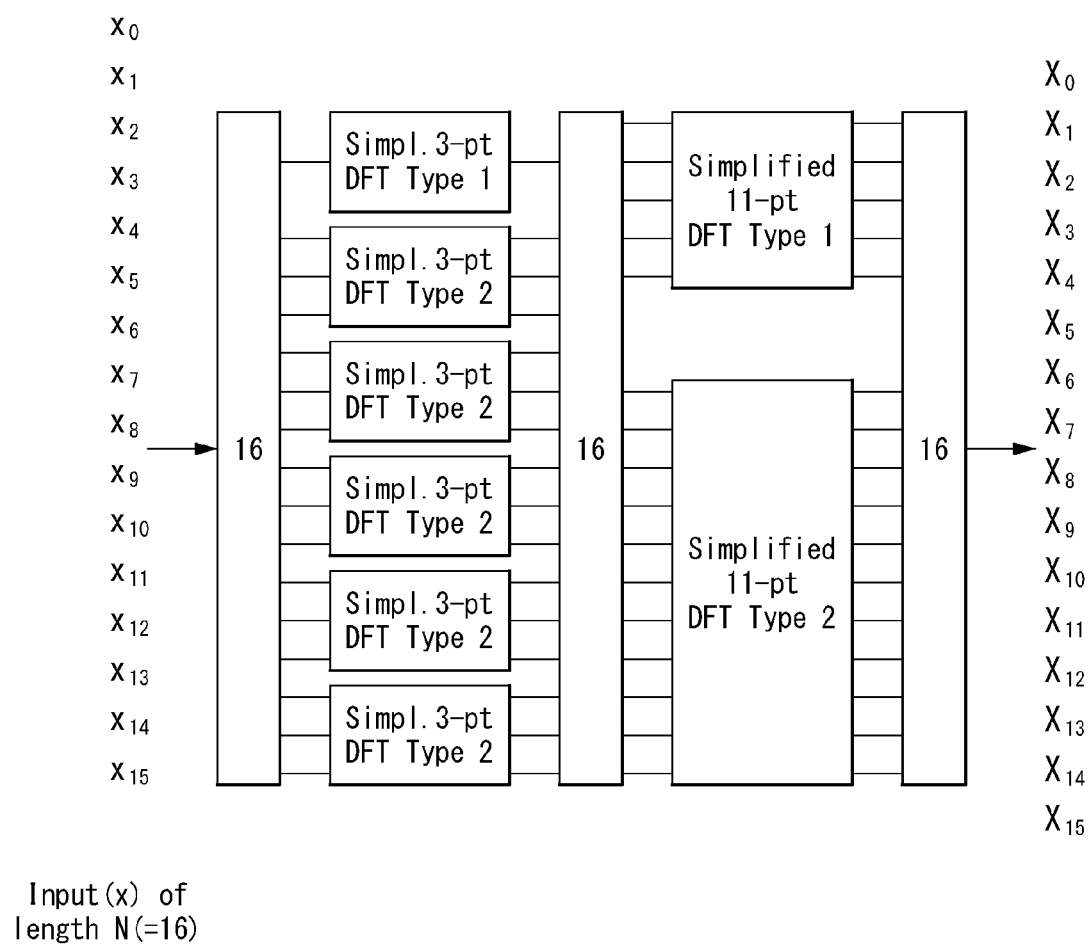

[Fig. 28]
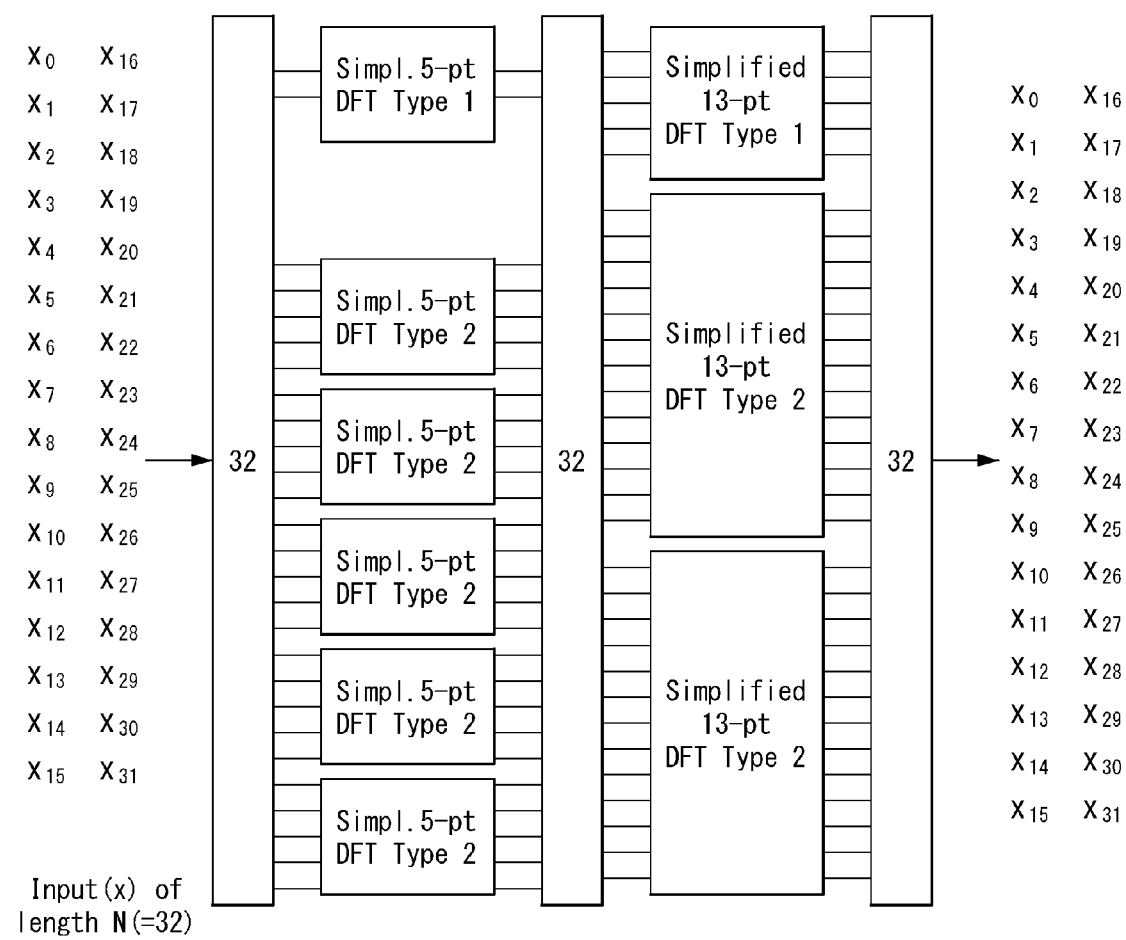

[Fig. 29]
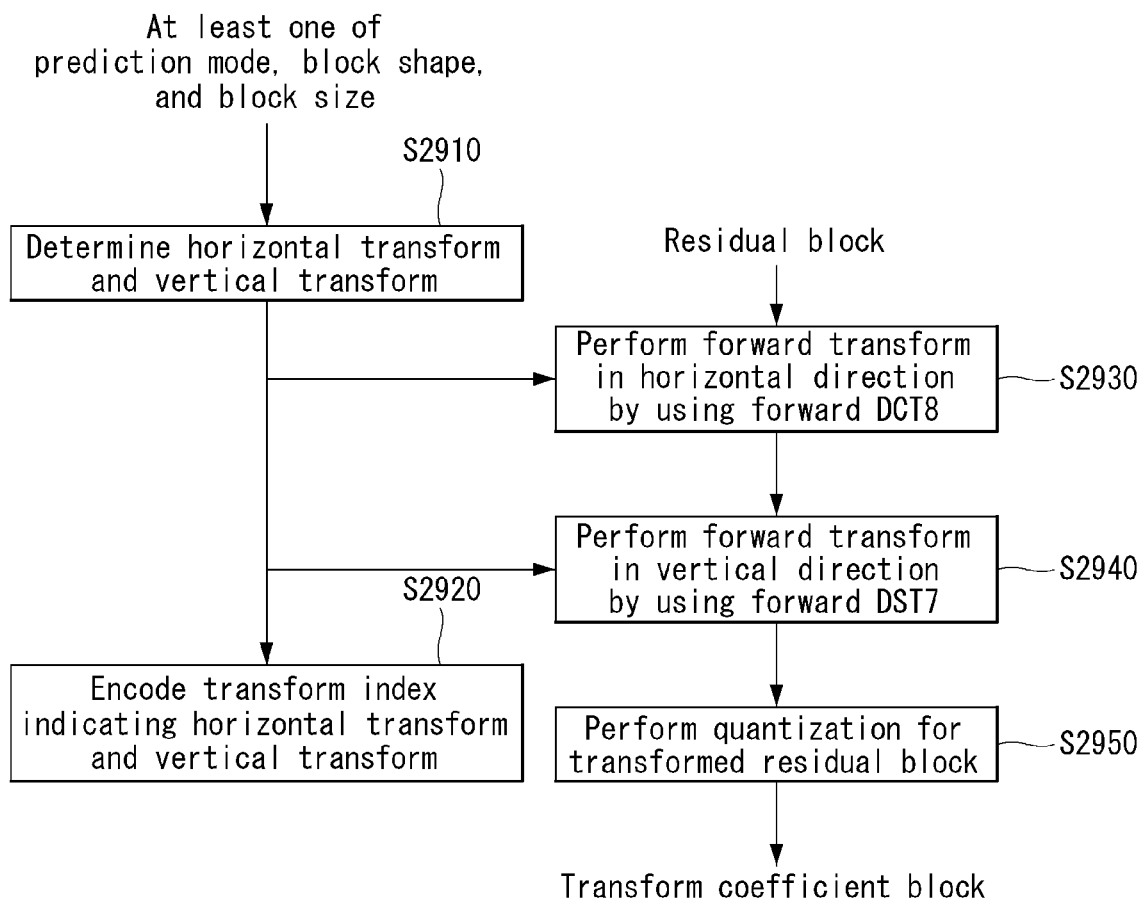

[Fig. 30]
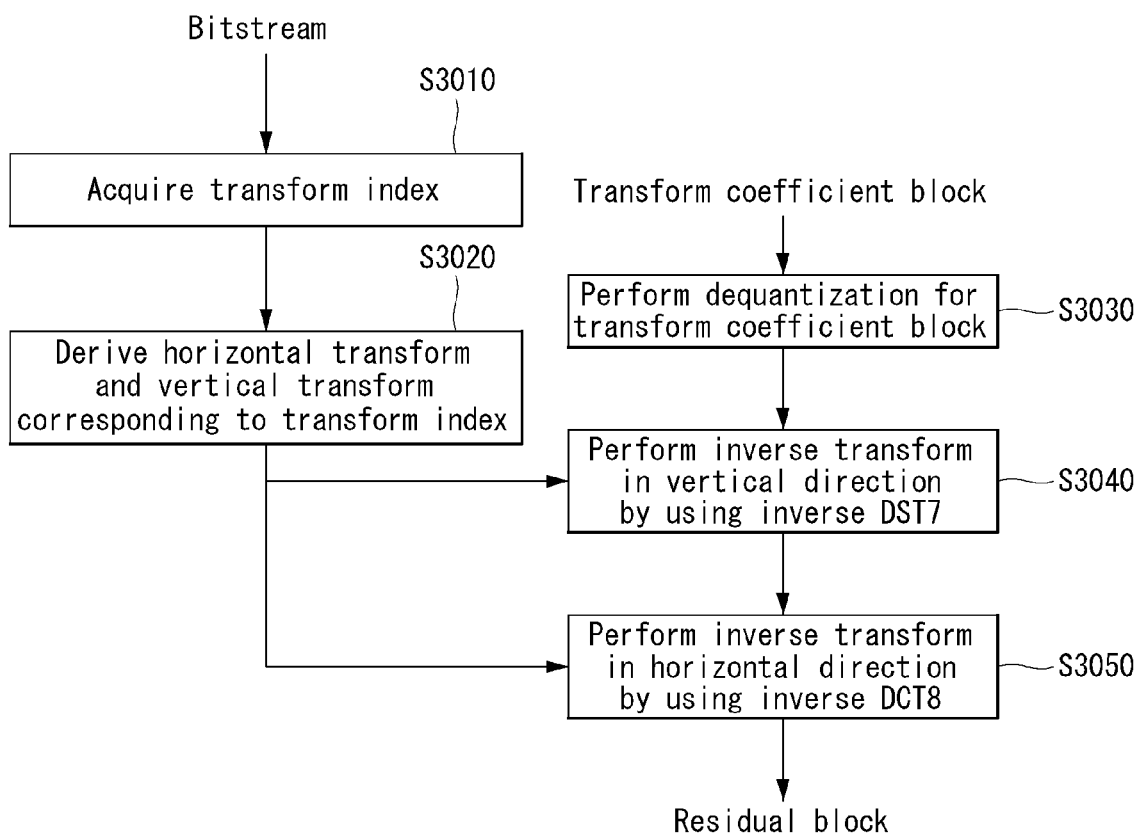

METHOD AND DEVICE FOR PROCESSING VIDEO SIGNAL BY USING TRANSFORM HAVING LOW COMPLEXIFY

CROSS-REFERENCE TO RELATED APPLICATIONS

This application is the National Stage filing under 35 U.S.C. 371 of International Application No. PCT/KR2019/017232, filed on Dec. 6, 2019, which claims the benefit of U.S. Patent Applications No. 62/775,919 filed on Dec. 6, 2018, No. 62/787,355 filed on Jan. 1, 2019 and No. 62/788,963 filed on Jan. 7, 2019, the contents of which are all hereby incorporated by reference herein in their entirety.

TECHNICAL FIELD

An embodiment of the present disclosure relates to a method and a device for processing a video signal by using a transform having a low complexity, and more particularly, to a method and a device for designing Discrete Sine Transform-7 (DST-7) or Discrete Cosine Transform-8 (DCT-8) which is a low-complexity transform by using a Discrete Fourier Transform (DFT).

BACKGROUND ART

Next-generation video content will have characteristics of a high spatial resolution, a high frame rate, and high dimensionality of scene representation. In order to process such content, technologies, such as memory storage, a memory access rate, and processing power, will be remarkably increased.

Accordingly, it is necessary to design a new coding tool for more efficiently processing next-generation video content. Particularly, it is necessary to design a more efficient transform in terms of coding efficiency and complexity when a transform is applied.

DISCLOSURE

Technical Problem

An embodiment of the present disclosure provides a low-complexity calculation algorithm for a transform kernel for video compression.

An embodiment of the present disclosure provides a method for designing low-complexity Discrete Sine Transform-7 (DST-7) or Discrete Cosine Transform-8 (DCT-8).

An embodiment of the present disclosure provides a method for designing forward DST-7 or DCT-8 and inverse DST-7 or DCT-8 based on a Discrete Fourier Transform (DFT).

An embodiment of the present disclosure provides a method for implementing DST-7 or DCT-8 through a 1-dimensional (D) DFT or 2D DFT.

An embodiment of the present disclosure provides a method for implementing the DST-7 or DST-7 only by an integer calculation by applying various scaling methods.

An embodiment of the present disclosure provides a method for designing DST-7 or DCT-8 having lengths of 8, 16, and 32 through the method for implementing the DST-7 or DCT-8 by using the DFT and the method for implementing the DST-7 or DCT-8 only by the integer calculation.

An embodiment of the present disclosure provides an encoder/decoder structure for reflecting a new transform design.

Technical Solution

A method for processing a video signal according to an embodiment of the present disclosure may include: acquiring a transform index related to one of a plurality of transform combinations including combinations of one or more transform kernels for transforming of a current block of the video signal; deriving a transform combination including a horizontal transform and a vertical transform related to the transform index; and applying each of the vertical transform and the horizontal transform to the current block, in which the transform kernels may include Discrete Sine Transform Type-7 (DST-7) or Discrete Cosine Transform Type-8 (DCT-8), and the DST-7 or DCT-8 may be designed based on a discrete Fourier transform (DFT) to which a scale value in a form of a power of 2 related to a bit length of a transform coefficient is applied.

In an embodiment, the applying of each of the vertical transform and the horizontal transform of the transform combination to the current block may include generating a preprocessed vector generated through a first permutation of an input vector including coefficients of the current block arranged in a row or column direction, applying a first stage DFT applied to some coefficients of the preprocessed vector to the preprocessed vector at a plurality of times, applying a second stage DFT, applied to some coefficients of an intermediate vector to which the first stage DFT is applied, to the intermediate vector to which the first stage DFT is applied at a plurality of times, and generating a postprocessed vector through a second permutation for a vector to which the second stage DFT is applied.

In an embodiment, the first stage DFT or the second stage DFT may include a first type DFT outputting, from first input data having a first length, first output data having the first length and a second DFT outputting, from second input data having a second length different from the first length, second output data having the second length.

In an embodiment, a coefficient of the DFT to which the scale value is applied may be approximated by a shift operation based on the scale value.

In an embodiment, when a width of the current block is N, the DST-7 or DCT-8 may be derived based on a 2N+1 point DFT.

In an embodiment, when the width of the current block is 16, the DST-7 or DCT-8 may be derived based on a 33 point DFT, and the 33-point DFT may include a 3-point 2D DFT as a first stage DFT and an 11-point 2D DFT as a second stage DFT.

In an embodiment, when a size of the current block is 32×32, the DST-7 or DCT-8 may be derived based on a 65-point DFT, and the 65-point DFT may include a 5-point 2D DFT as a first stage DFT and a 13-point 2D DFT as a second stage DFT.

Another embodiment of the present disclosure provides a device for processing a video signal by using a transform having a low complexity. A device for processing a video signal according to another embodiment of the present disclosure may include: a memory storing the video signal; and a processor connected to the memory, in which the processor may be configured to acquire a transform index related to one of a plurality of transform combinations including combinations of one or more transform kernels for transforming of a current block of the video signal, derive a transform combination including a horizontal transform and a vertical transform related to the transform index, and apply each of the vertical transform and the horizontal transform of the transform combination to the current block, and the transform kernels may include Discrete Sine Transform Type-7 (DST-7) or Discrete Cosine Transform Type-8 (DCT-8), and the DST-7 or DCT-8 may be designed based on a discrete Fourier transform (DFT) to which a scale value in a form of a power of 2 related to a bit length of a transform coefficient is applied.

Another embodiment of the present disclosure provides a non-transitory computer-readable medium storing a computer-executable component configured to be executed in one or more processors of a computing device for processing a video signal by using a transform having a low complexity. A non-transitory computer-readable storage medium according to another embodiment of the present disclosure may be configured to acquire a transform index related to one of a plurality of transform combinations including combinations of one or more transform kernels for transforming of a current block of the video signal, derive a transform combination including a horizontal transform and a vertical transform related to the transform index, and apply each of the vertical transform and the horizontal transform of the transform combination to the current block, and the transform kernels may include Discrete Sine Transform Type-7 (DST-7) or Discrete Cosine Transform Type-8 (DCT-8), and the DST-7 or DCT-8 may be designed based on a discrete Fourier transform (DFT) to which a scale value in a form of a power of 2 related to a bit length of a transform coefficient is applied.

Advantageous Effects

An embodiment of the present disclosure provides a method for designing low-complexity Discrete Sine Transform-7 (DST-7) or Discrete Cosine Transform-8 (DCT-8) to reduce a memory usage and a calculation complexity.

Further, in an embodiment of the present disclosure, forward DST-7 or DCT-8 and inverse DST-7 or DCT-8 are designed by a DFT when encoding a still image or a moving image to reduce a complexity of DST-7 or DCT-8 through an FFT algorithm.

As described above, a calculation complexity can be reduced and coding efficiency can be enhanced through a new low-complexity calculation algorithm.

DESCRIPTION OF DRAWINGS

FIG. 1 illustrates an example of a video coding system according to an embodiment of the disclosure.

FIG. 2 is an embodiment to which the disclosure is applied, and is a schematic block diagram of an encoding apparatus for encoding a video/image signal.

FIG. 3 is an embodiment to which the disclosure is applied, and is a schematic block diagram of a decoding apparatus for decoding a video/image signal.

FIG. 4 shows an example of a structural diagram of a content streaming system according to an embodiment of the disclosure.

FIG. 5 illustrates an example of a block diagram of a device for processing a video signal according to an embodiment of the present disclosure.

FIG. 6 is an example of a block split structure according to an embodiment of the present disclosure, and FIG. 6A illustrates an example of block split structures by a quad tree (QT), FIG. 6B illustrates an example of block split structures by a binary tree (BT), FIG. 6C illustrates an example of block split structures by a ternary tree (TT), and FIG. 6D illustrates an example of block split structures by an asymmetric tree (AT).

FIG. 7 illustrates an example of a detailed block diagram of a transform unit/a quantization unit and a dequantizer/an inverse transformer in an encoder according to an embodiment of the present disclosure.

FIG. 8 illustrates an example of a detailed block diagram of a dequantizer/an inverse transformer in a decoder according to an embodiment of the present disclosure.

FIG. 9 illustrates an example of a table for a transform configuration group to which multiple transform selection (MTS) is applied according to an embodiment of the present disclosure.

FIG. 10 illustrates an example of a flowchart for an encoding process to which the MTS is applied according to an embodiment of the present disclosure.

FIG. 11 illustrates an example of a flowchart for a decoding process to which the MTS is applied according to an embodiment of the present disclosure.

FIG. 12 illustrates an example of a flowchart for encoding an MTS flag and an MTS index according to an embodiment of the present disclosure.

FIG. 13 illustrates an example of a flowchart for a decoding process I which a horizontal transform or a vertical transform is applied to a row or a column based on the MTS flag and the MTS index according to an embodiment of the present disclosure.

FIG. 14 illustrates an example of a flowchart for performing an inverse transform based on a transform related parameter according to an embodiment of the present disclosure.

FIG. 15 illustrates an example of a flowchart for designing forward DST-7 having a length of 16 by using a Discrete Fourier Transform (DFT) according to an embodiment of the present disclosure.

FIG. 16 illustrates an example of a flowchart for designing inverse DST-7 having a length of 16 by using the DFT according to an embodiment of the present disclosure.

FIGS. 17 to 19 illustrate an example of a flowchart for applying an xDST7_FFT_B16 function of FIGS. 15 and 16.

FIG. 20 illustrates an example of a flowchart for designing forward DST-7 having a length of 32 by using the DFT according to an embodiment of the present disclosure.

FIG. 21 illustrates an example of a flowchart for designing inverse DST-7 having a length of 32 by using the DFT according to an embodiment of the present disclosure.

FIGS. 22 to 24 illustrate an example of a flowchart for applying an xDST7_FFT_B32 function of FIGS. 20 and 21.

FIG. 25 illustrates an example of a flowchart for designing forward DST-7 having a length of 8 by using the DFT according to an embodiment of the present disclosure.

FIG. 26 illustrates an example of a flowchart for designing inverse DST-7 having a length of 8 by using the DFT according to an embodiment of the present disclosure.

FIG. 27 illustrates an example of a block diagram of 16×16 DST7 to which a 33-point DFT is applied according to an embodiment of the present disclosure.

FIG. 28 illustrates an example of a block diagram of 32×32 DST7 to which a 65-point DFT is applied according to an embodiment of the present disclosure.

FIG. 29 illustrates an example of a flowchart for encoding to which forward DST-7 and forward DCT-8 are applied by using the DFT according to an embodiment of the present disclosure.

FIG. 30 illustrates an example of a flowchart for decoding to which inverse DST-7 and reverse DCT-8 are applied by using the DFT according to an embodiment of the present disclosure.

MODE FOR DISCLOSURE

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art. In some cases, in order to prevent the technical concept of the disclosure from being unclear, structures or devices which are publicly known may be omitted, or may be depicted as a block diagram centering on the core functions of the structures or the devices.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a slice, a tile, a frame, a block, etc. may be properly replaced and interpreted in each coding process.

Hereinafter, in this specification, a "processing unit" means a unit in which an encoding/decoding processing process, such as prediction, a transform and/or quantization, is performed. A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), a coding block (CB), a prediction block (PB) or a transform block (TB) for a luma component. Alternatively, a processing unit may correspond to a coding tree block (CTB), a coding block (CB), a prediction block (PB) or a transform block (TB) for a chroma component. Furthermore, the disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, a coefficient (a transform coefficient or a transform coefficient after a first order transformation) etc. are generally called a sample. Furthermore, to use a sample may mean to use a pixel value, a picture element value, a transform coefficient or the like.

FIG. 1 illustrates an example of a video coding system according to an embodiment of the disclosure.

The video coding system may include a source device 10 and a receive device 20. The source device 10 may transmit encoded video/image information or data to the receive device 20 in a file or streaming format through a storage medium or a network.

The source device 10 may include a video source 11, an encoding apparatus 12, and a transmitter 13. The receive device 20 may include a receiver 21, a decoding apparatus 22 and a renderer 23. The source device may be referred to as a video/image encoding apparatus and the receive device may be referred to as a video/image decoding apparatus. The transmitter 13 may be included in the encoding apparatus 12. The receiver 21 may be included in the decoding apparatus 22. The renderer may include a display and the display may be configured as a separate device or an external component.

The video source 11 may acquire video/image data through a capture, synthesis, or generation process of video/image. The video source may include a video/image capturing device and/or a video/image generating device. The video/image capturing device may include, for example, one or more cameras, a video/image archive including previously captured video/images, and the like. The video/image generating device may include, for example, a computer, a tablet, and a smartphone, and may electronically generate video/image data. For example, virtual video/image data may be generated through a computer or the like, and in this case, a video/image capturing process may be replaced by a process of generating related data.

The encoding apparatus 12 may encode an input video/image. The encoding apparatus 12 may perform a series of procedures such as prediction, transform, and quantization for compression and coding efficiency. The encoded data (encoded video/video information) may be output in a form of a bit stream.

The transmitter 13 may transmit the encoded video/video information or data output in the form of a bit stream to the receiver of the receive device through a digital storage medium or a network in a file or streaming format. The digital storage media may include various storage media such as a universal serial bus (USB), a secure digital (SD), a compact disk (CD), a digital video disk (DVD), Bluray, a hard disk drive (HDD), and a solid state drive (SSD). The transmitter 13 may include an element for generating a media file through a predetermined file format, and may include an element for transmission through a broadcast/communication network. The receiver 21 may extract the bit stream and transmit it to the decoding apparatus 22.

The decoding apparatus 22 may decode video/image data by performing a series of procedures such as dequantization, inverse transform, and prediction corresponding to the operations of the encoding apparatus 12.

The renderer 23 may render the decoded video/image. The rendered video/image may be displayed through the display.

FIG. 2 is an embodiment to which the disclosure is applied, and is a schematic block diagram of an encoding apparatus for encoding a video/image signal.

Referring to FIG. 2, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may be configured with a hardware component (for example a memory or a digital storage medium) in an embodiment. And, the memory 170 may include a decoded picture buffer (DPB).

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bit stream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference.

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bit stream form. The information on quantized transform coefficients may be called residual information. The quantizer 130 may re-arrange the quantized transform coefficients of a block form in one-dimensional vector form based on a coefficient scan sequence, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit unit in the form of a bit stream. The bit stream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the DPB 170. The various filtering methods may include deblocking filtering, a sample adaptive offset, an adaptive loop filter, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bit stream form.

The modified reconstructed picture transmitted to the DPB 170 may be used as a reference picture in the inter predictor 180. The encoding apparatus can avoid a prediction mismatch in the encoding apparatus 100 and a decoding apparatus and improve encoding efficiency if inter prediction is applied.

The DPB 170 may store a modified reconstructed picture in order to use the modified reconstructed picture as a reference picture in the inter predictor 180.

FIG. 3 is an embodiment to which the disclosure is applied, and is a schematic block diagram of a decoding apparatus for decoding a video/image signal.

Referring to FIG. 3, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the decoded picture buffer 250 may be configured with a hardware component (for example a memory or a digital storage medium) in an embodiment. The memory 250 may include the DPB 175, and may be configured by a digital storage medium.

When a bit stream including video/image information is input, the decoding apparatus 200 may reconstruct an image in accordance with a process of processing video/image information in the encoding apparatus of FIG. 2. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bit stream form. The received signal may be decoded through the entropy decoder 210. For example, the entropy decoder 210 may derive information (e.g., video/image information) for image reconstruction (or picture reconstruction) by parsing the bit stream. For example, the entropy decoder 210 may decode information within the bit stream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bit stream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on a coefficient scan sequence performed in the encoding apparatus. The dequantizer 220 may perform de-quantization on the quantized transform coefficients using a quantization parameter (e.g., quantization step size information), and may output transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the DPB 250. The various filtering methods may include deblocking filtering, a sample adaptive offset SAO, an adaptive loop filter ALF, and a bilateral filter, for example.

A reconstructed picture transmitted (modified) to the decoded picture buffer 250 may be used as a reference picture in the inter predictor 260.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

FIG. 4 shows a structural diagram of a content streaming system according to an embodiment of the disclosure.

The content streaming system to which the disclosure is applied may largely include an encoding server 410, a streaming server 420, a web server 430, a media storage 440, a user device 450, and a multimedia input device 460.

The encoding server 410 may compress the content input from multimedia input devices such as a smartphone, camera, camcorder, etc. into digital data to generate a bit stream and transmit it to the streaming server 420. As another example, when the multimedia input devices 460 such as the smartphone, camera, and camcorder directly generate a bit stream, the encoding server 410 may be omitted.

The bit stream may be generated by an encoding method or a bit stream generation method to which the disclosure is applied, and the streaming server 420 may temporarily store the bit stream in the process of transmitting or receiving the bit stream.

The streaming server 420 transmits multimedia data to the user device 450 based on a user request through the web server 430, and the web server 430 serves as an intermediary to inform the user of what service is present. When a user requests a desired service through the web server 430, the web server 430 delivers it to the streaming server 420, and the streaming server 420 transmits multimedia data to the user. At this time, the content streaming system may include a separate control server, in which case the control server serves to control commands/responses between devices in the content streaming system.

The streaming server 420 may receive content from the media storage 440 and/or the encoding server 410. For example, the streaming server 420 may receive content in real time from the encoding server 410. In this case, in order to provide a smooth streaming service, the streaming server 420 may store the bit stream fora predetermined time.

For example, the user device 450 may include a mobile phone, a smart phone, a laptop computer, a terminal for digital broadcasting, a personal digital assistant PDA, a portable multimedia player PMP, a navigation terminal, a slate PC, a tablet PC, an ultra book, a wearable device (for example, a smart watch, a smart glass, a head mounted display HMD, a digital TV, a desktop computer, and digital signage.

Each server in the content streaming system may operate as a distributed server, and in this case, data received from each server may be processed in a distributed manner.

FIG. 5 illustrates an example of a block diagram of a device for processing a video signal according to an embodiment of the present disclosure. The video signal processing device of FIG. 5 may correspond to the encoder 100 of FIG. 2 or the decoder 200 of FIG. 3.

The video signal processing device 500 according to an embodiment of the present disclosure may include a memory 520 storing the video signal and a processor 510 processing the video signal while being coupled to the memory.

The processor 510 according to an embodiment of the present disclosure may be configured as at least one processing circuit for processing the video signal, and process the video signal by executing commands for encoding or decoding the video signal. That is, the processor 510 may encode or an original video signal or decode the encoded video signal by executing encoding or decoding methods to be described below.

The processor 510 according to an embodiment of the present disclosure may be configured to acquire a transform index related to any one of a plurality of transform combinations constituted by combinations of one or more transform kernels for transforming a current block of the video signal, derive a transform combination including a horizontal transform and a vertical transform related to the transform index, and apply each of the horizontal transform and the vertical transform of the transform combination to the current block. The transform kernels may include DST-7 or DCT-8, and the DST-7 or DCT-8 may be designed based on a DFT to which a scale value in the form of a power of 2 related to a bit length of a transform coefficient is applied.

In an embodiment, the processor 510 may include a step of generating a preprocessed vector generated through a first permutation of an input vector including coefficients of the current block arranged in a row or column direction, a step of applying a first stage DFT applied to some coefficients of the preprocessed vector to the preprocessed vector a plurality of times, a step of applying a second stage DFT, applied to some coefficients of the vector to which the first stage DFT is applied, to the vector to which the first stage DFT is applied a plurality of times, and a step of generating a postprocessed vector through a second permutation for the vector to which the second stage DFT is applied.

In an embodiment, the first stage DFT or the second stage DFT may include a first type DFT outputting, from first input data having a first length, first output data having the first length and a second type DFT, from second input data having a second length different from the first length, second output data having the second length.

In an embodiment, a coefficient of the DFT to which the scale value is applied may be approximated by a shift operation based on the scale value.

In an embodiment, when a width of the current block is N, the DST-7 or DCT-8 may be derived based on a 2N+1 point DFT.

In an embodiment, when the width of the current block is 16, the DST-7 or DCT-8 may be derived based on a 33-point DFT, and the 33-point DFT may include a 3-point 2D DFT as the first stage DFT and an 11-point 2D DFT as the second stage DFT.

In an embodiment, when the width of the current block is 32, the DST-7 or DCT-8 may be derived based on a 65-point DFT, and the 65-point DFT may include a 5-point 2D DFT as the first stage DFT and a 13-point 2D DFT as the second stage DFT.

FIG. 6 is an example of a block split structure according to an embodiment of the present disclosure, and FIG. 6a illustrates an example of block split structures by a quad tree (QT), FIG. 6b illustrates an example of block split structures by a binary tree (BT), FIG. 6c illustrates an example of block split structures by a ternary tree (TT), and FIG. 6d illustrates an example of block split structures by an asymmetric tree (AT).

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×1/2N, 2N×N, 2N×1/2N) and a vertical TT (1/2N× 2N, N×2N, 1/2N×2N). The AT may have four types of splits of a horizontal-up AT (2N×1/2N, 2N×3/2N), a horizontal-down AT (2N×3/2N, 2N×1/2N), a vertical-left AT (1/2N× 2N, 3/2N×2N), and a vertical-right AT (3/2N×2N, 1/2N× 2N). Each BT, TT, or AT may be further split recursively using the BT, TT, or AT.

FIG. 6A shows an example of a QT split. A block A may be split into four subblocks A0, A1, A2, and A3 by a QT. The subblock A1 may be split into four subblocks B0, B1, B2, and B3 by a QT.

FIG. 6B shows an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 6C shows an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 6D shows an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be combined. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

FIG. 7 illustrates an example of a detailed block diagram of a transformer/a quantizer and a dequantizer/an inverse transformer in an encoder according to an embodiment of the present disclosure.

Referring to FIG. 7, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 8, the dequantization and transform unit 220/230 may include the dequantization unit 220, an inverse secondary transform unit 231 and an inverse primary transform unit 232.

In the disclosure, the transform may be performed through a plurality of steps. For example, as in FIG. 7, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

A discrete cosine transform type 2 (hereinafter "DCT-2") may be applied to the primary transform.

Alternatively, a discrete sine transform-type 7 (hereinafter called "DST-7") may be applied to a specific case. For example, the DST-7 may be applied to a 4×4 block to which intra prediction mode is applied.

Further, the primary transform may adopt combinations of various transforms DST-7, DCT-8, DST-1, and DCT-5 of the multiple transform selection (MTS). For example, the combination such as FIG. 9 or Table 1 may be adopted.

The secondary transform unit 122 may apply the secondary transform to a primary transformed signal and here, the secondary transform may be predefined in the table in the encoder and/or the decoder.

As an embodiment, the secondary transform may conditionally adopt a non-separable secondary transform (hereinafter, referred to as 'NSST'). For example, the NSST may be applied to the intra prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, the transform for prediction mode 52 is applied applied to the input data which is transposed because prediction mode 52 has the same transform set as prediction mode 16.

Meanwhile, since the symmetry for the direction does not exist in the case of a planar mode and a DC mode, a transform set is established for each of the planar mode and the DC mode and the corresponding transform set may include two transforms. In respect to the remaining direction modes, each transform set may include three transforms.

As another embodiment, the secondary transform may adopt combinations of various transforms DST-7, DCT-8, DST-1, and DCT-5 of the multiple transform selection (MTS). For example, a transform combination such as FIG. 9 or Table 1 may be adopted.

As another embodiment, DST-7 may be applied as primary transform.

As another embodiment, DCT-8 may be applied as primary transform.

As another embodiment, the NSST may be applied to only an 8×8 top-left region instead of the entire primarily transformed block. For example, 8×8 NSST is applied when both of a height and a width of the block size is greater than 8 and 4×4 NSST is applied when both of the height and width of the block size is greater than 4 and one of the height and width is 4. Here, blocks are divided into 4×4 blocks and then 4×4 NSST is applied to each block, or 4×4 NSST may also be applied only to the top-left 4×4 region.

The quantization unit 130 may perform quantization on a secondarily transformed signal. The dequantization and inverse transform units 140/150 inversely perform the aforementioned process, and redundant description will be omitted.

FIG. 8 illustrates an example of a detailed block diagram of a dequantizer/an inverse transformer in a decoder according to an embodiment of the present disclosure.

Referring to FIG. 8, the dequantizer and inverse transformer 220/230 may include a dequantizer 220, an inverse secondary transform unit 231, and an inverse primary transform unit 232.

The dequantizer 220 may acquire transform coefficients from an entropy-decoded signal by using quantization step size information.

The inverse secondary transform unit 231 performs an inverse secondary transform for the transform coefficients. Here, the inverse secondary transform represents an inverse transform of the secondary transform described in FIG. 7.

As another embodiment, combinations of various transforms DST-7, DCT-8, DST-1, and DCT-5 of the MTS may be applied to the secondary transform. For example, a transform combination as in FIG. 9 or Table 1 may be applied.

The inverse primary transform unit 232 may perform the inverse primary transform to a signal (or block) to which the inverse secondary transform is applied, and output a residual signal. Here, the inverse primary transform may represent an inverse transform of the primary transform described in FIG. 7.

In an embodiment, combinations of various transforms DST-7, DCT-8, DST-1, and DCT-5 of the MTS may be applied to the primary transform. For example, the transform combination as in FIG. 9 or Table 1 may be applied. As an embodiment of the present disclosure, the DST-7 or DCT-8 may be applied as the primary transform.

An embodiment of the present disclosure may provide a method for constituting the transform combination for each transform configuration group distinguished by at least one of a prediction mode, a block size, or a block shape. The inverse primary transform unit 232 may perform the inverse transform based on the transform combination constituted by the embodiment of the present disclosure. Further, embodiments described in the present disclosure may be applied.

FIG. 9 illustrates an example of a table for a transform configuration group to which MTS is applied according to an embodiment of the present disclosure.

In the present disclosure, a j-th transform combination candidate for transform configuration group $G_i$ is represented by a pair shown in Equation 1 below.

$$(H(G_i, j), V(G_i, j)) \qquad \text{[Equation 1]}$$

Here, H(Gi, j) indicates the horizontal transform for the j-th candidate, and V(Gi, j) indicates the vertical transform for the j-th candidate. For example, in FIG. 9, H(G3, 2)=DST7 and V(G3, 2)=DCT8 may be represented. According to a context, a value assigned to H(Gi, j) or V(Gi, j) may be a nominal value for distinguishing a transform or an index value indicating the corresponding transform. Further, the value assigned to H(Gi, j) or V(Gi, j) may be a 2-dimensional (D) matrix for the corresponding transform.

Further, in the present disclosure, a 2D matrix value for DCT and DST may be represented as shown in Equation 2 and 3 below.

$$DCT \text{ type 2: } C_N^{II}, DCT \text{ type 8: } V_N^{VIII} \qquad \text{[Equation 2]}$$

$$DST \text{ type 7: } S_N^{VII}, DST \text{ type 4: } S_N^{IV} \qquad \text{[Equation 3]}$$

Here, whether the transform is DST or DCT is expressed by S or C, a type number is represented as a superposition in the form of a Roman number, and N of a lower subscript indicates that the transform is an N×N transform. Further, in the present disclosure, it is assumed that column vectors constitute a transform basis in the 2D matrix such as $C_N^{II}$ and $S_N^{IV}$.

Referring to FIG. 9, the transform configuration groups may be determined based on the prediction mode and the total number of groups may be 6 (G0 to G5). In addition, G0 to G4 correspond to a case where an intra prediction is applied, and G5 represents transform combinations (or transform sets, transform combination sets) applied to the residual block generated by the inter prediction.

One transform combination may include a horizontal transform (or row transform) applied to rows of the corresponding 2D block and a vertical transform (or column transform) applied to columns.

Here, each of all of the transform configuration groups may have four transform combination candidates. Four transform combination candidates may be selected or determined through transform combination indexes of 0 to 3. The transform combination index encoded by the encoder may be transmitted to the decoder.

As an embodiment, the residual data (or residual signal) obtained through the intra prediction may have different statistical characteristics according to the intra prediction mode. Accordingly, as shown in FIG. 9 or Table 1, other transforms other than a general cosine transform (e.g., DCT-2) may be applied for each intra prediction mode.

Referring to FIG. 9, a case where 35 intra prediction modes are used and a case where 67 intra prediction modes are used may be configured. A plurality of transform combinations may be applied to each transform configuration group distinguished in each intra prediction mode column. For example, the plurality of transform combinations may be constituted by four (row direction transforms and column direction transforms) combinations. As a specific example, DST-7 and DCT-5 may be applied in both a row (horizontal) direction and a column (vertical) direction in group 0, and as a result, a total of four combinations are available.

Since a total of four transform kernel combinations may be applied to each intra prediction mode, a transform combination index for selecting one of the transform kernel combinations may be transmitted every transform unit. In the present disclosure, the transform combination index may be referred to as an MTS index and expressed as a syntax element such as mts_idx.

Further, in addition to the transform kernels presented in FIG. 9, a case where DCT-2 is optimal for both the row direction and the column direction due to characteristics of the residual signal may occur. Accordingly, the transform may be adaptively performed by defining the MTS flag for each coding unit. Here, when the MTS flag is 0, DCT-2 may be applied to both the row direction and the column direction and when the MTS flag is 1, one of four combinations may be selected or determined through the MTS index. Further, when the MTS flag is not separately defined and the MTS index is 0, it may be indicated that DCT-2 is applied.

As an embodiment, FIG. 9 may be preconfigured through off-line training.

As an embodiment, the MTS index may be defined as one index which may simultaneously indicate the horizontal transform and the vertical transform. Further, the MTS index may separately define a horizontal transform index and a vertical transform index.

As an embodiment, the MTS flag or the MTS index may be defined in at least one level of a sequence, a picture, a slice, a block, a coding unit, a transform unit, or a prediction unit. For example, the MTS flag or the MTX index may be defined at at least one level of the coding unit or the transform unit.

FIG. 10 illustrates an example of a flowchart for an encoding process to which the MTS is applied according to an embodiment of the present disclosure.

In the present disclosure, an embodiment in which transforms are a separately applied to the horizontal direction and the vertical direction is basically described, but the transform combination may be constituted even by non-separable transforms.

Further, the transform combination may be constituted even by a mixture of separable transforms and non-separable transforms. In this case, when the non-separable transform is used, row/column-specific transform selection or horizontal/vertical direction-specific selection is not required, and when the separable transform is selected, the transform combinations in FIG. 9 or Table 1 may be used.

Further, schemes proposed in the present disclosure may be applied regardless of the primary transform or the secondary transform. That is, there is no restriction that the schemes should be applied to only any one of both the primary transform or the secondary transform, and the schemes may be applied to both the primary transform or the secondary transform. Here, the primary transform may mean a transform for initially transforming a residual block from which a prediction signal is removed and the secondary transform may mean a transform for applying the transform to a block generated as a result of the primary transform.

First, the encoder 100 may determine the transform configuration group corresponding to the current block (S1010). Here, the transform configuration group may mean the transform configuration group of FIG. 9 or Table 1 and an embodiment of the present disclosure is not limited thereto and the transform configuration group may be constituted by other transform combinations.

The encoder 100 may perform a transform for candidate transform combinations available in the transform configuration group (S1020).

According to a result of performing the transform in step S1020, the encoder 100 may determine or select a transform combination having smallest rate distortion (RD) cost (S1030).

The encoder 100 may encode a transform combination index corresponding to the selected transform combination (S1040).

FIG. 11 illustrates an example of a flowchart for a decoding process to which the MTS is applied according to an embodiment of the present disclosure.

First, the decoder 200 may acquire (parse) a transform index related to any one of a plurality of transform combinations constituted by combinations of one or more transform kernels for transforming the current block (S1110). The transform combination index may be referred to as the MTS index, and expressed as the syntax element such as mts_idx. As an embodiment, the transform combination index may be configured based on at least one of the prediction mode, the block size, or the block shape of the current block. Here, the transform kernel may include DCT-2, DST-7, and DCT-8, and when the transform index is 0, DCT-2 may be applied to both the horizontal transform and the vertical transform, but when the transform index is equal to or larger than 1, DST-7 or DCT-8 may be used as the horizontal transform or the vertical transform. According to an embodiment of the present disclosure, the DST-7 or DCT-8 may be designed based on a discrete Fourier transform (DFT) to which a scale value in the form of a power of 2 related to a bit length of a transform coefficient is applied.

The decoder 200 may derive a transform combination including the horizontal transform and the vertical transform related to the acquired transform index (S1120). That is, the transform combination may be constituted by the horizontal transform and the vertical transform, and may include at least one of the DST-7 or the DCT-8. According to an embodiment of the present disclosure, the DST-7 or the DCT-8 may be derived based on the DFT to which the scale value is applied and the scale value may correspond to the power of 2.

In an embodiment, the scale value applied to the DFT may be determined based on an output value according to the vertical-direction transform and the horizontal-direction transform or the bit length of the transform coefficient. Further, the DFT to which the scale value is applied may be approximated by a shift operation based on the scale value.

In an embodiment, when the width of the current block is N, the DST-7 or DCT-8 may be derived based on a 2N+1 point DFT. For example, when the width of the current block is 16, the DST-7 or DCT-8 may be derived based on a 33-point DFT, and the 33-point DFT may include a 3-point 2D DFT as the first stage DFT and an 11-point 2D DFT as the second stage DFT. Further, when the width of the current block is 32, the DST-7 or DCT-8 may be derived based on a 65-point DFT, and the 65-point DFT may include a 5-point 2D DFT as the first stage DFT and a 13-point 2D DFT as the second stage DFT.

Further, the transform combination may mean the transform combination described in Table 9 or Table 1, but an embodiment of the present disclosure is not limited thereto. That is, the transform combination may also be configured by other transform combinations depending on other embodiments in the present disclosure.

The decoder 200 may apply each of the horizontal transform (inverse transform) and the vertical transform (inverse transform) of the transform combination derived to the current block (S1130). When the transform combination is constituted by a row (horizontal) transform and a column (vertical) transform, the row (horizontal) transform may be first applied and then the column (vertical) transform may be applied.

In an embodiment, the decoder 200 may generate a preprocessed vector generated through a first permutation of an input vector including coefficients of the current block arranged in the row or column direction, apply the first stage DFT applied to some coefficients of the preprocessed vector to the preprocessed vector a plurality of times, apply the second stage DFT, applied to some coefficients of an intermediate vector to which the first stage DFT is applied, to the intermediate vector to which the first stage DFT is applied a plurality of times, and generate a postprocessed vector through a second permutation for the vector to which the second stage DFT is applied.

In an embodiment, the first stage DFT or the second stage DFT may include a first type DFT outputting, from first input data having a first length (e.g., 5), first output data having the first length and a second type DFT, from second input data having a second length (e.g., 11) different from the first length, second output data having the second length.

As an embodiment, when the vertical transform or the horizontal transform is the DST-7 or the DCT-8, the decoder 200 may apply the inverse transform of the DST-7 or the inverse transform of the DCT-8 to each column and then apply the inverse transform of the DST-7 or the inverse transform of the DCT-8 to each row.

As an embodiment, the vertical transform or the horizontal transform may be applied differently to each row or column.

As an embodiment, the transform combination index may be acquired based on the MTS flag indicating whether the MTS is performed. That is, the transform combination index may be obtained when the MTS is performed according to the MTS flag. However, whether the MTS is performed may be indicated only by the MTS index without the MTS flag. For example, when the MTS index is 0, the MTS may not be applied, but the DCT-2 may be applied to the horizontal transform or the vertical transform and when the MTS index is not 0, each of the DST-7 or the DCT-8 may be applied to the horizontal transform or the vertical transform.

As an embodiment, the MTS flag or the MTS index may be defined in at least one level of a sequence, a picture, a slice, a block, a coding unit, a transform unit, or a prediction unit.

FIG. 12 illustrates an example of a flowchart for encoding an MTS flag and an MTS index according to an embodiment of the present disclosure.

The encoder 100 may determine whether the MTS is applied to the current block (S1210). Here, the MTS may refer to a method for performing the transform by using a plurality of transform types, and for example, a transform type may be determined for each row-direction transform and column-direction transform of the current block.

If the MTS is applied, the encoder 100 may determine the MTS index based on at least one of the prediction mode, the horizontal transform, and the vertical transform of the current block (S1220). Here, the MTS index may mean an index indicating any one of the plurality of transform combinations for each intra prediction mode and the MTS index may be transmitted for each transform unit. In an embodiment, the encoder 100 may encode the MTS flag to 1 when the MTS is applied.

When the MTS index is determined, the encoder 100 may encode the MTS index (S1230).

Meanwhile, when the MTS is not applied, the encoder 100 may encode the MTS index to 0 (S1250). Further, when the MTS is not applied, the encoder 100 may encode the MTS flag to 0.

FIG. 13 illustrates an example of a flowchart for a decoding process in which a horizontal transform or a vertical transform is applied to a row or a column based on the MTS flag and the MTS index according to an embodiment of the present disclosure.

The decoder 200 may parse the MTS flag from a bitstream (S1310). Here, the MTS flag may indicate whether the MTS is applied to the current block.

The decoder 200 may determine whether the MTS is applied to the current block based on the MTS flag (S1320). For example, the decoder 200 may check whether the MTS flag is 1.

When the MTS flag is 1, the decoder 200 may check whether the number of non-zero transform coefficients is greater than (or equal to or greater than) a threshold (S1330). For example, the threshold may be configured to 2, which may be configured differently based on the block size or the size of the transform unit.

When the number of non-zero transform coefficients is larger than a threshold, the decoder 200 may parse the MTS index (S1340). Here, the MTS index may mean an index indicating any one of a plurality of transform combinations for each intra prediction mode or inter prediction mode, and the MTS index may be transmitted every transform unit. Alternatively, the MTS index may mean an index indicating any one transform combination defined in a preconfigured transform combination table and here, the preconfigured transform combination table may be configured in FIG. 9 or Table 1, but an embodiment of the present disclosure is not limited thereto.

The decoder 200 may derive or determine the horizontal transform and the vertical transform based on at least one of the MTS index and the prediction mode (S1350).

Alternatively, the decoder 200 may derive the transform combination corresponding to the MTS index. For example, the decoder 200 may derive or determine the horizontal transform and the vertical transform corresponding to the MTS index.

Meanwhile, when the number of non-zero transform coefficients is not larger than the threshold, the decoder 200 may apply a preconfigured vertical inverse transform every column (S1360). For example, the vertical inverse transform may be an inverse transform of DST-7.

In addition, the decoder 200 may apply the preconfigured horizontal inverse transform to every row (S1370). For example, the horizontal inverse transform may be an inverse transform of DST-7. That is, when the number of non-zero transform coefficients is not larger than the threshold, a transform kernel preconfigured by the encoder 100 or the decoder 200 may be used. For example, the transform kernel (e.g., DCT-2, etc.) that is defined in the transform combination table illustrated in FIG. 9 or Table 1 may not be used, but the transform kernel that is widely used may be used.

Meanwhile, when the MTS flag is 0, the decoder 200 may apply the preconfigured vertical inverse transform to each column (S10380). For example, the vertical inverse transform may be inverse transform of DCT-2.

In addition, the decoder 200 may apply the preconfigured horizontal inverse transform to every row (S1390). For example, the horizontal inverse transform may be an inverse transform of DCT-2. That is, when the MTS flag is 0, the transform kernel preconfigured by the encoder 100 or decoder 200 may be used. For example, the transform kernel that is defined in the transform combination table illustrated in FIG. 9 or Table 1 may not be used, but the transform kernel that is widely used may be used.

FIG. 14 illustrates an example of a flowchart for performing an inverse transform based on a transform related parameter according to an embodiment of the present disclosure.

The decoder 200 to which an embodiment of the present disclosure is applied may acquire sps_mts_intra_enabled_flag or sps_mts_inter_enabled_flag (S1410). Here, sps_mts_intra_enabled_flag indicates whether tu_mts_flag exists in a residual coding syntax of an intra coding unit. For example, when sps_mts_intra_enabled_flag=0, tu_mts_flag does not exist in the residual coding syntax of the intra coding unit and when sps_mts_intra_enabled_flag=1, tu_mts_flag exists in the residual coding syntax of the intra coding unit. In addition, sps_mts_inter_enabled_flag indicates whether tu_mts_flag exists in the residual coding syntax of the inter coding unit. For example, when sps_mts_inter_enabled_flag=0, tu_mts_flag does not exist in the residual coding syntax of the inter coding unit and when sps_mts_inter_enabled_flag=1, tu_mts_flag exists in the residual coding syntax of the inter coding unit.

The decoder 200 may acquire tu_mts_flag based on sps_mts_intra_enabled_flag or sps_mts_inter_enabled_flag (S1420). For example, when sps_mts_intra_enabled_flag=1 or sps_mts_inter_enabled_flag=1, the decoder 200 may acquire tu_mts_flag. Here, tu_mts_flag indicates whether the MTS is applied to a residual sample of a luma transform block. For example, when tu_mts_flag=0, the MTS is not applied to the residual sample of the luma transform block and when tu_mts_flag=1, the MTS is applied to the residual sample of the luma transform block.

As another example, at least one of the embodiments of the present disclosure may be applied to the tu_mts_flag.

The decoder 200 may obtain mts_idx (MTS index) based on tu_mts_flag (S1430). For example, when tu_mts_flag=1, the decoder 200 may obtain mts_idx. Here, mts_idx indicates which transform kernel is applied to luma residual samples along the horizontal and/or vertical direction of a current transform block.

For example, at least one of the embodiments of the present disclosure may be applied to mts_idx. As a specific example, at least one of the embodiments of FIG. 9 or Table 1 may be applied.

The decoder 200 may derive a transform kernel corresponding to mts_idx (S1440). For example, the transform kernel corresponding to the mts_idx may be defined while being divided into the horizontal transform and the vertical transform.

As another example, different transform kernels may be applied to the horizontal transform and the vertical transform. However, an embodiment of the present disclosure is not limited thereto, and the same transform kernel may be applied to the horizontal transform and the vertical transform.

As an embodiment, the mts_idx may be defined as shown in Table 1 below.

TABLE 1

| mts_idx[ x0 ][ y0 ] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

In Table 1, mts_idx[x0][y0] represents an MTS index of a block having (x0, y0) as a top-left sample, trTypeHor represents the type of horizontal-direction transform, and trTypeVer represents the type of vertical-direction transform. For example, transform type #0 may represent DCT-2, transform type #1 may represent DST-7 (or DCT-8), and transform type #2 may represent DCT-8 (or DST-7).

In addition, the decoder 200 may perform the inverse transform based on the transform kernel (S1450).

In FIG. 14, an embodiment is described in which the tu_mts_flag is obtained to determine whether to apply MTS and then the mts_idx which determines the transform kernel is obtained according to the obtained tu_mts_flag value, but an embodiment of the present disclosure is not limited thereto. As an example, the decoder 200 parses the mts_idx directly without parsing the tu_mts_flag to determine the transform kernel. In this case, Table 1 described above may be used. That is, when the mts_idx value indicates 0, DCT-2 may be applied in the horizontal/vertical direction and when the mts_idx value indicates a value other than 0, DST-7 and/or DCT-8 may be applied according to the mts_idx value.

As another embodiment, a decoding process of performing the transform process is described.

The decoder 200 may confirm a transform size nTbS. Here, the transform size nTbS may be a variable representing a horizontal sample size of scaled transform coefficients.

The decoder 200 may confirm a transform kernel type trType. Here, the transform kernel type trType may be a variable representing the type of transform kernel and various embodiments of the present disclosure may be applied. The transform kernel type trType may include a horizontal transform kernel type trTypeHor and a vertical transform kernel type trTypeVer.

Referring to Table 1, when the transform kernel type trType is 0, the transform kernel type may represent the DCT2, when the transform kernel type trType is 1, the transform kernel type may represent the DST-7, and when the transform kernel type trType is 2, the transform kernel type may represent the DCT-8.

The decoder 200 may perform a transformation matrix multiplication based on at least one of the transform size nTbS or the transform kernel type.

As another example, when the transform kernel type is 1 and the transform size is 4, a predetermined transformation matrix (1) may be applied at the time of performing the transformation matrix multiplication.

As another example, when the transform kernel type is 1 and the transform size is 8, a predetermined transformation matrix (2) may be applied at the time of performing the transformation matrix multiplication.

As another example, when the transform kernel type is 1 and the transform size is 16, a predetermined transformation matrix (3) may be applied at the time of performing the transformation matrix multiplication.

As another example, when the transform kernel type is 1 and the transform size is 32, a predefined transformation matrix (4) may be applied.

Similarly, when the transform kernel type is 2 and the transform size is 4, 8, 16, or 32, each of predefined transformation matrices (5), (6), (7), and (8) may be applied.

Here, each of the predefined transformation matrices (1) to (8) may correspond to any one of various types of transformation matrices. As an example, the transformation matrix of the type illustrated in FIG. 9 or Table 1 may be applied.

The decoder 200 may derive a transform sample based on the transformation matrix multiplication.

The above embodiments may be used individually, but an embodiment of the present disclosure is not limited thereto, and may be used in combination with the above embodiments and other embodiments of the present disclosure.

Implementation of DST-7 using DFT

The DST-7 may be expressed in the form of a matrix shown in Equation 4 below.

$$[S_N^{VII}]_{n,k} = \frac{2}{\sqrt{2N+1}} \sin\left(\frac{\pi(2k+1)(n+1)}{2N+1}\right), \quad \text{[Equation 4]}$$

$$n, k = 0, 1, \ldots, N-1$$

In Equation 4, n represents an index for the row and k represents an index for the column. A matrix $S_N^{VII}$ expressed through Equation 3 is inverse DST-7, and when a transpose is applied to the matrix of Equation 4, forward DST-7 is derived.

DST-7 (N×N DST-7) for a length N may be expressed by using a DFT having a length of 2N+1 as shown in Equation 5 below.

$$(S_N^{VII})^T = R\mathcal{J}[F_{2N+1}]QP, \quad \text{[Equation 5]}$$

$$[R]_{n,k} = \begin{cases} -1, & \text{if } k = 2n+1, n = 0, 1, \ldots, N-1 \\ 0, & \text{otherwise} \end{cases},$$

$$\text{where } Q = \begin{pmatrix} 0^T \\ I_N \\ -J_N \end{pmatrix}, \text{ and}$$

$$[P]_{n,k} = \begin{cases} 1, & \text{if } k+1 = 2(n+1), \quad n = 0, 1, \ldots, N/2-1 \\ 1, & \text{if } k+1 = 2(N-n)-1, \quad n = N/2, \ldots, N-1 \\ 0, & \text{otherwise} \end{cases}$$

In Equation 5, R represents an N× (2N+1) matrix (the number of rows x the number of columns), and Q represents a (2N+1)×N matrix, and P represents an N×N matrix. IN represents an N×N identity matrix, and JN represents $$[J_N]_{ij,i,j=0,\ldots,N-1} = \begin{cases} 1, & j = N-1-i \\ 0, & \text{otherwise} \end{cases}.$$

In Equation 5, $\Im[F_{2N+1}]$ means a function of outputting an imaginary number part for a value to which the DFT having the length of 2N+1 is applied. When an output vector y having a length of N is outputted by applying the forward DST-7 to an input vector having the length of N as shown in Equation 6 below, an output vector shown in Equation 7 may be stepwise acquired by applying the DST-7 of Equation 5 to the input vector x.

$$y = (S_N^{VII})^T x = R\mathcal{J}[F_{2N+1}]QPx \quad \text{[Equation 6]}$$

$$z = QPx, x = (x(0)\ x(1)\ \cdots\ x(N-1))^T, \quad \text{[Equation 7]}$$
$$z = (z(0)\ z(1)\ \cdots\ z(2N))^T$$
$$Z(k) = \frac{1}{\sqrt{2N+1}} \sum_{n=0}^{2N} z(n) W_{2N+1}^{nk},$$
$$W_{2N+1} = e^{-j\frac{2\pi}{2N+1}}, Z = (Z(0)\ Z(1)\ \cdots\ Z(2N))^T$$
$$Z(k) = Z_R(k) + jZ_I(k), k = 0, 1, \ldots, 2N$$
$$Z_R = (Z_R(0)\ Z_R(1)\ \cdots\ Z_R(2N))^T,$$
$$Z_I = (Z_I(0)\ Z_I(1)\ \cdots\ Z_I(2N))^T$$
$$y = RZ_I$$

The inverse DST-7 may be the same as a matrix of forward DST-6 in terms of an equation, and may be expressed through the DFT having the length of 2N+1 as in Equation 5. Equation 8 below shows expression of the inverse DST-7 through the DFT having the length 2N+1, and is the same as Equation 5 in terms of a structure except for matrixes R, Q, and p (established when N is an even number).

$$S_N^{VII} = R\mathcal{J}[F_{2N+1}]QP, \quad \text{[Equation 8]}$$

$$[R]_{n,k} = \begin{cases} 1, & \text{if } k = n+1, n = 1, 3, \ldots, N-1 \\ 1, & \text{if } k = n+1, n = 0, 2, \ldots, N-2 \\ 0, & \text{otherwise} \end{cases}$$

$$\text{where } Q = \begin{pmatrix} 0^T \\ H_N \\ -I_N \end{pmatrix}, \text{ and}$$

$$[P]_{n,k} = \begin{cases} 1, & \text{if } k = n, n = 0, 1, \ldots, N-1 \\ 0, & \text{otherwise} \end{cases}$$

Since a trigonometric transform having a length of an even number is applied in a video coding system such as joint exploration model (JEM) or versatile video coding (VVC), for example, each of the 33-point DFT and the 65-point DFT which may be applied to the DST-7 having the length of 8, 16, 32, or 64 may be expressed as an 1D DFT as shown in Equations 9 and 10. Equation 11 shows a general DFT having the length of N.

$$X(k) = \frac{1}{2 \cdot 16 + 1} \sum_{n=0}^{32} x(n)W_N^{nk}, W_N = e^{-j(2\pi/33)} \quad \text{[Equation 9]}$$

$$X(k) = \frac{1}{\sqrt{2 \cdot 32 + 1}} \sum_{n=0}^{64} x(n)W_N^{nk}, W_N = e^{-j(2\pi/65)} \quad \text{[Equation 10]}$$

$$X(k) = \frac{1}{\sqrt{N}} \sum_{n=0}^{N-1} x(n)W_N^{nk}, W_N = e^{-j(2\pi/M)} \quad \text{[Equation 11]}$$

Equation 7 shows a processing of applying the DFT having the length of 2N+1 for implementation of N×N DST-7, but the length of N is used in stead of the length of 2N+1 for convenience of writing, in the following contents including Equation 9 and Equation 10. Accordingly, an appropriate writing conversion may be requested when the DFT is applied by using Equations 5 and 8.

Further, each of a 1D 33-point DFT and a 1D 65-point DFT may be expressed as an equivalent 2D DFT through a simple input/output data conversion, and each corresponding equation is shown in Equations 12 and 13 below.

$$\hat{X}(k_1, k_2) = \frac{1}{2 \cdot 16 + 1} \sum_{n_2=0}^{10} \sum_{n_1=0}^{2} \hat{x}(n_1, n_2) W_3^{n_1 k_1} W_{11}^{n_2 k_2} = \quad \text{[Equation 12]}$$

$$\sum_{n_2=0}^{10} \hat{y}(k_1, n_2) W_{11}^{n_2 k_2}$$

$$\hat{X}(k_1, k_2) = \frac{1}{\sqrt{2 \cdot 32 + 1}} \sum_{n_2=0}^{12} \sum_{n_1=0}^{4} \hat{x}(n_1, n_2) W_5^{n_1 k_1} W_{13}^{n_2 k_2} = \quad \text{[Equation 13]}$$

$$\sum_{n_2=0}^{12} \hat{y}(k_1, n_2) W_{13}^{n_2 k_2}$$

A relationship between 2D indexes in Equations 12 and 13 and 1D indexes in Equations 10 and 11 may be shown in Equations 14 to 17 below. Equations 14 and 16 may be applied to the 33-point DFT and Equations 15 and 17 may be applied to the 65-point DFT.

$$n = \langle 22n_1 + 12n_2 \rangle_{33} \quad \text{[Equation 14]}$$
$$k = \langle 11k_1 + 3k_2 \rangle_{33}$$

$$n = \langle 26n_1 + 40n_2 \rangle_{65} \quad \text{[Equation 15]}$$
$$k = \langle 13k_1 + 5k_2 \rangle_{65}$$

$$\hat{x}(n_1, n_2) = x(\langle 22n_1 + 12n_2 \rangle_{33}) \quad \text{[Equation 16]}$$
$$\hat{X}(k_1, k_2) = X(\langle 11k_1 + 3k_2 \rangle_{33})$$

$$\hat{x}(n_1, n_2) = x(\langle 26n_1 + 40n_2 \rangle_{65}) \quad \text{[Equation 17]}$$
$$\hat{X}(k_1, k_2) = X(\langle 13k_1 + 5k_2 \rangle_{65})$$

In Equations 14, 15, 16, and 17, $\langle x \rangle_N$=xmod N. However, a relational equation of Equation 14, 15, 16, or 17 is not a unique relational equation constituting the 2D DFT equivalent to the 1D DFT. When a condition of Equation 18 below is satisfied, the equivalent 2D DFT may be constituted as in Equations 12 and 13.

$$N = N_1 N_2, \text{ where } N_1 \text{ and } N_2 \text{ are mutually prime factors} \quad \text{[Equation 18]}$$
$$n = \langle K_1 n_1 + K_2 n_2 \rangle_N$$
$$k = \langle K_3 k_1 + K_4 k_2 \rangle_N$$
$$\langle K_1 K_3 \rangle_N = N_2$$
$$\langle K_2 K_4 \rangle_N = N_1$$
$$\langle K_1 K_4 \rangle_N = \langle K_2 K_3 \rangle_N = 0$$

The 33-point 1D DFT corresponds to a case of (N1, N2)=(3, 11) and the 65-point 1D DFT corresponds to a case of (N1, N2)=(5, 13), and since N1 and N2 are mutually prime factors in both cases, Equation 18 may be applied. If K1, K2, K3, (and K4 satisfy Equation 19 below, a condition $\langle K_1 K_4 \rangle_N = \langle K_2 K_3 \rangle_N = 0$ is satisfied in Equation 18.

$$K_1 = \alpha N_2, K_2 = \beta N_1, K_3 = \gamma N_2, K_4 = \delta N_1 \quad \text{[Equation 19]}$$

A relational equation in Equation 20 below should be satisfied in order for other conditions in Equation 18 to be satisfied.

$$\langle \alpha\gamma N_2\rangle_{N_1} = 1, \langle \beta\delta M_1\rangle_{N_2} = 1 \quad \text{[Equation 20]}$$

Accordingly, K1, K2, K3, and K4 satisfying Equation 18 are derived by Equation 19 from all of $\alpha$, $\beta$, $\gamma$, and $\delta$ satisfying Equation 20, and as a result, the equivalent 2D DFT may be constituted. Possible examples of $\alpha$, $\beta$, $\gamma$, and $\delta$ are shown below.

1) $(\alpha, \beta, \gamma, \delta) = (2, 4, 1, 1)$
Corresponds to Equation 14 and is a case of $(N1, N2)=(3, 11)$.
2) $(\alpha, \beta, \gamma, \delta) = (2, 8, 1, 1)$
Corresponds to Equation 15 and is a case of $(N1, N2)=(5, 13)$.
3) $(\alpha, \beta, \gamma, \delta) = (1, 1, 2, 4)$
Is a case of $(N1, N2)=(3, 11)$.
4) $(\alpha, \beta, \gamma, \delta) = (1, 1, 2, 8)$
Is a case of $(N1, N2)=(5, 13)$.

That is, in respect to a DFT for a length of N (N=N1N2, N1 and N2 are relative primes), a 2D DFT shown in Equation 21 below may be calculated by an index transform (i.e., a transform between a 1D index and a 2D index) satisfying Equations 18, 19, and 20.

$$\hat{X}(k_1, k_2) = \frac{1}{\sqrt{N}} \sum_{n_2=0}^{N_2-1} \sum_{n_1=0}^{N_1-1} \hat{x}(n_1, n_2) W_{N_1}^{n_1 k_1} W_{N_2}^{n_2 k_2} = \sum_{n_2=0}^{N_2-1} \hat{y}(k_1, n_2) W_{N_2}^{n_2 k_2} \quad \text{[Equation 21]}$$

An operation is performed for DFTs decomposed into a short length by using the 2D DFT shown in Equation 21 to significantly reduce a calculation amount as compared with the equivalent 1D DFT.

The following relational equations may be established between the signals (vectors) of Equations 12, 13, and 21, from the relational equation between the DST-7 and the DFT presented in Equations 5 and 8 and index transforms in FIGS. 14 to 17. Further, even when Equations 18, 19, and 20 between the indexes are satisfied, the following relational equations may be established.

$$\hat{y}(k_1, n_2) = \hat{y}_R(k_1, n_2) + j \cdot \hat{y}_I(k_1, n_2) \quad \text{[Equation 22]}$$
$$\hat{x}(n_1, n_2) = \hat{x}_R(n_1, n_2) + j \cdot \hat{x}_I(n_1, n_2)$$
$$\hat{X}(k_1, k_2) = \hat{X}_R(k_1, k_2) + j \cdot \hat{X}_I(k_1, k_2)$$

$$\hat{y}_R(2, n_2) = \hat{y}_R(1, n_2) \quad \text{[Equation 23]}$$
$$\hat{y}_I(0, n_2) = 0, \hat{y}_I(2, n_2) = -\hat{y}_I(1, n_2)$$

$$\hat{y}_R(3, n_2) = \hat{y}_R(2, n_2), \hat{y}_R(4, n_2) = \hat{y}_R(1, n_2) \quad \text{[Equation 24]}$$
$$\hat{y}_I(0, n_2) = 0, \hat{y}_I(3, n_2) = -\hat{y}_I(2, n_2),$$
$$\hat{y}_I(4, n_2) = -\hat{y}_I(1, n_2)$$

$$\hat{y}_R(k_1, n_2) = -\hat{y}_R(k_1, n'_2) \quad \text{[Equation 25]}$$
$$\hat{y}_I(k_1, n_2) = \hat{y}_I(k_1, n'_2)$$

In Equation 25, $n_2=11-n'_2$, $n'_2=1, 2, \ldots, 10$ may be established for the 33-point DFT and $n_2=13-n'_2$, $n'_2=1, 2, \ldots, 12$ may be established for the 65-point DFT.

$$\hat{y}_R(k_1, 0) = 0, \hat{y}_R(k_1, 6) = -\hat{y}_R(k_1, 5), \quad \text{[Equation 26]}$$
$$\hat{y}_R(k_1, 7) = -\hat{y}_R(k_1, 4),$$
$$\hat{y}_R(k_1, 8) = -\hat{y}_R(k_1, 3),$$
$$\hat{y}_R(k_1, 9) = -\hat{y}_R(k_1, 2), \hat{y}_R(k_1, 10) = -\hat{y}_R(k, 1)$$

$$\hat{y}_R(k_1, 0) = 0, \hat{y}_R(k_1, 7) = -\hat{y}_R(k_1, 6), \quad \text{[Equation 27]}$$
$$\hat{y}_R(k_1, 8) = -\hat{y}_R(k_1, 5), \hat{y}_R(k_1, 9) = -\hat{y}_R(k_1, 4),$$
$$\hat{y}_R(k_1, 10) = -\hat{y}_R(k_1, 3),$$
$$\hat{y}_R(k_1, 11) = -\hat{y}_R(k_1, 2), \hat{y}_R(k_1, 12) = -\hat{y}_R(k_1, 1)$$

Equation 26 is established for the 33-point DFT and Equation 27 is established for the 65-point DFT $$\hat{y}_I(k_1, 6) = \hat{y}_I(k_1, 5), \hat{y}_I(k_1, 7) = \hat{y}_I(k_1, 4), \quad \text{[Equation 28]}$$
$$\hat{y}_I(k_1, 8) = \hat{y}_I(k_1, 3), \hat{y}_I(k_1, 9) = \hat{y}_I(k_1, 2),$$
$$\hat{y}_I(k_1, 10) = \hat{y}_I(k_1, 1)$$

$$\hat{y}_I(k_1, 7) = \hat{y}_I(k_1, 6), \hat{y}_I(k_1, 8) = \hat{y}_I(k_1, 5), \quad \text{[Equation 29]}$$
$$\hat{y}_I(k_1, 9) = \hat{y}_I(k_1, 4),$$
$$\hat{y}_I(k_1, 10) = \hat{y}_I(k_1, 3),$$
$$\hat{y}_I(k_1, 11) = \hat{y}_I(k_1, 2), \hat{y}_I(k_1, 12) = \hat{y}_I(k_1, 1)$$

Equation 28 is established for the 33-point DFT and Equation 29 is established for the 65-point DFT.

Further, when $\hat{Y}(k_1)=[\hat{y}(k_1,0)\ \hat{y}(k_1,1) \ldots \hat{y}(k_1,N_2-1)]^T = \hat{Y}_R(k_1)+j\cdot\hat{Y}_I(k_1)$ is written as a vector for $\hat{y}(k_1,n_2)$ the relational equation shown in Equation 30 is satisfied.

$$\text{Case 1: } \hat{Y}_I(k_1) = 0 \quad \text{[Equation 30]}$$
$$\text{Case 2: } \hat{Y}_R(k_1) = \hat{Y}_R(k'_1), \hat{Y}_I(k_1) = -\hat{Y}_I(k'_1)$$

A range of k1 for the 33-point DFT (or 65-point DFT) is 0, 1, and 2 (or 0, 1, 2, 3, and 4), and Case 1 of Equation 30 corresponds to a case of k1=0. Case 2 of Equation 30 corresponds to a case of k1=3−k1' and k1'=1, 2 for the 33-point DFT (a case of k1=5−k1' and k1'=1, 2, 3, 4). In the present disclosure, a subscript R means a real number part and a subscript I means the imaginary number part. Further, relational equations of Equations 31 to 34 below may be established even between final imaginary number part outputs of the 2D DFT with respect to Case 1 and Case 2. Equations 31 and 33 are applied to the 33-point DFT and Equations 32 and 34 are applied to the 65-point DFT.

Case 1:

$$\hat{X}_I(k_1, 0) = 0, \hat{X}_I(k_1, 11-k_2) = -\hat{X}_I(k_1, k_2), \quad \text{[Equation 31]}$$
$$k_2 = 1, 2, \ldots, 10$$

$$\hat{X}_I(k_1, 0) = 0, \hat{X}_I(k_1, 13-k_2) = -\hat{X}_I(k_1, k_2), \quad \text{[Equation 32]}$$
$$k_2 = 1, 2, \ldots, 12$$

Case 2:
$$\hat{X}_1(k_1,0)=-\hat{X}_1(3-k_1,0), \hat{X}_1(k_1,k_2)=-\hat{X}_1(3-k_1,11-k_2),$$
$$k_1=1,2, k_2=1,2,\ldots,10 \quad \text{[Equation 33]}$$

$$\hat{X}_1(k_1,0)=-\hat{X}_1(5-k_1,0), \hat{X}_1(k_1,k_2)=-\hat{X}_1(5-k_1,13-k_2),$$
$$k_1=1,2,3,4, k_2=1,2,\ldots,12 \quad \text{[Equation 34]}$$

Further, relational equations 35 and 36 below may be established even between input data. Equation 35 is applied to the 33-point DFT and Equation 36 is applied to the 65-point DFT. In Equation 35 (Equation 36), Case 1 may occur when n2=0 and Case 2 may occur when n2=11−n2', n2'=1, 2, . . . , 10 (n2=13−n2', n2'=1, 2, . . . , 12).

Case 1: $x(0,n_2)=0, x((2,n_2)=-x(1,n_2)$

Case 2: $x(0,n_2)=-x(0,n'_2), x(1,n_2)=-x(2,n'_2), x(2,n_2)= -x(1,n'_2)$ for some $n'_2$ [Equation 35]

Case 1: $x(0,n_2)=0, x(3,n_2)=-x(2,n_2), x(4,n_2)=-x(1,n_2)$

Case 2: $x(0,n_2)=-x(0,n'_2), x(1,n_2)=-x(4,n'2), x(2,n_2)= -x(3,n'_2), x(3,n_2)=-x(2,n'_2), x(4,n_2)=-x(1,n'_2)$ for some $n'_2$ [Equation 36]

A calculation amount required for a DFT operation may be significantly reduced by using a symmetry presented through Equations 23 to 36. When only an operation block required for applying Equations 23 to 36 is considered, the 16×16 DST-7 adopting the 33-point DFT and the 32×32 DST-7 adopting the 65-point DFT may be expressed as illustrated in FIGS. 27 and 28.

In each of FIGS. 27 and 28, a first DFT stage is a 3-point DFT or a 5-point DFT. A general DFT for the first DFT stage is shown in Equation 37 below.

$$\hat{y}(k_1, n_2) = \quad \text{[Equation 37]}$$

$$\hat{y}_R(k_1, n_2) + j \cdot \hat{y}_I(k_1, n_2) = \sum_{n_1=0}^{N_1-1} \hat{x}(n_1, n_2) W_{N_1}^{n_1 k_1}$$

$$\hat{y}_R(k_1, n_2) = \sum_{n_1=0}^{N_1-1} \hat{x}(n_1, n_2) \cos\left(\frac{2\pi k_1 n_1}{N_1}\right)$$

$$\hat{y}_I(k_1, n_2) = -\sum_{n_1=0}^{N_1-1} \hat{x}(n_1, n_2) \sin\left(\frac{2\pi k_1 n_1}{N_1}\right)$$

In the following equations including Equation 37, although not particularly mentioned, scaling values $$\left(\text{i.e., } \frac{1}{\sqrt{N}}, \frac{1}{\sqrt{2 \cdot 16+1}}, \frac{1}{\sqrt{2 \cdot 32+1}}\right)$$

of Equations 12, 13, and 21 are omitted. However, the scaling values may be reflected even in any stage of the transform.

In Equation 37, in the case of N1=3, the first DFT stage becomes the 3-point DFT and in the case of N1=5, the first DFT stage becomes the 5-point DFT. The DFT operation is required only for a case where n2 of Equation 37 is 0 to (N2−1)/2 by the symmetry presented in Equation 25 (When N1=3, N2=11 and when N1=5, N2=13).

Case 1 in Equation 35 and Case 1 in Equation 36 correspond to Simplified 3-pt DFT Type 1 in FIG. 27 and Simplified 5-pt DFT Type 1 in FIG. 28, respectively, and this corresponds to a case of n2=0. Simplified 3-pt DFT Type 1 is given as in Equation 38 (Case 1 relational equation in Equation 35 is substituted in Equation 37).

$$\hat{y}_R(k_1, 0) = 0, \hat{y}_I(k_1, 0) = -2\hat{x}(1, 0) \sin\left(\frac{2\pi k_1}{3}\right) \quad \text{[Equation 38]}$$

Since the calculation is required only in a case of k1=1 in Equation 38 (due to the symmetry in Equation 23), only one multiplication is required. The equation for Simplified 5-pt DFT Type 1 is shown in Equation 38 below by the same method.

$$\hat{y}_R(k_1, 0) = 0, \quad \text{[Equation 39]}$$

$$\hat{y}_I(k_1, 0) = -2\hat{x}(1, 0) \sin\left(\frac{2\pi k_1}{5}\right) - 2\hat{x}(2, 0) \sin\left(\frac{2\pi k_1 \cdot 2}{5}\right)$$

Since the calculation is required only in a case of k1=1, 2 in Equation 39 (due to the symmetry in Equation 24), only two multiplications are required. Further, since 2 in Equations 38 and 39 is able to be processed by a left shift operation, 2 is not counted by the multiplication.

Case 2 in Equation 35 and Case 2 in Equation 36 correspond to Simplified 3-pt DFT Type 1 in FIG. 27 and Simplified 5-pt DFT Type 1 in FIG. 28, respectively, and correspond to cases of n2=1 to 5 and n2=1 to 6, respectively. Simplified 3-pt DFT Type 2 may be implemented through Equation 37. Here, when the symmetry of Equation 23 is used, $\hat{y}_R(k_1, n_2)$ is obtained only in the case of k1=0, 1 and $\hat{y}_I(k_1, n_2)$ is obtained only in the case of k1=1. Similarly, Simplified 5-pt DFT Type 2 may also be implemented through Equation 37. Similarly, when the symmetry of Equation 24 is used, $\hat{y}_n(k_1, n_2)$ is obtained only in the case of k1=0, 1, 2 and $\hat{y}_I(k_1, n_2)$ is obtained only in the case of k1=1, 2.

In FIGS. 27 and 28, a second DFT stage is an 11-point DFT or a 13-point DFT. The general DFT for the second DFT stage is shown in Equation 40 below.

$$\hat{X}(k_1, k_2) = \quad \text{[Equation 40]}$$

$$\hat{X}_R(k_1, k_2) + j \cdot \hat{X}_I(k_1, k_2) = \sum_{n_2=0}^{N_2-1} \hat{y}(k_1, n_2) W_{N_2}^{n_2 k_2}$$

$$\hat{X}_I(k_1, k_2) =$$

$$\sum_{n_2=0}^{N_2-1} \left[\hat{y}_I(k_1, n_2) \cos\left(\frac{2\pi k_2 n_2}{N_2}\right) - \hat{y}_R(k_1, n_2) \sin\left(\frac{2\pi k_2 n_2}{N_2}\right)\right]$$

In Equation 40, in the case of N2=11, the second DFT stage is the 11-point DFT and in the case of N2=13, the second DFT stage is the 13-point DFT. Due to the symmetry presented in Equations 30, 31, 32, 33, and 34, the DFT is calculated only for a case where k1 is in the range of 0 to (N1−1)/2 in Equation 40 (when N2=11, N1=3 and when N2=13, N1=5).

Case 1 in Equation 30 and Equation 31 correspond to Simplified 11-point DFT Type 1 of FIG. 27. Further, Case 1 in Equation 30 and Equation 32 correspond to Simplified 13-point DFT Type 1 of FIG. 28. When the symmetry presented in Equations 26, 27, 28, and 29 is used, Simplified 11-point DFT Type 1 and Simplified 13-point DFT Type 1 may be obtained as in Equation 41 below (corresponds to a case of k1=0).

$$\hat{X}_I(0, k_2) = \sum_{n_2=1}^{\frac{N_2-1}{2}} [-2\hat{y}_R(0, n_2)] \sin\left(\frac{2\pi k_2 n_2}{N_2}\right) = \quad \text{[Equation 41]}$$

$$-2 \sum_{n_2=1}^{\frac{N_2-1}{2}} \hat{y}_R(0, n_2) \sin\left(\frac{2\pi k_2 n_2}{N_2}\right)$$

According to Equation 41, in the case of Simplified 11-point DFT Type 1, five multiplications are required and in the case of Simplified 13-point DFT Type 1, six multiplications are required.

Similarly, when the symmetry presented in Equations 26, 27, 28, and 29 is used, Simplified 11-point DFT Type 2 and Simplified 13-point DFT Type 2 may be obtained as in Equation 42. Simplified 11-point DFT Type 2 may be performed when k1=1 and Simplified 13-point DFT Type 2 may be performed when k1=1, 2.

$$\hat{X}_I(k_1, k_2) = 2\left[\sum_{n_2=1}^{\frac{N_2-1}{2}} \hat{y}_I(k_1, n_2) \cos\left(\frac{2\pi k_2 n_2}{N_2}\right)\right] + \quad \text{[Equation 42]}$$

$$\hat{y}_I(k_1, 0) - 2\left[\sum_{n_2=1}^{\frac{N_2-1}{2}} \hat{y}_R(k_1, n_2) \sin\left(\frac{2\pi k_2 n_2}{N_2}\right)\right]$$

According to Equation 42, 10 multiplications may be required for Simplified 11-point DFT Type 2 and 12 multiplications may be required for Simplified 13-point DFT Type 2.

In the multiplications in Equations 38, 39, 40, 41, and 42, cosine values and sine values which are DFT kernel coefficients are multiplied. Since available N1 and N2 values are 3, 5, 11, and 13, coefficient values in Equation 43 below may be applied to the corresponding multiplication. A case of i=0 is excluded because the corresponding cosine or sine value is 0 or 1.

$$\cos\left(\frac{2\pi i}{3}\right), \sin\left(\frac{2\pi i}{3}\right), i = 1, 2 \quad \text{[Equation 43]}$$

$$\cos\left(\frac{2\pi i}{5}\right), \sin\left(\frac{2\pi i}{5}\right), i = 1, 2, 3, 4$$

$$\cos\left(\frac{2\pi i}{11}\right), \sin\left(\frac{2\pi i}{11}\right), i = 1, 2, 3, 4, 5$$

$$\cos\left(\frac{2\pi i}{13}\right), \sin\left(\frac{2\pi i}{13}\right), i = 1, 2, 3, 4, 5, 6$$

Since an n2 index increases up to (N2−1)/2 in Equations 41 and 42, an i value is limited up to (N2−1)/2 for last two cases in Equation 43. The total number of coefficients in Equation 43 becomes 2×(2+4+5+6)=34, and 2×(2+5)=14 coefficients are required for the 33-point DFT and 2×(4+6)=20 coefficients are required for the 65-point DFT. Each coefficient may be approximated to an integer form through scaling or rounding, and input data of the DST-7 (in a video codec) is integer-form residual data, and as a result, all associated calculations may be performed as the integer operation. Since intermediate resultant values generated during an operation process are also scaled values, appropriately applying down scaling is required in each calculation step or output step. Approximation using the integer operation will be described through the following embodiment.

Further, since forms in which the cosine value and the sine value are referenced are $$\cos\left(\frac{2\pi k_1 n_1}{N_1}\right), \sin\left(\frac{2\pi k_1 n_1}{N_1}\right), \cos\left(\frac{2\pi k_2 n_2}{N_2}\right), \text{ and } \sin\left(\frac{2\pi k_2 n_2}{N_2}\right),$$

a reference order of coefficient values may vary depending on k1 and k2 values. Accordingly, a table having k1 and k2 values as addresses may be constituted, and a reference order according to n1 and n2 may be acquired in a table look-up form. For example, when N2=11 and k2=3, $$\lfloor \langle k_2 n_2 \rangle_{N_2} \rfloor_{n_2=1,2,...,5} = [3, 6, 9, 1, 4]$$

may become an entry of the corresponding table, and the corresponding table entry may be configured for all available k2 values.

In FIGS. 27 and 28, blocks represented by reference numerals 16 and 32 respectively represent modules that perform permutation and code conversion of data. Through the index transform presented in Equations 14 and 15 and the symmetry of the input data presented in Equations 35 and 36, Simplified 3-point DFT Type 1, Simplified 3-point DFT Type 2, Simplified 5-point DFT Type 1, and Simplified 5-point DFT Type 2 blocks in FIGS. 27 and 28 may receive corresponding data, respectively, and some data are input after codes of some data are converted due to the symmetry in Equations 35 and 36. The symmetry presented in Equations 35 and 36 is caused by Q and P matrices in Equations 5 and 8. In a similar scheme, outputs of Simplified 11-point DFT Type 1, Simplified 11-point DFT Type 2, Simplified 13-point DFT Type 1, and Simplified 13-point DFT Type 2 in FIGS. 27 and 28 may be reordered through the index transform presented in Equations 16 and 17 and the symmetrical relationships above described, and the codes of some data may be converted due to the symmetry presented in Equations 31 to 34.

Implementation of DST-7 through scaling method

Simplified 3-point DFT Type 2 of FIG. 27 and Simplified 5-point DFT Type 2 of FIG. 28 are calculated through Equation 37. More specifically, Simplified 3-point DFT Type 2 and Simplified 5-point DFT Type 2 of FIG. 28 correspond to a case where n2 is not 0 in Equation 37, and as in the above-described embodiment, there may be a case where $$\cos\left(\frac{2\pi k_1 n_1}{N_1}\right) \text{ and } \sin\left(\frac{2\pi k_1 n_1}{N_1}\right)$$

have the same absolute value depending on the n1 value. Accordingly, even though the n1 value increases from 0 to N1−1 as in Equation 37, N1 multiplications may not be required. When n2 is not 0 in Equation 37 (i.e., for Simplified 3-point DFT Type 2 of FIG. 27 and Simplified 5-point DFT Type 2 of FIG. 28), a scaling value A/B may be applied as in Equation 44.

$$\frac{A}{B}\hat{y}_R(k_1, n_2) = \frac{A}{B}\sum_{n_1=0}^{N_1-1} \hat{x}(n_1, n_2) \cos\left(\frac{2\pi k_1 1}{N_1}\right) = \quad \text{[Equation 44]}$$

$$\frac{1}{B}\sum_{n_1=0}^{N_1-1} \hat{x}(n_1, n_2)\left[A \cos\left(\frac{2\pi k_1 n_1}{N_1}\right)\right]$$

$$\frac{A}{B}\hat{y}_I(k_1, n_2) = -\frac{A}{B}\sum_{n_1=0}^{N_1-1} \hat{x}(n_1, n_2) \sin\left(\frac{2\pi k_1 1}{N_1}\right) =$$

$$\frac{1}{B}\left[-\sum_{n_1=0}^{N_1-1} \hat{x}(n_1, n_2)\left[A \sin\left(\frac{2\pi k_1 n_1}{N_1}\right)\right]\right]$$

Since the absolute value of $$\cos\left(\frac{2\pi k_1 n_1}{N_1}\right) \text{ or } \sin\left(\frac{2\pi k_1 n_1}{N_1}\right)$$

is a floating point number equal to or smaller than 1 as in Equation 44, when an appropriate A value is multiplied, an integer value or a floating point number having sufficient accuracy may be generated. 1/B multiplied last in Equation 44 may be calculated by the shift operation according to a B value.

Equation 38 and Equation 39 as a case of n2=0 may be applied in Simplified 3-point DFT Type 1 and Simplified 5-point DFT Type 1 of FIG. 28, respectively. When Equations 38 and 39 are multiplied by A/2B instead of A/B, multiplication results are shown in Equations 45 and 46 below.

$$\frac{A}{2B}\hat{y}_R(k_1, 0) = 0, \quad \frac{A}{2B}\hat{y}_I(k_1, 0) = \frac{1}{B}\left[-\hat{x}(1, 0)\left[A\sin\left(\frac{2\pi k_1}{3}\right)\right]\right] \quad \text{[Equation 45]}$$

$$\frac{A}{2B}\hat{y}_R(k_1, 0) = 0, \quad \frac{A}{2B}\hat{y}_I(k_1, 0) = \quad \text{[Equation 46]}$$
$$\frac{1}{B}\left[-\hat{x}(1, 0)\left[A\sin\left(\frac{2\pi k_1}{5}\right)\right] - \hat{x}(2, 0)\left[A\sin\left(\frac{2\pi k_1}{5}\right)\right]\right]$$

In Equations 45 and 46, the integer or floating point number having sufficient accuracy may be generated by multiplying $$\cos\left(\frac{2\pi k_1 n_1}{N_1}\right) \text{ or } \sin\left(\frac{2\pi k_1 n_1}{N_1}\right)$$

by the A value, and 1/B multiplied last may be also calculated only by the shift operation according to the B value.

The operation (corresponding to the case of k1=0) of Equation 41 may be performed for Simplified 11-point DFT Type 1 and Simplified 13-point DFT Type 1 and, when a C/2D value is applied to Equation 41 as the scaling value, Equation 47 below may be acquired.

$$\frac{C}{2D}\hat{X}_I(0, k_2) = \frac{1}{D}\sum_{n_2=1}^{\frac{N_2-1}{2}} [-\hat{y}_R(0, n_2)]\left[C\sin\left(\frac{2\pi k_2 n_2}{N_2}\right)\right] \quad \text{[Equation 47]}$$

$$\frac{A}{B}\frac{C}{2D}\hat{X}_I(0, k_2) = \frac{1}{D}\sum_{n_2=1}^{\frac{N_2-1}{2}} \left[-\frac{A}{B}\hat{y}_R(0, n_2)\right]\left[C\sin\left(\frac{2\pi k_2 n_2}{N_2}\right)\right]$$

Since $$\sin\left(\frac{2\pi k_2 n_2}{N_2}\right)$$

may be multiplied by a C value as in Equation 45, an integer or fixed point operation may be applied. When A/B which is the scaling value multiplied in Equation 44 is considered, a total scaling value by which $\hat{X}_I(0, k_2)$, which is one of final result data, is multiplied is (A/B)*(C/2D) as in Equation 47. Further, a $$\frac{A}{B}\hat{y}_R(0, n_2)$$

value calculated from Equation 44 may be directly applied as an input as in Equation 47.

Simplified 11-point DFT Type 2 and Simplified 13-point DFT Type 2 may be calculated through Equation 42 (Simplified 11-point DFT Type 2 is calculated when k1=1 and Simplified 13-point DFT Type 2 is calculated when k1=1, 2), and when C/2D is multiplied as the scaling value as in Equation 47, Equation 48 below may be acquired.

$$\frac{C}{2D}\hat{X}_I(k_1, k_2) = \quad \text{[Equation 48]}$$
$$\left[\frac{1}{D}\sum_{n_2=1}^{\frac{N_2-1}{2}} \tilde{y}_I(k_1, k_2)\left[C\cos\left(\frac{2\pi k_2 n_2}{N_2}\right)\right]\right] + \frac{C}{2D}\hat{y}_I(k_1, 0) +$$
$$\left[\frac{1}{D}\sum_{n_2=1}^{\frac{N_2-1}{2}} [-\hat{y}_R(k_1, n_2)]\left[C\sin\left(\frac{2\pi k_2 n_2}{N_2}\right)\right]\right]$$

$$\frac{A}{B}\frac{C}{2D}\hat{X}_I(k_1, k_2) = \left[\frac{1}{D}\sum_{n_2=0}^{\frac{N_2-1}{2}} \tilde{y}_I(k_1, n_2)\left[C\cos\left(\frac{2\pi k_2 n_2}{N_2}\right)\right]\right] +$$
$$\left[\frac{1}{D}\sum_{n_2=1}^{\frac{N_2-1}{2}} \left[-\frac{A}{B}\hat{y}_R(k_1, n_2)\right]\left[C\sin\left(\frac{2\pi k_2 n_2}{N_2}\right)\right]\right]$$

$$\text{where } \tilde{y}_I(k_1, n_2) = \begin{cases} \frac{A}{2B}\hat{y}_I(k_1, 0), & \text{if } n_2 = 0 \\ \frac{A}{B}\hat{y}_I(k_1, n_2), & \text{otherwise} \end{cases}$$

In Equation 48

$$\sin\left(\frac{2\pi k_2 n_2}{N_2}\right) \text{ and } \cos\left(\frac{2\pi k_2 n_2}{N_2}\right)$$

are multiplied by the C value, as in Equation 47. Accordingly, an integer or floating point operation may be used in the multiplication of the cosine value and the sine value. When both the A/B value multiplied in Equation 44 and A/2B multiplied in Equation 45 are considered as in Equation 47, a second equation in Equation 48 may be derived. When $\tilde{y}_1(k_1, n_2)$ is defined in the same manner as Equation 48, the values acquired through Equations 44, 45, and 46 may be used as input data of Equation 48.

A k2 value available in Equation 48 is 0 to 10 in the case of Simplified 11-point DFT Type 2 and 0 to 12 in the case of Simplified 13-point DFT Type 2. A relational equation shown in Equation 49 may be established due to the symmetry in the cosine value and the sine value.

$$f(k_1, k_2) = \frac{1}{D}\sum_{n_2=0}^{\frac{N_2-1}{2}} \tilde{y}_I(k_1, n_2)\left[C\cos\left(\frac{2\pi k_2 n_2}{N_2}\right)\right] \quad \text{[Equation 49]}$$

$$g(k_1, k_2) = \frac{1}{D}\sum_{n_2=0}^{\frac{N_2-1}{2}} \left[-\frac{A}{B}\hat{y}_R(k_1, n_2)\right]\left[C\sin\left(\frac{2\pi k_2 n_2}{N_2}\right)\right]$$

$$\frac{A}{B}\frac{C}{2D}\hat{X}_I(k_1, k_2) = f(k_1, k_2) + g(k_1, k_2) = h(k_1, k_2)$$

$$h(k_1, k_2) = \begin{cases} f(k_1, k_2), & k_2 = 0 \\ f(k_1, k_2) + g(k_1, k_2), & 1 \leq k_2 \leq \frac{N_2-1}{2} \\ f(k_1, N_2 - k_2) - g(k_1, N_2 - k_2), & \frac{N_2+1}{2} \leq k_2 \leq N_2 - 1 \end{cases}$$

In Equation 48, the N2 value for Simplified 11-point DFT Type 2 is 11 and the N2 value for Simplified 13-point DFT Type 2 is 13. Definitions for all identifiers in Equation 49 are the same as those in Equation 47. Accordingly, as in Equation 47, the calculation may be performed only in the range of $$0 \le k_2 \le \frac{N_2 - 1}{2}$$

for f(k1, k2) and the calculation may be performed only in the range of $$1 \le k_2 \le \frac{N_2 - 1}{2}$$

for g(k1, k2). Similarly, in Equation 47, the calculation may be performed only in the range of $$1 \le k_2 \le \frac{N_2 - 1}{2}$$

by the symmetry for k2.

Implementation of DST-7 using only integer or floating point operation through adjustment of scaling value All scaling values have a form of A/B, and $$\cos\left(\frac{2\pi k n}{N}\right) \text{ or } \sin\left(\frac{2\pi k n}{N}\right)$$

is first multiplied by A to enable the integer operation and 1/B may be multiplied later. Further, since the numbers of cosine values and sine values included in the entire equation are limited as in Equation 43, values acquired by multiplying the corresponding cosine values and the sine values by the A value may be stored in an array or a read-only memory (ROM) and the stored values may be used by using a table look-up scheme. Equation 44 may be expressed as in Equation 50 below.

$$\frac{A}{B}\hat{y}_R(k_1, n_2) = \frac{1}{B}\sum_{n_1=0}^{N_1-1} \hat{x}(n_1, n_2)\left[A \cos\left(\frac{2\pi k_1 n_1}{N_1}\right)\right]$$ [Equation 50]

$$\frac{A}{B}\hat{y}_I(k_1, n_2) = \frac{1}{B}\left[-\sum_{n_1=0}^{N_1-1} \hat{x}(n_1, n_2)\left[A \sin\left(\frac{2\pi k_1 n_2}{N_1}\right)\right]\right]$$

When $$A \cos\left(\frac{2\pi k n}{N}\right) \text{ or } A \sin\left(\frac{2\pi k n}{N}\right)$$

is multiplied by a sufficiently large value as the A value and then is rounded, accuracy of a value may be maintained while converting the cosine or sine value into a scaled integer value. A value ($2^n$) of a power form of 2 may be used as the A value, and for example, $$A \cos\left(\frac{2\pi k n}{N}\right) \text{ or } A \sin\left(\frac{2\pi k n}{N}\right)$$

may be approximated in a scheme shown in Equation 51 below.

$$2^n \cos\left(\frac{2\pi k n}{N}\right) \approx \text{round}\left(2^n \cos\left(\frac{2\pi k n}{N}\right)\right)$$ [Equation 51]

In Equation 51, round represents a rounding operator, any scheme of rounding for being integer is also available, and a conventional rounding method for rounding based on 0.5 may be used.

In Equation 50, multiplying by 1/B (dividing by B) may be easily implemented by a right shift operation when B is the power of 2. When B=2m, a multiplication for 1/B may be approximated as in Equation 52. As in Equation 52, the rounding may be considered or not considered.

$$\frac{x}{2^m} \approx \begin{cases} x \gg m, & \text{when rounding is not considered} \\ (x + (1 \ll (m-1)) \gg m, & \text{when rounding is considered} \end{cases}$$ [Equation 52]

The multiplied A value need not particularly have the form of the power of 2 as in Equation 51. In particular, when a scaling factor in the form of $$\frac{1}{\sqrt{N}}$$

is additionally multiplied as in Equations 12, 13, and 21, the corresponding scaling factor may be reflected to the A value. More specifically, since values multiplied by numerators are A and C in Equations 47, 48, and 49, any one of A or C may be multiplied by $$\frac{1}{\sqrt{N}}$$

or when $$\frac{1}{\sqrt{N}} = \alpha\beta,$$

A may be multiplied by α and C may be multiplied by β. As an example in which A is not the power of 2, a value such as $2^{1/2}$ may be multiplied, and the reason is that $2^{1/2}$ may be additionally multiplied in order to maintain a range of kernel coefficient values equally with respect to all sizes of transforms in an actual codec system such as JEM/VVC.

An example of approximation implementation for a scaling factor multiplication in DST-7 for lengths 8, 16, and 32 may be shown in Table 2. A, B, C, and D of Table 2 are the same as A, B, C, and D of Equations 45 to 49, and shift is a value applied to a DST-7 function as a factor and may be a value determined according to an execution scheme of the quantization (dequantization) performed after the transform (before the inverse transform).

TABLE 2

| Config. | | Original | Approximation |
|---|---|---|---|
| 8x8 DST7 | 17-pt DFT | $A\sin\left(\frac{2\pi k}{17}\right), k = 1, 2, \ldots, 8$ | $\text{round}\left\{\frac{1}{\sqrt{17}} \cdot 2^{\frac{1}{2}} \cdot \sin\left(\frac{2\pi k}{17}\right) \cdot 2^{10}\right\}, k = 1, 2, \ldots, 8$ |
| | | $1/B = 2^{-shift}$ | $(x + (1 << (\text{shift-1})) >> \text{shift}$ |
| 16x16 DST7 | 3-pt DFT | $A\sin\left(\frac{2\pi k}{3}\right), k = 1$ | $\text{round}\left\{\sin\left(\frac{2\pi k}{3}\right) \cdot 2^9\right\}, k = 1$ |
| | | $1/B = 2^{-10}$ | $(x + (1 << 9) >> 10$ |
| | 11-pt DFT | $C\sin\left(\frac{2\pi k}{11}\right), k = 1, 2, \ldots, 5$ | $\text{round}\left\{\frac{1}{\sqrt{33}} \cdot \sin\left(\frac{2\pi k}{11}\right) \cdot 2^{11}\right\}, k = 1, 2, \ldots, 5$ |
| | | $C\cos\left(\frac{2\pi k}{11}\right), k = 0, 1, \ldots, 5$ | $\text{round}\left\{\frac{1}{\sqrt{33}} \cdot \cos\left(\frac{2\pi k}{11}\right) \cdot 2^{11}\right\}, k = 0, 1, \ldots, 5$ |
| | | $1/D = 2^{-(shift-1)}$ | $(x + (1 << (\text{shift-2})) >> (\text{shift-1})$ |
| 32x32 DST7 | 5-pt DFT | $A\sin\left(\frac{2\pi k}{5}\right), k = 1, 2$ | $\text{round}\left\{\sin\left(\frac{2\pi k}{5}\right) \cdot 2^9\right\}, k = 1, 2$ |
| | | $A\cos\left(\frac{2\pi k}{5}\right), k = 1, 2$ | $\text{round}\left\{\cos\left(\frac{2\pi k}{5}\right) \cdot 2^9\right\}, k = 1, 2$ |
| | | $1/B = 2^{-10}$ | $(x + (1 << 9) >> 10$ |
| | 13-pt DFT | $C\sin\left(\frac{2\pi k}{13}\right), k = 1, 2, \ldots, 6$ | $\text{round}\left\{\frac{1}{\sqrt{65}} \cdot 2^{\frac{1}{2}} \cdot \sin\left(\frac{2\pi k}{13}\right) \cdot 2^{11}\right\}, k = 1, 2, \ldots, 6$ |
| | | $C\cos\left(\frac{2\pi k}{13}\right), k = 0, 1, \ldots, 6$ | $\text{round}\left\{\frac{1}{\sqrt{65}} \cdot 2^{\frac{1}{2}} \cdot \cos\left(\frac{2\pi k}{13}\right) \cdot 2^{11}\right\}, k = 0, 1, \ldots, 6$ |
| | | $1/D = 2^{-(shift-1)}$ | $(x + (1 << (\text{shift-2})) >> (\text{shift-1})$ |

Table 3 shows an example of applying a different scaling value from Table 2 (using a scaling value acquired by multiplying the scaling of Table 2 by ¼).

TABLE 3

| Config. | | Original | Approximation |
|---|---|---|---|
| 8x8 DST7 | 17-pt DFT | $A\sin\left(\frac{2\pi k}{17}\right), k = 1, 2, \ldots, 8$ | $\text{round}\left\{\frac{1}{\sqrt{17}} \cdot 2^{\frac{1}{2}} \cdot \sin\left(\frac{2\pi k}{17}\right) \cdot 2^8\right\}, k = 1, 2, \ldots, 8$ |
| | | $1/B = 2^{-shift}$ | $(x + (1 << (\text{shift-1})) >> \text{shift}$ |
| 16x16 DST7 | 3-pt DFT | $A\sin\left(\frac{2\pi k}{3}\right), k = 1$ | $\text{round}\left\{\sin\left(\frac{2\pi k}{3}\right) \cdot 2^7\right\}, k = 1$ |
| | | $1/B = 2^{-10}$ | $(x + (1 << 7) >> 8$ |
| | 11-pt DFT | $C\sin\left(\frac{2\pi k}{11}\right), k = 1, 2, \ldots, 5$ | $\text{round}\left\{\frac{1}{\sqrt{33}} \cdot \sin\left(\frac{2\pi k}{11}\right) \cdot 2^9\right\}, k = 1, 2, \ldots, 5$ |
| | | $C\cos\left(\frac{2\pi k}{11}\right), k = 0, 1, \ldots, 5$ | $\text{round}\left\{\frac{1}{\sqrt{33}} \cdot \cos\left(\frac{2\pi k}{11}\right) \cdot 2^9\right\}, k = 0, 1, \ldots, 5$ |
| | | $1/D = 2^{-(shift-1)}$ | $(x + (1 << (\text{shift-2})) >> (\text{shift-1})$ |
| 32x32 DST7 | 5-pt DFT | $A\sin\left(\frac{2\pi k}{5}\right), k = 1, 2$ | $\text{round}\left\{\sin\left(\frac{2\pi k}{5}\right) \cdot 2^7\right\}, k = 1, 2$ |
| | | $A\cos\left(\frac{2\pi k}{5}\right), k = 1, 2$ | $\text{round}\left\{\cos\left(\frac{2\pi k}{5}\right) \cdot 2^7\right\}, k = 1, 2$ |
| | | $1/B = 2^{-10}$ | $(x + (1 << 7) >> 8$ |

TABLE 3-continued

| Config. | Original | Approximation |
|---|---|---|
| 13-pt DFT | $C\sin\left(\frac{2\pi k}{13}\right), k = 1, 2, \ldots, 6$ | $\text{round}\left\{\frac{1}{\sqrt{65}} \cdot 2^{\frac{1}{2}} \cdot \sin\left(\frac{2\pi k}{13}\right) \cdot 2^9\right\}, k = 1, 2, \ldots, 6$ |
|  | $C\cos\left(\frac{2\pi k}{13}\right), k = 0, 1, \ldots, 6$ | $\text{round}\left\{\frac{1}{\sqrt{65}} \cdot 2^{\frac{1}{2}} \cdot \cos\left(\frac{2\pi k}{13}\right) \cdot 2^9\right\}, k = 0, 1, \ldots, 6$ |
| 1/D | $= 2^{-(shift-1)}$ | $(x + (1 << (shift-2)) >> (shift-1)$ |

The present disclosure provides an example for designing the DST-7 by using the methods presented in the previous embodiment. Further, the DST-7 design proposed by the present disclosure may be used even for a design of the DCT-8 through the relational equation presented in Equation 54 below. Equation 53 below represents a relational equation between inverse DCT-8 and inverse DST-7, $J_N$ serves to change an order of an input, and $D_N$ serves to alternately change a sign, and as a result, the $J_N$ and the $D_N$ do not cause a substantial calculation increase. Since transpose matrices of the $J_N$ and the $D_N$ are all themselves, a front and a rear of the forward DST-7 matrix are multiplied by the $D_N$ and the $J_N$ even though both sides of the relational equation between the reverse DCT-8 and the inverse DST7 of Equation 54 are transposed, and as a result, the forward DCT-8 may be derived from the forward DST-7.

$$[C_N^{VIII}]_{n,k} = \frac{2}{\sqrt{2N+1}} \cos\left[\left(n + \frac{1}{2}\right)\left(k + \frac{1}{2}\right)\frac{2\pi}{2N+1}\right], \quad [\text{Equation 53}]$$

$$n, k = 0, 1, \ldots, N-1$$

$$C_N^{VIII} = J_N S_N^{VII} D_N \quad [\text{Equation 54}]$$

where $[J_N]_{ij, i, j=0, \ldots, N-1} = \begin{cases} 1, & j = N - 1 - i \\ 0, & \text{otherwise} \end{cases}$, and $[D_N]_{ij, i, j=0, \ldots, N-1} = \text{diag}((-1)^k)$, $$k = 0, \ldots, N-1 = \begin{cases} (-1)^j, & i = j \\ 0, & i \neq j \end{cases}$$

The DST-7 design proposed by the present disclosure and the DCT-8 acquired from the DST-7 design (through Equation 54) may be applied to EMT mapping shown in Table 4 below or even to any type of EMT mapping. For example, the design of the DST-7 and the DCT-8 according to an embodiment of the present disclosure may be applied even to the mapping presented in Tables 4 and 5 below. Table 4 shows a transform pair applied to a residual generated through the intra prediction and Table 5 shows a transform pair applied to a residual generated through the inter prediction.

TABLE 4

| EMT index | Hor. transform | Ver. Transform |
|---|---|---|
| 0 | DST7 | DST7 |
| 1 | DCT8 | DST7 |
| 2 | DST7 | DCT8 |
| 3 | DCT8 | DCT8 |

TABLE 5

| EMT index | Hor. transform | Ver. Transform |
|---|---|---|
| 0 | DCT8 | DCT8 |
| 1 | DST7 | DCT8 |
| 2 | DCT8 | DST7 |
| 3 | DST7 | DST7 |

As another example, only the DST-7 design and implementation scheme proposed by the present disclosure may be applied even to a primary transform configuration in which only the DST-7 and the DCT-8 are used, and a maximum application size is limited to 32 while applying the mapping presented in Tables 4 and 5.

Design and implementation of DST-7 for length of 16

FIG. 15 illustrates an example of a flowchart for designing forward DST-7 having a length of 16 by using a Discrete Fourier Transform (DFT) according to an embodiment of the present disclosure.

An embodiment of the present disclosure provides specific embodiments of designing the DST-7 by using the DFT. The embodiments of designing the DST-7 may be used even for designing the DCT-8, and applied even to the MTS configuration.

A signal (information) transferred between blocks shown in the flowchart of FIG. 15 may be a scalar value or may have a vector form. For example, the vector may be written as x[0 . . . , N−1], and this represents a signal (information) constituted by N elements like x[0 . . . N−1]=[x[0] x[1] . . . x[N−2] x[N−1]]. A partial signal of the vector x[0 . . . N−1] may be represented as x[i . . . j], and may be represented like x[5 . . . 10]=[x[5] x[6] x[7] x[8] x[9] x[10] ] as one partial signal of x[0 . . . 15].

Referring to FIG. 15, a flowchart of implementing the DST-7 for one row or column having the length of 16 is shown. Here, the DST-7 having the length of 16 is written as DST7_B16, the forward DST-7 is written as forward DST7_B16, and the inverse DST-7 is written as Inverse DST7_B16.

Further, the input data may be written as x[0 . . . 15] and the final output data may be written as y[0 . . . 15].

When the input data x[0 . . . 15] is inputted, the encoder 100 performs pre-processing for the forward DST7 having the length of 16 (S1510).

The encoder 100 may apply the DST-7 based on the DFT to an output w[0 . . . 15] in step S1510 (S1520). Here, step S1520 adopting the DFT will be described in detail in FIGS. 17 to 19 below.

The encoder 100 may perform post-processing for an output z[0 . . . 15] in step S1520 and output final output data y[0 . . . 15] (S1530).

FIG. 16 illustrates an example of a flowchart for designing inverse DST-7 having a length of 16 by using the DFT according to an embodiment of the present disclosure.

Referring to FIG. 16, a flowchart of implementing the inverse DST7 for one row or column having the length of 16 is shown. Here, the input data may be written as x[0 . . . 15] and the final output data may be written as y[0 . . . 15].

When the input data x[0 . . . 15] is inputted, the decoder 200 performs pre-processing for the inverse DST-7 having the length of 16 (S1610).

The decoder 200 may apply the DST-7 based on the DFT to an output in step S1610 (S1620). Here, step S1620 adopting the DFT will be described in detail in FIGS. 17 to 19 below.

The decoder 200 may perform post-processing for an output in step S1620 and output final output data y[0 . . . 15] (S1630).

FIGS. 17 to 19 illustrate an example of a flowchart for applying an xDST7_FFT_B16 function of FIGS. 15 and 16.

Referring to FIG. 17, src[0 . . . 15] is inputted into an xDST7_FFT3 block and src_FFT11[0 . . . 15] is outputted (S1710). The outputted src_FFT11[0 . . . 15] may be transferred while being separated into two partial signals.

For example, the src_FFT11[0 . . . 4] may be transferred to an xDST7_FFT11_type1 block and the src_FFT11[5 . . . 15] may be transferred to an xDST7_FFT11_type2 block.

The xDST7_FFT11_type1 block is inputted with the src_FFT11[0 . . . 4] and outputs dst[0 . . . 4] (S1720).

The xDST7_FFT11_type2 block is inputted with the src_FFT11[5 . . . 15] and outputs dst[5 . . . 15] (S1730).

Here, implementation of the xDST7_FFT11_type1 block will be described in detail in FIG. 18 and implementation of the xDST7_FFT11_type2 block will be described in detail in FIG. 19.

Referring to FIG. 18, the src[0 . . . 4] is inputted into an xDST7_FFT11_half1 block and dst_half1[0 . . . 4] is outputted (S1810).

The outputted dst_half1[0 . . . 4] is inputted into the xDST7_FFT11_type1 block and the dst[0 . . . 4] is outputted (S1820).

Referring to FIG. 19, src[0 . . . 10] may be transferred while being separated into two partial signals. For example, the src[0 . . . 4] may be transferred to the xDST7_FFT11_half1 block and the src[5 . . . 10] may be transferred to the xDST7_FFT11_half2 block.

The xDST7_FFT11_half1 block is inputted with the src[0 . . . 4] and outputs dst_half1[0 . . . 4] (S1910).

The xDST7_FFT11_half2 block is inputted with the src[5 . . . 10] and outputs dst_half2[0 . . . 5] (S1920).

The encoder 100/decoder 200 may perform post-processing for an output in step S1920 through an xDST7_FFT11_type2_Post_Processing block (S1930) and output final output data dst[0 . . . 10].

The src_FFT11[5 . . . 15] of FIG. 17 corresponds to the src[0 . . . 10] of FIG. 19 above. That is, src[0]=src_FFT11[5], src[1]=src_FFT11[6], . . . , src[10]=src_FFT11[15] are assigned.

Further, in the xDST7_FFT11_type2_Post_Processing block of FIG. 19, dst_half1[0 . . . 4] and dst_half2[0 . . . 5] are inputted from the left, and correspond to input parameters src_half1[0 . . . 4] and src_half2[0 . . . 5], respectively. This will be described in detail in a table showing an operation of each block below.

As such, the block diagrams of FIGS. 15 and 16 may be interpreted in connection with the block diagrams of FIGS. 17 to 19.

Detailed operations of the functions in FIGS. 15 to 19 above may be described by Tables 2 to 10 below.

Table 6 shows an operation of a Forward_DST7_Pre_Processing_B16 function.

TABLE 6

| Name | Forward_DST7_Pre_Processing_B16 |
|---|---|
| Input | src[0 . . . 15] |
| Output | dst[0 . . . 15] |
| Operation | dst[0] = −src[10]; dst[1] = src[8]; dst[2] = src[1]; dst[3] = −src[12]; dst[4] = −src[14]; dst[5] = src[6]; dst[6] = src[3]; dst[7] = src[5]; dst[8] = −src[15]; dst[9] = src[4]; dst[10] = src[2]; dst[1] = src[7]; dst[12] = −src[13]; dst[13] = −src[11]; dst[14] = src[0]; dst[15] = src[9]; |

The operation of Table 6 is determined by the Q and P matrices of Equation 5 and indexing presented in Equation 14. Moreover, other indexings from Equations 18, 19, and 20 may be applied to the operation of Table 6.

Table 7 shows an operation of a Forward_DST7_Post_Processing_B16 function.

TABLE 7

| Name | Forward_DST7_Post_Processing_B16 |
|---|---|
| Input | src[0 . . . 15] |
| Output | dst[0 . . . 15] |
| Operation | int aiReordIdx[16] = { 12, 16 + 0, 16 +14, 10, 16 + 2, 16 +5, 8, 16 +4, 16 + 7, 6, 3, 16 + 9, 15, 1, 16 + 11, 13 }; <br> for (int i = 0; i <16; i++) { <br> int index =aiReordIdx[i]; <br> dst[i] = (int)((((index & 0x10) ? −src[index & 0xF] : src[index]) + rnd_factor) >> final_shift); <br> } |

In Table 7, a value of md_factor=1<<(final_shift−1) may be used. In addition, when a function of applying the DST-7 to all rows or columns of one block in FIGS. 15 and 16 is used, if a value called shift is transferred through a parameter, a value of final_shift=shift−1 may be used. If a bit-length for the src variable in Table 7 increases by N, a final_shift=shift−1+n value may be used, and when n=1, a final_shift=shift value may be used.

The operation of Table 7 is derived from the symmetry which exists among the R matrix of Equation 5, the indexing of Equation 14, and the output of the DFT imaginary number part. Other indexings may be applied from Equations 18, 19, and 20.

Table 8 shows an operation of an Inverse_DST7_Pre_Processing_B16 function.

TABLE 8

| Name | Inverse_DST7_Pre_Processing_B16 |
|---|---|
| Input | src[0 ... 15] |
| Output | dst[0 ... 15] |
| Operation | dst[0] = −src[5]; dst[1] = src[4]; dst[2] = src[15]; dst[3] = −src[6]; dst[4] = −src[7]; dst[5] = src[3]; dst[6] = src[14]; dst[7] = src[13]; dst[8] = −src[8]; dst[9] = src[2]; dst[10] = src[1]; dst[11] = src[12]; dst[12] = −src[9]; dst[13] = −src[10]; dst[14] = src[0]; dst[15] = src[11]; |

The operation of Table 8 is determined by the Q and P matrices of Equation 8 and the indexing presented in Equation 14. Moreover, other indexings from Equations 18, 19, and 20 may be applied to the operation of Table 8.

Table 9 shows an operation of an Inverse_DST7_Post_Processing_B16 function.

TABLE 9

| Name | Inverse_DST7_Post_Processing_B16 |
|---|---|
| Input | src[0 ... 15] |
| Output | dst[0 ... 15] |
| Operation | int aiReordIdx[16] = { 12, 13, 16 + 0, 16 + 11, 16 + 14, 1, 10, 15, 16 + 2, 16 + 9, 16 + 5, 3, 8, 6, 16 + 4, 16 + 7 }; for (int i = 0; i < 16; i++) { int index = aiReordIdx[i]; dst[i] = Clip3(outputMinimum, outputMaximum, (int)((((index & 0 × 10) ? −src[index & 0 × F] : src[index]) + rnd_factor) >> final_shift)); } |

In Table 9, a value of rnd_factor=1<<(final_shift−1) may be used. In addition, when a function of applying the DST-7 to all rows or columns of one block in FIGS. 15 and 16 is used, if a value called shift is transferred through a parameter, a value of final_shift=shift−1 may be used. If the bit-length for the src variable of Table 9 increases by n, the final_shift=shift−1+n value may be used, and when n=1, the final_shift=shift value may be used.

In Table 9, outputMinimum and outputMaximum indicate a minimum value and a maximum value which the output value may have, respectively and a Clip3 function performs an operation of Clip3(A,B,C)=(C<A)? A:(C>B)? B:C. That is, the Clip3 function clips so that the C value particularly exists in the range of A to B.

The operation of Table 9 is derived from the symmetry which exists among the R matrix of Equation 8, the indexing of Equation 14, and the output of the DFT imaginary number part. Moreover, other indexings from Equations 18, 19, and 20 may be applied to the operation of Table 5.

Table 10 shows an operation of an xDST7_FFT3 function.

In Table 10, the C3 value means a value of $$\text{round}\left(\sin\left(\frac{2\pi}{3}\right)\cdot 2^9\right),$$

and represents that a multiplication coefficient is scaled by $2^9$. In Table 10, since shift=10 and rnd_factor=1<<(shift−1)=29 are applied, dst[i] and dst[5+i] may be calculated as in Equation 55 below.

$$dst[i] = \qquad \qquad \text{[Equation 55]}$$
$$(src[3*i+1] + src[3*i+2] + src[3*i+3] + 1) >> 1$$
$$dst[5+i] =$$
$$((src[3*i+1] << 1) - src[3*i+2] - src[3*i+3] + 2) >> 2$$

When $$\text{round}\left(\sin\left(\frac{2\pi}{3}\right)\cdot 2^7\right)$$

TABLE 10

| Name | xDST7_FFT3 |
|---|---|
| Input | src[0 ... 15] |
| Output | dst[0 ... 15]; |
| Operation | int C3 = 443; dst[10] = ((−src[0] * C3) + rnd_factor) >> shift; for (int i = 0; i <5; i++) { dst[i] = (((src[3] + 1] + src[3*1 + 2] + src[3*1 + 3]) << 9) + rnd_factor) >> shift; dst[5 + i] = ((((src[3*i + 1] << 1) − src[3*i + 2] − src[3] + 3]) << 8) +rnd_factor) >> shift; dst[11 + i] = (((src[3*i + 3] − src[3*i + 2]) * C3) + rnd_factor) >> shift; } | is used for the C3 value instead of $$\text{round}\left(\sin\left(\frac{2\pi}{3}\right) \cdot 2^9\right),$$

the multiplication coefficient is scaled by $2^7$, and the C3 value becomes 111. In this case, 8 is used instead of 10 as a value of a shift variable, and if the bit-length of the output value increases by n, (8−n) is used as the shift variable value, and as a result, when n=1, shift=8 and rnd_factor= 1<<(shift−1)=26 are applied. Similarly, dst[i] and dst[5+i] may be calculated as above.

Table 11 shows an operation of an xDST7_FFT11_half1 function.

TABLE 11

| | |
|---|---|
| Name | xDST7_FFT11_half1 |
| Input | src[0 . . . 4] |
| Output | dst[0 . . . 4] |
| Operation | int C11 R1[5] = { 193, 324, 353, 269, 100 };<br>dst[0] = −src[0] * C11R[0] − src[1] * C11R[1] − src[2] * C11R[2] − src[3] * C11R[3] − src[4] * C11R[4];<br>dst[1] = −src[0] * C11R[1] − src[1] * C11R[3] + src[2] * C11R[4] + src[3] * C11R[2] + src[4] * C11R[0];<br>dst[2] = −src[0] * C11R[2] + src[1] * C11R[4] + src[2] * C11R[1] − src[3] * C11R[0] − src[4] * C11R[3];<br>dst[3] = −src[0] * C11R[3] + src[1] * C11R[2] − src[2] * C11R[0] − src[3] * C11R[4] + src[4] * C11R[1];<br>dst[4] = −src[0] * C11 R[4] + src[1] * C11 R[0] − src[2] * C11 R[3] +src[3] * C11 R[1] − src[4] * C11R[2]; |

In Table 11, an array C11R indicates a value calculated through $$\text{round}\left(\frac{1}{\sqrt{2\times 16+1}} \cdot \sin\left(\frac{2\pi i}{11}\right) \cdot 2^{11}\right), i = 1, 2, 3, 4, 5.$$

The operation of Table 11 corresponds to g(k1, k2) of Equations 47 and 49. When $$\text{round}\left(\frac{1}{\sqrt{2\times 16+1}} \cdot \sin\left(\frac{2\pi i}{11}\right) \cdot 2^9\right), i = 1, 2, 3, 4, 5$$

is used instead of $$\text{round}\left(\frac{1}{\sqrt{2\times 16+1}} \cdot \sin\left(\frac{2\pi i}{11}\right) \cdot 2^{11}\right), i = 1, 2, 3, 4, 5$$

as the C11R value, an array of C11R[5] may be configured as in Equation 56 below.

int $C11R[5]=\{48,81,88,67,25\}$;  [Equation 56]

Table 12 shows an operation of an xDST7_FFT11_half2 function.

TABLE 12

| | |
|---|---|
| Name | xDST7_FFT11_half2 |
| Input | src[0 . . . 5] |
| Output | dst[0 . . . 5] |
| Operation | int C11I [6] = { 357, 300, 148, −51, −233, −342 };<br>dst[0] = (src[0] + src[1] + src[2] + src[3] + src[4] + src[5]) * C11I[0];<br>dst[1] = src[0] * C11I[0] + src[1] * C11I[1] + src[2] * C11I[2] + src[3] * C11I[3] + src[4] * C11I[4] + src[5] * C11I[5];<br>dst[2] = src[0] * C11I [0] + src[1] * C11I[2] + src[2] * C11I[4] + src[3] * C11I[5] + src[4] * C11I[3] + src[5] * C[1][1];<br>dst[3] = src[0] * C11I [0] + src[1] * C11I[3] + src[2] * C11I[5] + src[3] * C11I[2] + src[4] * C11I[1] + src[5] * C11 I[4];<br>dst[4] = src[0] * C11I [0] + src[1] * C11I[4] + src[2] * C11I[3] + src[3] * C[11I[1] + src[4] * C11I[5] + src[5] * C11I[2];<br>dst[5] = src[0] * C11I [0] + src[1] * C11I[5] + src[2] * C[1][1] + src[3] * C11I[4] + src[4] * C11I[2] + src[5] * C11I[3]; |

In Table 12, the array C11R indicates a value calculated through $$\text{round}\left(\frac{1}{\sqrt{2\times 16+1}}\cdot\cos\left(\frac{2\pi i}{11}\right)\cdot 2^{11}\right), i=1, 2, 3, 4, 5.$$

The operation of Table 12 corresponds to f(k1, k2) of Equation 49. When $$\text{round}\left(\frac{1}{\sqrt{2\times 16+1}}\cdot\cos\left(\frac{2\pi i}{11}\right)\cdot 2^{9}\right), i=1, 2, 3, 4, 5$$

is used instead of
round $$\left(\frac{1}{\sqrt{2\times 16+1}}\cdot\cos\left(\frac{2\pi i}{11}\right)\cdot 2^{11}\right), i=1, 2, 3, 4, 5$$

as the C11R value, the array of C11R[5] may be configured as in Equation 57 below.

int C11I[6] = {89, 75, 37, −13, −58, −86};  [Equation 57]

Table 13 shows an operation of an xDST7_FFT11_type1_Post_Processing function.

TABLE 13

| Name | xDST7_FFT11_type1_Post_Processing |
|---|---|
| Input | src[0 ... 4] |
| Output | dst[0 ... 4] |
| Operation | dst[0] = src[0]; dst[1] = src[1]; dst[2] = src[2]; dst[3] = src[3]; dst[4] = src[4]; |

Table 14 shows an operation of an xDST7_FFT11_type2_Post_Processing function.

TABLE 14

| Name | xDST7_FFT11_type2_Post_Processing |
|---|---|
| Input | src_half1[0 ... 4[, src_half2[0 ... 5] |
| Output | dst[0 ... 10] |
| Operation | dst[0] = src_half2[0]; |
| | dst[1] = src_half2[1] + src_half1 [0]; |
| | dst[2] = src_half2[2] + src_half1 [1]; |
| | dst[3] = src_half2[3] + src_half1 [2]; |
| | dst[4] = src_half2[4] + src_half1 [3]; |
| | dst[5] = src_half2[5] + src_half1 [4]; |
| | dst[6] = src_half2[5] − src_half1 [4]; |
| | dst[7] = src_half2[4] − src_half1 [3]; |
| | dst[8] = src_half2[3] − src_half1 [2]; |
| | dst[9] = src_half2[2] − src_half1 [1]; |
| | dst[10] = src_half2[1] − src_half1 [0]; |

The operation of Table 14 corresponds to a scheme of calculating h(k1,k2) of Equation 49 by combining f(k1,k2) and g(k1,k2).

When the DST-7 is applied to a 16×162D block in the horizontal direction (or vertical direction), the flowcharts of FIGS. 15 and 16 may be used for 16 rows (or columns).

Design and implementation of DST-7 for length of 32

FIG. 20 illustrates an example of a flowchart for designing forward DST-7 having a length of 32 by using the DFT according to an embodiment of the present disclosure.

The present disclosure provides specific embodiments of designing the DST-7 by using the DFT. The design of the DST-7 may be used even for the design of the DCT-8 through embodiments of the present disclosure, and applied even to the MTS configuration.

Referring to FIG. 20, a flowchart of implementing the DST-7 for one row or column having the length of 32 is shown. Here, the DST-7 having the length of 32 is written as DST7_B32, the forward DST-7 is written as forward DST7_B32, and the inverse DST-7 is written as Inverse DST7_B32.

Further, the input data may be written as x[0 ... 31] and the final output data may be written as y[0 ... 31].

When the input data x[0 ... 31] is inputted, the encoder 100 performs pre-processing for the forward DST-7 having the length of 32 (S2010).

The encoder 100 may apply the DFT to an output w[0 ... 31] in step S2010 (S2020). Here, step S2020 adopting the DFT will be described in detail in FIGS. 22 to 24 below.

The encoder 100 may perform post-processing for an output z[0 ... 31] in step S2020 and output final output data y[0 ... 31] (S2030).

FIG. 21 illustrates an example of a flowchart for designing inverse DST-7 having a length of 32 by using the DFT according to an embodiment of the present disclosure.

Referring to FIG. 21, a flowchart of implementing the DST-7 for one row or column having the length of 32 is shown. Further, the input data may be written as x[0 ... 31] and the final output data may be written as y[0 ... 31].

When the input data x[0 ... 31] is inputted, the decoder 200 performs pre-processing for the inverse DST7 having the length of 32 (S2110).

The decoder 200 may apply the DFT to an output w[0 ... 31] in step S2110 (S2120). Here, step S2120 adopting the DFT will be described in detail in FIGS. 22 to 24 below.

The decoder 200 may perform post-processing for an output z[0 ... 31] in step S2120 and output final output data y[0 ... 31] (S2130).

FIGS. 22 to 24 illustrate an example of a flowchart for applying the xDST7_FFT_B32 function of FIGS. 20 and 21.

Referring to FIG. 22, src[0 ... 31] is inputted into an xDST7_FFT5 block and src_FFT13[0 ... 31] is outputted (S2210). The outputted src_FFT13[0 ... 31] may be transferred while being separated into three partial signals.

For example, the src_FFT13[0 ... 5] may be transferred to an xDST7_FFT13_type1 block, the src_FFT13[6 ... 18] may be transferred to an xDST7_FFT13_type2 block, and src_FFT13[19 ... 31] may be transferred to another xDST7_FFT13_type2 block.

The xDST7_FFT13_type1 block is inputted with the src_FFT13[0 ... 5] and outputs dst[0 ... 5] (S2220).

The xDST7_FFT13_type2 block is inputted with the src_FFT13[6 ... 18] and outputs dst[6 ... 18] (S2230).

The xDST7_FFT13_type2 block is inputted with the src_FFT13[19 ... 31] and outputs dst[19 ... 31] (S2240).

Here, implementation of the xDST7_FFT13_type1 block will be described in detail in FIG. 23 and implementation of the xDST7_FFT13_type2 block will be described in detail in FIG. 24.

Referring to FIG. 23, the src[0 ... 5] is inputted into an xDST7_FFT13_half1 block and dst_half1[0 ... 5] is outputted (S2310).

The outputted dst_half1[0 ... 5] is inputted into the xDST7_FFT13_type1_Post_Processing block and the dst[0 ... 5] is outputted (S2320).

Referring to FIG. 24, src[0 ... 12] may be transferred while being separated into two partial signals. For example, the src[0 ... 5] may be transferred to the xDST7_FFT13_half1 block and the src[6 ... 12] may be transferred to the xDST7_FFT13_half2 block.

The xDST7_FFT13_half1 block is inputted with the src[0 . . . 5] and outputs dst_half1[0 . . . 5] (S2410).

The xDST7 FFT13_half2 block is inputted with the src[6 . . . 12] and outputs dst_half2[0 . . . 6] (S2420).

The encoder 100/decoder 200 may perform post-processing for outputs in steps S2410 and S2420 through an xDST7_FFT13_type2_Post_Processing block and S2420 and output final output data dst[0 . . . 12] (S2430).

The src_FFT13[0 . . . 5] of FIG. 22 corresponds to the src[0 . . . 5] of FIG. 23. That is, src[0]=src_FFT13[0], src[1]=src_FFT13[1], src[5]=src_FFT13[5] are assigned.

In addition, src_FFT13[6 . . . 18] or src_FFT13[19 . . . 31] of FIG. 22 corresponds to src[0 . . . 12] of FIG. 24. For example, src[0]=src_FFT13[6], src[1]=src_FFT13[7], src [12]=src_FFT13[18] are assigned.

Further, in the xDST7 FFT13_type2_Post_Processing block of FIG. 24, dst_half1[0 . . . 5] and dst_half2[0 . . . 6] are inputted from the left, and correspond to input parameters src_half1[0 . . . 5] and src_half2[0 . . . 6], respectively. This will be described in detail in a table showing an operation of each block below.

As such, the block diagrams of FIGS. 20 and 21 may be interpreted in connection with the blocks of FIGS. 22 to 24.

Detailed operations of the functions in FIGS. 20 to 24 may be described by Tables 15 to 22 below.

Table 15 shows an operation of a Forward_DST7_Pre_Processing_B32 function.

TABLE 15

| Name | Forward_DST7_Pre_Processing_B32 |
|---|---|
| Input | src[0 . . . 31] |
| Output | dst[0 . . . 31] |
| Operation | int aiFFTInReordIdx1321 = {12, 32 + 25, 32 + 14, 1, 10, 32 + 23, 27, 29, 32 + 16, 3, 8, 32 + 21, 32 + 19, 31, 32 + 18, 5, 6, 4, 32 + 17, 30, 32 + 20, 7, 9, 2, 32 + 15, 28, 32 + 22, 32 + 24, 11, 0, 32 + 13, 26 };<br>for (int i = 0; i < 32; i++) {<br>int index = aiFFTInReordIdx[i];<br>dst[i] = (index & 0x20) ? −src[index & 0x1F] : src[index];<br>} |

The operation of Table 15 is determined by the Q and P matrices of Equation 5 and the indexing presented in Equation 15. Other indexings may be applied from Equations 18, 19, and 20.

Table 16 shows an operation of a Forward_DST7_Post_Processing_B32 function.

TABLE 16

| Name | Forward_DST7_Post_Processing_B32 |
|---|---|
| Input | src[0 ... 31] |
| Output | dst[0 ... 31] |
| Operation | int aiFFTOutReordIdx[32] = {32 + 17, 32 + 0, 15, 25, 32 + 29, 32 + 6, 32 + 2, 13, 23, 32 + 31, 32 + 8, 32 + 4, 11, 21, 32 + 20, 32 + 10, 5, 9, 19, 32 + 22, 32 + 12, 3, 7, 30, 32 + 24, 32 + 14, 1, 18, 28, 32 + 26, 32 + 16};<br>for (int i = 0; i < 32; i++) {<br>int index = aiFFTOutReordIdx[i];<br>dst[i] = (int)((((index & 0 × 20) ? −src[index & 0 × 1F]: src[index]) + rnd_factor) << final_shift);<br>} |

In Table 16, a value of rnd_factor=1<<(final_shift−1) may be used. In addition, when a function of applying the DST-7 to all rows or columns of one block in FIGS. 20 and 21 is used, if a value called shift is transferred through a parameter, a value of final_shift=shift−1 may be used. If the bit-length for the src variable of Table 16 increases by n, the final_shift=shift−1+n value may be used, and when n=1, the final_shift=shift value may be used.

The operation of Table 16 is derived from the symmetry which exists among the R matrix of Equation 5, the indexing of Equation 15, and the output of the DFT imaginary number part. Other indexings may be applied from Equations 18, 19, and 20.

Table 17 shows an operation of an Inverse_DST7_Pre_Processing_B32 function.

TABLE 17

| Name | Inverse_DST7_Pre_Processing_B32 |
|---|---|
| Input | src[0 . . . 31] |
| Output | dst[0 . . . 31] |
| Operation | int aiFFTInReordIdx[32] ={6, 32 + 19, 32 + 7, 31, 5, 32 + 20, 18, 17, 32 + 8, 30, 4, 32 + 21, 32 + 22, 16, 32 + 9, 29, 3, 2, 32 + 23, 15, 32 + 10, 28, 27, 1, 32 + 24, 14, 32 + 11, 32 + 12, 26, 0, 32 + 25, 13 }; |

TABLE 17-continued

```
for (int i = 0; i < 32; i++) {
int index = aiFFTInReordIdx[i];
dst[i] =(index & 0x20) ? −dst[index & 0x1F] : dst[index];
}
```

The operation of Table 17 is determined by the Q and P matrices of Equation 8 and indexing presented in Equation 15. Other indexings may be applied from Equations 18, 19, and 20.

Table 18 shows an operation of an Inverse_DST7_Post_Processing_B32 function.

TABLE 18

| | |
|---|---|
| Name | Inverse_DST7_Post_Processing_B32 |
| Input | src[0 . . . 31] |
| Output | dst[0 . . . 31] |
| Operation | int aiFFTOutReordIdx[32] = {32 + 27, 32 + 16, 32 + 17, 32 + 26, 32 + 0, 28, 15, 18, 25, 1, 32 + 29, 32 + 14, 32 + 6, 32 + 24, 32 + 2, 30, 13, 7, 23, 3, 32 + 31, 32 + 12, 32 + 8, 32 + 22, 32 + 4, 19, 11, 9, 21, 5, 32 + 20, 32 +10}; <br> for (int i = 0; i < 32; i++) { <br> int index = aiFFTOutReordIdx[i]; <br> dst[i] =Clip3(outputMinimum, outputMaximum, (int)((((index & 0x20) ? −src[index & 0x1F] : src[index]) + rnd_factor) >> final_shift)); <br> } |

In Table 18, a value of md_factor=1<<(final_shift−1) may be used. In addition, when a function of applying the DST-7 to all rows or columns of one block in FIGS. 20 and 21 is used, if a value called shift is transferred through a parameter, a value of final_shift=shift−1 may be used. If the bit-length for the src variable of Table 18 increases by n, the final_shift=shift−1+n value may be used, and when n=1, the final_shift=shift value may be used.

The operation of Table 18 may be derived from the symmetry which exists among the R matrix of Equation 8, the indexing of Equation 15, and the output of the DFT imaginary number part. Other indexings may be applied from Equations 18, 19, and 20.

In Table 18, outputMinimum and outputMaximum indicate a minimum value and a maximum value which the output value may have, respectively and a Clip3 function performs an operation of Clip3(A,B,C)=(C<A)? A:(C>B)? B:C. That is, the Clip3 function clips so that the C value particularly exists in the range of A to B.

Table 19 shows an operation of an xDST7_FFT13_half1 function.

In Table 19, an array C13R indicates a value calculated through $$\text{round}\left(\frac{1}{\sqrt{2\times 32+1}}\cdot\sqrt{2}\cdot\sin\left(\frac{2\pi i}{13}\right)\cdot 2^{11}\right), i = 1, 2, 3, 4, 5, 6.$$

The operation of Table 19 corresponds to g(k1, k2) of Equations 47 and 49. When $$\text{round}\left(\frac{1}{\sqrt{2\times 32+1}}\cdot\sqrt{2}\cdot\sin\left(\frac{2\pi i}{13}\right)\cdot 2^{9}\right), i = 1, 2, 3, 4, 5, 6$$

is used instead of $$\text{round}\left(\frac{1}{\sqrt{2\times 32+1}}\cdot\sqrt{2}\cdot\sin\left(\frac{2\pi i}{13}\right)\cdot 2^{11}\right), i = 1, 2, 3, 4, 5, 6$$

as the C13R value, an array C13R may be configured as in Equation 58 below.

int $C13R[6] = \{42, 74, 89, 84, 60, 21\}$; [Equation 58]

Table 20 shows an operation of an xDST7_FFT13_half2 function.

TABLE 19

| | |
|---|---|
| Name | xDST7_FFT13_half1 |
| Input | src[0 ... 5] |
| Output | dst[0 ... 5] |
| Operation | int C13R[6] = { 167, 296, 357, 336, 238, 86 }; <br> dst[0] = − src[0] * C13R[0] − src[1] * C13R[1] − src[2] * C13R[2] − src[3] * C13R[3] − src[4] * C13R[4] −src[5] * C13R[5]; <br> dst[1] = − src[0] * C13R[1] − src[1] * C13R[3] − src[2] * C13R[5] + src[3] * C13R[4] + src[4] * C13R[2] + src[5] * C13R[0]; <br> dst[2] = − src[0] * C13R[2] − src[1] * C13R[5] + src[2] * C13R[3] + src[3] * C13R[0] − src[4] * C13R[1] −src[5] * C13R[4]; <br> dst[3] = − src[0] * C13R[3] + src[1] * C13R[4] + src[2] * C13R[0] − src[3] * C13R[2] + src[4] * C13R[5] + src[5] * C13R[1]; <br> dst[4] = − src[0] * C13R[4] + src[1] * C13R[2] − src[2] * C13R[1] + src[3] * C13R[5] + src[4] * C13R[0] −src[5] * C13R[3]; <br> dst[5] = − src[0] * C13R[5] + src[1] * C13R[0] − src[2] * C13R[4] + src[3] * C13R[1] − src[4] * C13R[3] + src[5] * C13R[2]; |

TABLE 20

| | |
|---|---|
| Name | xDST7_FFT13_half2 |
| Input | src[0 ... 6] |
| Output | dst[0 ... 6] |
| Operation | int C13I[7] = { 359, 318, 204, 43, −127, −269, −349 };<br>dst[0] = (src[0] + src[1] + src[2] + src[3] + src[4] + src[5] + src[6]) * C13I[0];<br>dst[1] = src[0] * C13I[0] + src[1] * C13I[1] + src[2] * C13I[2] + src[3] * C13I[3] + src[4] * C13I[4] + src[5] * C13I[5] + src[6] * C13I[6];<br>dst[2] = src[0] * C13I[0] + src[1] * C13I[2] + src[2] * C13I[4] + src[3] * C13I[6] + src[4] * C13I[5] + src[5] * C13I[3] + src[6] * C13I[1];<br>dst[3] = src[0] * C13I[0] + src[1] * C13I[3] + src[2] * C13I[6] + src[3] * C13I[4] + src[4] * C13I[1] + src[5] * C13I[2] + src[6] * C13I[5];<br>dst[4] = src[0] * C13I[0] + src[1] * C13I[4] + src[2] * C13I[5] + src[3] * C13I[1] + src[4] * C13I[3] + src[5] * C13I[6] + src[6] * C13I[2];<br>dst[5] = src[0] * C13I[0] + src[1] * C13I[5] + src[2] * C13I[3] + src[3] * C13I[2] + src[4] * C13I[6] + src[5] * C13I[1] + src[6] * C13I[4];<br>dst[6] = src[0] * C13I[0] + src[1] * C13I[6] + src[2] * C13I[1] + src[3] * C13I[5] + src[4] * C13I[2] + src[5] * C13I[4] + src[6] * C13I[3]; |

In Table 20, an array C13I indicates a value calculated through $$\text{round}\left(\frac{1}{\sqrt{2 \times 32 + 1}} \cdot \sqrt{2} \cdot \cos\left(\frac{2\pi i}{13}\right) \cdot 2^{11}\right), i = 0, 1, 2, 3, 4, 5, 6.$$

The operation of Table 20 corresponds to f(k1, k2) of Equation 49. When $$\text{round}\left(\frac{1}{\sqrt{2 \times 32 + 1}} \cdot \sqrt{2} \cdot \cos\left(\frac{2\pi i}{13}\right) \cdot 2^{11}\right), i = 1, 2, 3, 4, 5, 6$$

is used instead of $$\text{round}\left(\frac{1}{\sqrt{2 \times 32 + 1}} \cdot \sqrt{2} \cdot \cos\left(\frac{2\pi i}{13}\right) \cdot 2^{9}\right), i = 0, 1, 2, 3, 4, 5, 6$$

as the C13I value, an array of C13R may be configured as in Equation 59 below.

int C13I[7] = {90, 80, 51, 11, −32, −67, −87};  [Equation 59]

Table 21 shows an operation of an xDST7_FFT13_type1_Post_Processing function.

TABLE 21

| | |
|---|---|
| Name | xDST7_FFT13_type1_Post_Processing |
| Input | src[0 ... 5] |
| Output | dst[0 ... 5] |
| Operation | dst[0] = src[0]; dst[1] = src[1]; dst[2] = src[2];<br>dst[3] = src[3]; dst[4] = src[4]; dst[5] = src[5]; |

Table 22 shows an operation of an xDST7_FFT13_type2_Post_Processing function.

TABLE 22

| | |
|---|---|
| Name | xDST7_FFT13_type2_Post_Processing |
| Input | src_half1[0 ... 5], src_half2[0 ... 6] |
| Output | dst[0 ... 12] |
| Operation | dst[0] = src_half2[0];<br>for (int i = 0; i < 6; i++) {<br>  dst[1 + i] = src_half1[i] + src_half2[1 + i];<br>}<br>for (int i = 0; i < 6; i++) {<br>  dst[7 + i] = −src_half1[5 − i] + src_half2[6 − i];<br>} |

The operation of Table 22 corresponds to a method of calculating h(k1, k2) of Equation 49 by combining f(k1, k2) and g(k1, k2).

Table 23 shows an operation of an xDST-7_FFT5 function.

TABLE 23

| | |
|---|---|
| Name | xDST7_FFT5 |
| Input | src[0 ... 31] |
| Output | dst[0 ... 31] |
| Operation | int shift = 10;<br>int rnd_factor = 1 << (shift − 1);<br>int C5R[2] = { 158, −414 };<br>int C5I[2] = { 487, 301 };<br>dst[12] = ((−src[0] * C5I[0] − src[1] * C5I[1]) + rnd_factor) >> shift;<br>dst[25] = ((−src[0] * C5I[1] + src[1] * C5I[0]) + rnd_factor) >> shift;<br>for (int i = 0; i < 6; i++) {<br>  dst[i] = (((src[5*i + 2] + src[5*i + 3] + src[5*i + 4] + src[5*i + 5] + src[5*i + 6]) << 9) + rnd_factor) >> shift;<br>  dst[6 + i] = (((src[5*i + 2] << 9) + src[5*i + 3] * C5R[0] + src[5*i + 4] * C5R[1] + src[5*i + 5] * C5R[1]+src[5*i + 6] * C5R[0]) + rnd_factor) >> shift;<br>  dst[19 + i] = (((src[5*i + 2] << 9) + src[5*i + 3] * C5R[1] + src[5*i + 4] * C5R[0] + src[5*i + 5] * C5R[0] + src[5*i + 6] * C5R[1]) + rnd_factor) >> shift;<br>  dst[13 + i] = ((−src[5*i + 3] * C5I[0] − src[5*i + 4] * C5I[1] + src[5*i + 5] * C5I[1] + src[5*i + 6] * C5I[0]) + rnd_factor) >> shift;<br>  dst[26 + i] = ((−src[5*i + 3] * C5I[1] + src[5*i + 4] * C5I[0] − src[5*i + 5] * C5I[0] + src[5*i + 6] * C5I[1]) + rnd_factor) >> shift;<br>} |

In Table 23, 10 is used as the shift value, but if the bit-length of the output value is intended to increase by n, (10−n) may be used as the shift value. For example, when n=1, shift=9.

dst[i] in for-loop of Table 23 may be calculated as in Equation 60 below.

$$dst[i]=(src[5*i+2]+src[5*i+3]+src[5*i+4]+src[5*i+5]+src[5*i+6]+1)>>1;$$ [Equation 60]

Further, dst[6+i], dst[19+i], dst[13+i], and dst[26+i] in for-loop of Table 23 are calculated as in Equation 61 below through a scheme of binding terms having a common multiplication coefficient to reduce a multiplication operation amount.

$$dst[6+i]=(((src[5*i+2]<<9)+(src[5*i+3]+src[5*i+6])*C5R[0]+(src[5*i+4]+src[5*i+5])*C5R[1])+rnd\_factor)>>shift;$$

$$dst[19+i]=(((src[5*i+2]<<9)+(src[5*i+3]+src[5*i+6])*C5R[1]+(src[5*i+4]+src[5*i+5])*C5R[0])+rnd\_factor)>>shift;$$

$$dst[13+i]=(((src[5*i+6]-src[5*i+3])*C5I[0]+(src[5*i+5]-src[5*i+4])*C5I[1])+rnd\_factor)>>shift;$$

$$dst[26=i]=(((src[5*i+6]-src[5*i+3])*C5I[1]+(src[5*i+4]-src[5*i+5])*C5I[0])+rnd\_factor)>>shift;$$ [Equation 61]

In the operation of Table 23, dst[12] and dst[25] correspond to $$\frac{A}{2B}\hat{y}_l(k_l, 0)$$

of Equation 45, and the calculation for dst[i], dst[6+i], dst[19+i], dst[13+i], and dst[26+i] corresponds to Equation 44.

In Table 23, when the scale value decreases by ¼, values shown in Equation 62 below may be applied instead of C5R and C5I of Table 23.

$$int\ C5R[2] = \{40, -104\};$$ [Equation 62]

$$int\ C5I[2] = \{122, 75\};$$

When the scale value decreases by ¼ as in Equation 62, 9 may be used as the shift value by considering the corresponding scaling. If the bit-length of the output value is intended to increase by n, (8−n) may be used as the shift value. For example, when n=1, shift=7. When the shift value is changed, dst is similarly calculated to reduce a multiplication amount.

When the DST-7 is applied to one 32×322D block in the horizontal direction (or vertical direction), the flowcharts of FIGS. 20 and 21 may be used for 32 rows (or columns).

Design and implementation of DST-7 for length of 8

FIG. 25 illustrates an example of a flowchart for designing forward DST-7 having a length of 8 by using the DFT according to an embodiment of the present disclosure.

The present disclosure provides specific embodiments of designing the DST-7 by using the DFT. The embodiments of the present disclosure may be used even for the DCT-8 design, and applied even to the MTS configuration.

Referring to FIG. 25, a flowchart of implementing the DST-7 for one row or column having the length of 8 is shown. Here, the DST-7 having the length of 8 is written as DST7_B8, the forward DST7 is written as forward DST7_B8, and the inverse DST7 is written as Inverse DST7 B8.

Further, the input data may be written as x[0 ... 7] and the final output data may be written as y[0 ... 7].

When the input data x[0 ... 7] is inputted, the encoder 100 performs pre-processing for the forward DST-7 having the length of 8 (S2510).

The encoder 100 may apply the DFT to an output w[0 ... 7] in step S2510 (S2520). Here, step S2520 adopting the DFT will be described in detail in FIGS. 27 and 28 below.

The encoder 100 may perform post-processing for an output z[0 ... 7] in step S2520 and output final output data y[0 ... 7] (S2530).

FIG. 26 illustrates an example of a flowchart for designing inverse DST-7 having a length of 8 by using the DFT according to an embodiment of the present disclosure.

Referring to FIG. 26, a flowchart of implementing the DST-7 for one row or column having the length of 8 is shown. Further, the input data may be written as x[0 ... 7] and the final output data may be written as y[0 ... 7].

When the input data x[0 ... 7] is inputted, the decoder 200 performs pre-processing for the inverse DST-7 having the length of 8 (S2610).

The decoder 200 may apply the DFT to an output w[0 ... 7] in step S2610 (S2620). Here, step S2620 adopting the DFT will be described in detail in FIGS. 27 and 28 below.

The decoder 200 may perform post-processing for an output z[0 ... 7] in step S2120 and output final output data y[0 ... 7] (S2630).

Detailed operations of the functions in FIGS. 25 and 26 may be described by Tables 20 to 24 below.

Table 24 shows an operation of a Forward_DST7_Pre_Processing_B8 function.

TABLE 24

| Name | Forward_DST7_Pre_Processing_B8 |
|---|---|
| Input | src[0 ... 7] |
| Output | dst[0 ... 7] |
| Operation | dst[0] = src[1]; dst[1] = src[3]; dst[2] = src[5]; dst[3] = src[7]; dst[4] = src[6]; dst[5] = src[4]; dst[6] = src[2]; dst[7] = src[0]; |

Table 25 shows an operation of a Forward_DST7_Prost_Processing_B8 function.

TABLE 25

| Name | Forward_DST7_Post_Processing_B8 |
|---|---|
| Input | src[0 ... 7] |
| Output | dst[0 ... 7] |
| Operation | for (int i = 0; i < 8; i++) { dst[i] = (int)((src[i] + rnd_factor) >> shift); } |

In Table 25, a value of md_factor=1<<(shift−1) may be used. Here, the shift value is a value transferred through a parameter when a function of applying the DST-7 to all rows or columns of one block is used.

The operation of Table 25 may be derived by the R matrix of Equation 5 and Equation 63 below.

Table 26 shows an operation of an Inverse_DST7_Pre_Processing_B8 function.

TABLE 26

| Name | Inverse_DST7_Pre_Processing_B8 |
|---|---|
| Input | src[0 ... 7] |
| Output | dst[0 ... 7] |
| Operation | dst[0] = dst[7]; dst[1] = dst[6]; dst[2] = dst[5]; dst[3] = dst[4]; dst[4] = dst[3]; dst[5] = dst[2]; dst[6] = dst[1]; dst[7] = dst[0]; |

The operation of Table 26 is determined by Q and P matrices of Equation 8.

Table 27 shows an operation of an Inverse_DST7_Post_Processing_B8 function.

TABLE 27

| | |
|---|---|
| Name | Inverse_DST7_Post_Processing_B8 |
| Input | src[0 ... 7] |
| Output | dst[0 ... 7] |
| Operation | int aiReordIdx[8] = { 0, 7, 1, 6, 2, 5, 3, 4 };<br>for (int i = 0; i < 8; i++) {<br>   dst[i] = Clip3(outputMinimum, outputMaximum, (int)((src[aiReordIdx[i]]) + rnd_factor) >> shift);<br>} |

In Table 27, a value of md_factor=1<<(shift−1) may be used. Here, the shift value is a value transferred through a parameter when a function of applying the DST-7 to all rows or columns of one block is used.

In Table 27, outputMinimum and outputMaximum indicate a minimum value and a maximum value which the output value may have, respectively and a Clip3 function performs an operation of Clip3(A,B,C)=(C<A)? A:(C>B)? B:C. That is, the Clip3 function clips so that the C value particularly exists in the range of A to B.

Table 28 shows an operation of an xDST7_FFT_B8 function.

TABLE 28

| | |
|---|---|
| Name | xDST7_FFT_B8 |
| Input | src[0 . . . 7] |
| Output | dst[0 . . . 7] |
| Operation | int C8[8] = {127, 237, 314, 350, 338, 280, 185, 65 }<br>dst[0] = src[0]* C8[0] + src[1]* C8[1] +src[2]* C8[2] + src[3]* C8[3] + src[4]* C8[4] + src[5]* C8[5] + src[6]* C8[6] + src[7]* C8[7];<br>dst[1] = src[0]* C8[2] + src[1]* C8[5] − src[2]* C8[7] − src[3]* C8[4] − src[4]* C8[1] + src[5]* C8[0] + src[6]* C8[3] + src[7]* C8[6];<br>dst[2] = src[0]* C8[4] − src[1]* C8[6] − src[2]* C8[1] + src[3]* C8[2] + src[4]* C8[7] − src[5]* C8[3] + src[6]* C8[0] + src[7]* C8[5];<br>dst[3] = src[0]* C8[6] − src[1]* C8[2] +src[2]* C8[3] − src[3]* C8[5] + src[4]* C8[0] + src[5]* C8[7] − src[6]* C8[1] + src[7]* C8[4];<br>dst[4] = −src[0]* C8[7] + src[1]* C8[0] − src[2]* C8[6] + src[3]* C8[1] − src[4]* C8[5] + src[5]* C8[2] − src[6]* C8[4] + src[7]* C8[3];<br>dst[5] = −src[0]* C8[5] + src[1]* C8[4] − src[2]* C8[0] − src[3]* C8[6] + src[4]* C8[3] − src[5]* C8[1] − src[6]* C8[7] + src[7]* C8[2];<br>dst[6] = −src[0]* C8[3] − src[1]* C8[7] +src[2]* C8[4] + src[3]* C8[0] − src[4]* C8[2] − src[5]* C8[6] + src[6]* C8[5] + src[7]* C8[1];<br>dst[7] = −src[0]* C8[1] − src[1]* C8[3] − src[2] * C8[5] − src[3]* C8[7] + src[4]* C8[6] + src[5]* C8[4] + src[6]* C8[2] + src[7]* C8[0]; |

In Table 28, an array C8 indicates a value calculated through $$\text{round}\left(\frac{1}{\sqrt{2\times 8+1}}\cdot\sqrt{2}\cdot\sin\left(\frac{2\pi i}{17}\right)\cdot 2^{10}\right), i = 1, 2, 3, 4, 5, 6, 7, 8.$$

The operation of Table 28 may be calculated through Equation 63 below, and Equation 63 may be fundamentally determined by an equation for a 1D DFT, and R matrices of Equations 5 and 8.

$$\frac{1}{B}dst[k] = \frac{1}{B}\sum_{n=1}^{8} src[n]\left[A\ \sin\left(\frac{2\pi(2k+1)n}{17}\right)\right],$$ [Equation 63]

$$k = 0, 1, \ldots, 7$$

When the DST-7 is applied to an 8×82D block in the horizontal direction (or vertical direction), the flowcharts of FIGS. 25 and 26 above may be used for 8 rows (or columns).

DST-7 implementation described with reference to FIGS. 17 to 24 may be applied to the DST-7 having the length of 16 and the DST-7 having the length of 32, and DST-7 implementation described with reference to FIGS. 25 and 26 may also be applied to the DST7 for the length of 8. However, an embodiment of the present disclosure is not limited thereto, and may be differently applied. For example, when DST-7 implementation illustrated in FIGS. 17 to 26 is not applied, DST-7 implementation of a general matrix multiplication form may be applied.

According to an embodiment of the present disclosure, a scale value applied to the DFT may be determined according to a bit depth. For example, the bit depth of coefficients of all DFT kernels may be set to 10 or 8. For example, when the bit depth decreases from 10 to 8, an output of a first stage may increase by 1 for enhancement of operational accuracy.

FIG. 27 illustrates an example of a block diagram of 16×16 DST-7 to which a 33-point DFT is applied according to an embodiment of the present disclosure and FIG. 28 illustrates an example of a block diagram of 32×32 DST7 to which a 65-point DFT is applied according to an embodiment of the present disclosure.

In FIGS. 27 and 28, blocks represented by reference numerals 16 and 32 represent modules that perform permutation and code conversion of data, respectively. Through the index transform presented in Equations 14 and 15 and the symmetry of the input data presented in Equations 35 and 36, Simplified 3-point DFT Type 1, Simplified 3-point DFT Type 2, Simplified 5-point DFT Type 1, and Simplified 5-point DFT Type 2 blocks in FIGS. 27 and 28 may receive corresponding data, respectively, and some data are input after codes of some data are converted due to the symmetry in Equations 35 and 36. The symmetry presented in Equations 35 and 36 is caused by Q and P matrices in Equations 5 and 8. In the similar scheme, the outputs of the Simplified 11-point DFT Type 1, Simplified 11-point DFT Type 2, Simplified 13-point DFT Type 1, and Simplified 13-point DFT Type 2 blocks in FIGS. 27 and 28 may be reordered through the index transform presented in Equations 16 and 17 and the symmetrical relationships above described, and codes of some data may be converted due to the symmetry presented in Equations 31 to 34.

Case 1 of Equation 35 may be applied to an input vector in Simplified 3-point DFT Type 1 of FIG. 27 and Case 2 of Equation 35 may be applied to an input vector in Simplified 3-pt DFT Type 2. Further, Equation 41 (when k1=0) may be applied to an input vector in Simplified 11-point DFT Type 1 of FIG. 27 and Equation 42 (when k1=1) may be applied to an input vector in Simplified 11-point DFT Type 2.

Further, Case 1 of Equation 36 may be applied to an input vector in Simplified 5-point DFT Type 1 of FIG. 28 and Case 2 of Equation 36 may be applied to an input vector in Simplified 5-pt DFT Type 2. Further, Equation 41 (when k1=0) may be applied to an input vector in Simplified 13-point DFT Type 1 of FIG. 27 and Equation 42 (when k1=1, 2) may be applied to an input vector in Simplified 13-point DFT Type 2.

FIG. 29 illustrates an example of a flowchart for encoding to which forward DST-7 and forward DCT-8 are applied by using the DFT according to an embodiment of the present disclosure.

The encoder 100 may determine (or select) the horizontal transform and/or the vertical transform based on at least one of the prediction mode, the block shape, and/or the block size of the current block (S2910). In this case, a candidate of the horizontal transform and/or the vertical transform may include at least one of the embodiments of FIG. 9 or Table 1.

The encoder 100 may determine an optimal horizontal transform and/or an optimal vertical transform through rate distortion (RD) optimization. The optimal horizontal transform and/or the optimal vertical transform may correspond to one of a plurality of transform combinations and the plurality of transform combinations may be defined by a transform index.

The encoder 100 may signal a transform index corresponding to the optimal horizontal transform and/or the optimal vertical transform (S2920). Here, the transform index may adopt other embodiments described in the present disclosure. For example, the transform index may include at least one of the embodiments of FIG. 9 or Table 1.

As another example, the encoder 100 may independently signal a horizontal transform index for the optimal horizontal transform and a vertical transform index for the optimal vertical transform.

The encoder 100 may perform a forward transform in the horizontal direction with respect to the current block by using the optimal horizontal transform (S2930). Here, the current block may mean a transform block and the optimal horizontal transform may be forward DCT-8.

In addition, the encoder 100 may perform the forward transform in the vertical direction with respect to the current block by using the optimal vertical transform (S2940). Here, the optimal vertical transform may be forward DST-7, and the forward DST-7 may be designed based on the DFT.

In the embodiment, when the vertical transform is performed after the horizontal transform, but an embodiment of the present disclosure is not limited thereto. That is, the horizontal transform may be performed after the vertical transform.

As an embodiment, a combination of the horizontal transform and the vertical transform may include at least one of the embodiments of FIG. 9 or Table 1.

Meanwhile, the encoder 100 performs quantization for the current block to generate a transform coefficient block (S2950).

Further, the encoder 100 performs entropy encoding for the transform coefficient block to generate a bitstream.

FIG. 30 illustrates an example of a flowchart for decoding to which inverse DST-7 and inverse DCT-8 are applied by using the DFT according to an embodiment of the present disclosure.

The decoder 200 may acquire a transform index from the bitstream (S3010). Here, the transform index may refer to an MTS index described in the present disclosure. For example, the MTS index may indicate one of transform configuration groups shown in FIG. 9 or Table 1 or one (horizontal transform/vertical transform) of transform combinations shown in Table 1.

The decoder 200 may derive the horizontal transform and the vertical transform corresponding to the transform index (S3020). In this case, the candidate of the horizontal transform and/or the vertical transform may include at least one of the embodiments of FIG. 9 or Table 1.

However, steps S3010 and S3020 are an embodiment, and an embodiment of the present disclosure is not limited thereto. For example, the decoder 200 may derive the horizontal transform and the vertical transform based on at least one of the prediction mode, the block shape, and/or the block size of the current block. As another example, the transform index may include a horizontal transform index corresponding to the horizontal transform and a vertical transform index corresponding to the vertical transform.

Meanwhile, the decoder 200 may obtain the transform coefficient block by entropy-decoding the bitstream and perform dequantization for the transform coefficient block (S3030).

The decoder 200 may perform an inverse transform for the dequantized transform coefficient block in the vertical direction by using the vertical transform (S3040). Here, the vertical transform may correspond to DST-7. That is, the decoder 200 may apply inverse DST-7 to the dequantized transform coefficient block.

An embodiment of the present disclosure provides a method for designing forward DST-7 and/or inverse DST-7 based on the DFT.

The decoder 200 may implement the DST-7 through a 1D DFT or a 2D DFT.

Further, the decoder 200 may implement the DST-7 only by an integer operation by applying various scaling methods.

Further, the decoder 200 may design DST7 having lengths of 8, 16, and 32 through the DST-7 implementation method using the DFT and the method for implementing the DST-7 only by the integer operation.

Further, the decoder 200 may decrease a bit-depth for expressing DFT kernel coefficients from 10 to 8 to enable faster implementation than an 8×16 multiplication. Further, a first stage output may increase by 1 for improvement of operational accuracy.

The decoder 200 according to an embodiment of the present disclosure may process a video signal by using a transform having a low complexity, and for example, acquire the transform index of the current block from the video signal. Here, the transform index is related to any one of a plurality of transform combinations constituted by combinations of Discrete Sine Transform type-7 (DCT-7) or Discrete Cosine Transform type-8 (DCT-8). Further, the decoder 200 may derive the transform combination related to the transform index, and here, the transform combination includes the horizontal transform and the vertical transform, and the horizontal transform and the vertical transform are related to any one of the DST-7 or the DCT-8. Thereafter, the decoder 200 may apply the transform for the current block based on the transform combination related to the acquired transform index. In the embodiment, the DST-7 or the DCT-8 may be derived based on a Discrete Fourier Transform (DFT) to which the scale value is applied, and the scale value may be the power of 2.

In an embodiment, the scale value applied to the DFT may be determined based on a bit length of an output value according to the vertical-direction transform and the horizontal-direction transform. Further, the DFT to which the scale value is applied may be approximated by a shift operation based on the scale value.

In an embodiment, when the width of the current block is N, the DST-7 or DCT-8 may be derived based on a 2N+1 point DFT. Here, when the width of the current is 16, the DST-7 or the DCT8 may be derived based on the 33-point DFT and the 33-point DFT may include a 3-point 2D DFT and an 11-point 2D DFT. Further, when the width of the current is 32, the DST-7 or the DCT8 may be derived based on the 65-point DFT and the 65-point DFT may include a 5-point 2D DFT and a 13-point 2D DFT.

Further, the 2N+1-point DFT may include a first type DFT outputting, from first input data having a first length, first output data having the first length and a second DFT outputting, from second input data having a second length different from the first length, second output data having the second length.

The above-described embodiment of the present disclosure may be described again as follows. The following description relates to a method for outputting residual samples (nTbW)×(nTbH) array r[x][y] from (nTbW)×(nTbH) array d[x][y] of scaled transform coefficients. Here, nTbW represents a width of a current transform block and nTbH represents a height of the current transform block, and x=0 . . . nTbW−1 and y=0 . . . nTbH−1. In the present disclosure "var=A . . . B" means that from A to B may be applied as a variable var value.

A variable trTypeHor indicating a horizontal transform kernel and a variable trTypeVer indicating a vertical transform kernel may be derived by Table 29 below based on an MTS index (mts_idx[xTbY][yTbY][cIdx]). Here, xTbY and xTbY represent x and y locations of a top-left sample of the current transform block, and cIdx represents a chroma component of the current transform block. Table 29 is shown as follows.

TABLE 29

| mts_idx [xTbY] [yTbY] [cIdx] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

In Table 29, mts_idx represents the MTS index of a corresponding block, trTypeHor represents the type of horizontal-direction transform, and trTypeVer represents the type of vertical-direction transform. For example, as the horizontal or vertical transform index, 0 may indicate DCT-2, 1 may indicate DST-7 (or DCT-8), or 2 may indicate the DCT-8 (or DST-7). According to an embodiment, in addition to the DST or DCT, various types of transform kernels may be configured to correspond to each transform type index.

Variables nonZeroW and nonZeroH may be derived as in Equation 64 below.

nonZeroW=Min(nTbW,32)

nonZeroH=Min(nTbH,32)   [Equation 64]

In Equation 64, Min(A, B) represents a function of outputting the smaller value of A and B.

An array of residual samples, (nTbW)×(nTbH) may be derived as follows.

1. For each column (each column is distinguished into x=nonZeroW−1) of scaled (nonZeroW)×(nonZeroH) array transform coefficient block d[x][y] (here, x=0 . . . nonZeroW−1, y=0 . . . nonZeroH−1), a (nonZeroW)×(nTbH) array block e[x][y] (x=0 . . . nonZeroW−1, y=0 . . . nTbH−1) is obtained as an output by invoking the following one-dimensional transformation process (invoking at a total number of nonZeroW times). When invoking the corresponding 1D transformation process for an x-th column, a transform length nTbH, a scaled transform coefficient vector length nonZeroH, a scaled transform coefficient vector d[x][y] (here, an x value means the x-th column, y=0 . . . nonZeroH−1), and tyTypeVer (transferred to a parameter tyType) representing a transform type are transferred as input factors, and a vector (list) e[x][y] (here, an x value means the x-th column, y=0 . . . nTbH−1) is obtained as the output of the corresponding 1D transformation process.

If nTbH is equal to 16 or 32 and tyTypeVer is equal to 1 or 2, a 1D transformation process is hereinafter performed according to 'a transformation process for the case that the sample size of transformed samples is 16 or 32 and the transform kernel type is 1 or 2'.

If not (if nTbH is not equal to 16 or 32 and tyTypeVer is not equal to 1 or 2), a 1D transformation process is hereinafter performed according to 'a transformation process for the case except for the case that the sample size of transformed samples is 16 or 32 and the transform kernel type is 1 or 2'.

2. Intermediate sample values g[x][y] for x=0 . . . nonZeroW−1, y=0 . . . nTbH−1 are derived by Equation 65 below.

$$g[x][y] = \text{Clip3}(\textit{CoeffMin}, \textit{CoeffMax}, (e[x][y] + 64) >> 7) \quad \text{[Equation 65]}$$

In Equation 65, Clip3(Min, Max, A) represents a function of limiting A to have a value between Min and Max, and "X>>Y" represents a right shift operation by Y for X (X*2Y).

3. For each row (each row is distinguished into y=0 . . . nTbH−1) of a (nonZeroW)×(nTbH) array block g[x][y] (here, x=0 . . . nonZeroW−1, y=0 . . . nTbH−1) derived by Equation 65, an (nTbW)×(nTbH) array block r[x][y] (here, x=0 . . . nonZeroW−1, y=0 . . . nTbH−1) is obtained as the output by invoking the following 1D transformation process (invoking at a total number of nTbH times). When invoking the corresponding 1D transformation process for a y-th row, a transform length nTbW, an input vector length nonZeroW, an input vector g[x][y] (here, y means the y-th row, x=0 . . . nonZeroW−1), and tyTypeHor (transferred to a parameter tyType) representing the transform type are transferred as input factors, and a vector (list) r[x][y] (here, an y value means the y-th row, x=0 . . . nTbW−1) is obtained as the output of the corresponding 1D transformation process.

If nTbW is equal to 16 or 32 and tyTypeHor is equal to or 1 or 2, a 1D transformation process is hereinafter performed according to 'a transformation process for the case that the sample size of transformed samples is 16 or 32 and the transform kernel type is 1 or 2'.

If not (if nTbW is not equal to 16 or 32 and tyTypeHor is not equal to 1 or 2), a 1D transformation process is hereinafter performed according to 'a transformation process for the case except for the case that the sample size of transformed samples is 16 or 32 and the transform kernel type is 1 or 2'.

Transformation process except for the case that the sample size of transformed samples is 16 or 32 and the transform kernel type is 1 or 2

Inputs of the process are as follows.
Variable nTbs representing a horizontal sample size of transformed samples,
Variable nonZeroS representing a horizontal sample size of non-zero scaled transform coefficients,
List x[j] of scaled transform coefficients for j=0 . . . nonZeroS−1,
Transform kernel type variable trType
An output of the process is a list y[i] (i=0 . . . nTbS−1) of transformed samples.

A 'transformation matrix derivation process' described below is invoked to obtain a matrix transMatrix as an output value. When invoking the corresponding process, nTbS which is the transform size and trType which is the transform kernel type are transferred as the input factors.

Variable nonZeroS representing a horizontal sample size of non-zero scaled transform coefficients,
List x[j] of scaled transform coefficients for j=0 . . . nonZeroS−1,
Transform kernel type variable trType
An output of the process is a list y[i] (i=0 . . . nTbS−1) of transformed samples.

A variable sclTrCoeffPermIdx[j] (j=0 . . . nTbS−1) related to an index for permutation of scaled transform coefficients and a variable sclTrCoeffPermSgn[j] (j=0 . . . nTbS−1) related to a sign of the scaled transform coefficients are derived as follows.

If nTbS is 16, the variable sclTrCoeffPermIdx[j] (j=0 . . . nTbS−1) and the variable sclTrCoeffPermSgn[j] (j=0 . . . nTbS−1) are defined as in Table 30 below.

TABLE 30

| j | 0 | 1 | 2 | 3 | 4 | 5 | 6 | 7 |
|---|---|---|---|---|---|---|---|---|
| sclTrCoeffPermIdx[j] | 5 | 4 | 15 | 6 | 7 | 3 | 14 | 13 |
| sclTrCoeffPermSgn[j] | −1 | 1 | 1 | −1 | −1 | 1 | 1 | 1 |
| j | 8 | 9 | 10 | 11 | 12 | 13 | 14 | 15 |
| sclTrCoeffPermIdx[j] | 8 | 2 | 1 | 12 | 9 | 10 | 0 | 11 |
| sclTrCoeffPermSgn[j] | −1 | 1 | 1 | 1 | −1 | −1 | 1 | 1 |

If nTbS is 32, the variable sclTrCoeffPermIdx[j] (j=0 . . . nTbS−1) and the variable sclTrCoeffPermSgn[j] (j=0 . . . nTbS−1) are defined as in Table 31 below.

TABLE 31

| j | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| sclTrCoeffPermIdx[j] | 6 | 19 | 7 | 31 | 5 | 20 | 18 | 17 | 8 | 30 | 4 | 21 | 22 | 16 | 9 | 29 |
| sclTrCoeffPermSgn[j] | 1 | −1 | −1 | 1 | 1 | −1 | 1 | 1 | −1 | 1 | 1 | −1 | −1 | 1 | −1 | 1 |
| j | 16 | 17 | 18 | 19 | 20 | 21 | 22 | 23 | 24 | 25 | 26 | 27 | 28 | 29 | 30 | 31 |
| sclTrCoeffPermIdx[j] | 3 | 2 | 23 | 15 | 10 | 28 | 27 | 1 | 24 | 14 | 11 | 12 | 26 | 0 | 25 | 13 |
| sclTrCoeffPermSgn[j] | 1 | 1 | −1 | 1 | −1 | 1 | 1 | 1 | −1 | 1 | −1 | −1 | 1 | 1 | −1 | 1 |

Based on tyType, the following process is applied. A list y[i] (i=0 . . . nTbS−1) of the transformed samples is derived as follows.

If trType is 0, a transformation matrix multiplication shown in Equation 66 below is applied.

$$y[i] = \sum_{j=0}^{nonZeroS-1} transMatrix[i][j*2^{6-Log2(nTbS)}]*x[j] \text{ with } i = 0..nTbS-1$$

[Equation 66]

If not (if trType is 1 or 2), a transformation matrix multiplication shown in Equation 67 below is applied.

$$y[i] = \sum_{j=0}^{nonZeroS-1} transMatrix[i][j]*x[j] \text{ with } i=0 \ldots nTbS-1$$

[Equation 67]

Transformation process for the case that the sample size of transformed samples is 16 or 32 and the transform kernel type is 1 or 2

Inputs of the process are as follows.
Variable nTbs representing a horizontal sample size of transformed samples, A variable u[j] (j=0 . . . nTbS−1) may be derived by the following process.

If trType is 1, the following process is applied.
u[j]=(sclTrCoeffPermSgn[j]>0)? x[sclTrCoeffPermIdx[j]]:−x[sclTrCoeffPermIdx[j]] with j=0 . . . nonZeroS−1.

When nTbS>nonZeroS, u[j] with j=nonZeroS . . . nTbS−1 is equal to 0.

Here, a function (x? A:B) is a function of outputting A when an x condition is satisfied and B when the x condition is not satisfied.

If not (if trType is 2), the following process is applied.
u[ j]=(((1−(j % 2)<<1)*sclTrCoeffPermSgn[j])>0)? x[sclTrCoeffPermIdx[j]]: −x[sclTrCoeffPermIdx[j]] with j=0 . . . nonZeroS−1.

When nTbS>nonZeroS, u[j] with j=nonZeroS . . . nTbS−1 is equal to 0.

A variable z[i] (i=0 . . . nTbS−1) may be derived by the following process.

If nTbS is 16, the following steps are applied.
1. A variable v[j] (j=0 . . . 15) is derived as follows.
A variable v[11] is derived as in Equation 68 below.

$$v[11]=(-u[0]*111+(1<<6))>>7$$ [Equation 68]

A transformation matrix transMatrix3×3 is derived as in Table 32 below.

TABLE 32

$$\begin{Bmatrix} \{ 128 & 128 & 128 \} \\ \{ 128 & -64 & -64 \} \\ \{ 0 & -111 & 111 \} \end{Bmatrix}$$

For i=0 . . . 4, the following steps are applied.
A variable inMatrix3×3[k] (k=0 . . . 2) is u[(3*i)+k+1].
A variable outMatrix3×3[k] (k=0 . . . 2) is shown in Equation 69 below.

$$v[i+(5*k+((k==)?1:0)]=(\text{outMatrix3x3}[k]+(1<<6))>>7$$
with k=0 . . . 2 [Equation 69]

2. Transformation matrices transMatrix5×5 and transMatrix6×6 are derived as in Tables 33 and 34 below.

TABLE 33

$$\begin{Bmatrix} \{ -48 & -81 & -88 & -67 & -25 \} \\ \{ -81 & -67 & 25 & 88 & 48 \} \\ \{ -88 & 25 & 81 & -48 & -67 \} \\ \{ -67 & 88 & -48 & -25 & 81 \} \\ \{ -25 & 48 & -67 & 81 & -88 \} \end{Bmatrix},$$

TABLE 34

$$\begin{Bmatrix} \{ 89 & 89 & 89 & 89 & 89 & 89 \} \\ \{ 89 & 75 & 37 & -13 & -15 & -86 \} \\ \{ 89 & 37 & -58 & -86 & -13 & 75 \} \\ \{ 89 & -13 & -86 & 37 & 75 & -58 \} \\ \{ 89 & -58 & -13 & 75 & -86 & 37 \} \\ \{ 89 & -86 & 75 & -58 & 37 & -13 \} \end{Bmatrix}$$

3. A variable z[i] (i=0 . . . 15) is derived as follows.
A variable z[i] for i=0 . . . 4 is derived as in Equation 70 below.

$$z[i]=\Sigma_{j=0}^{4} \text{transMatrix5x5}[i][j]*v[j] \text{ with } i=0 \ldots 4 \quad [\text{Equation 70}]$$

A variable outMatrix5×5[j] for j=0 . . . 4 and a variable outMatrix6×6[k] for k=0 . . . 5 are derived as in Equations 71 and 72 below.

$$outMatrix5x5[j] = \qquad [\text{Equation 71}]$$
$$\sum_{i=0}^{4} transMatrix5x5[j][1] * v[5+1] \text{ with } j = 0..4$$

$$outMatrix6x6[k] = \qquad [\text{Equation 72}]$$
$$\sum_{i=0}^{5} transMatrix6x6[j][1] * v[10+1] \text{ with } k = 0..5$$

A variable z[i] for i=5 . . . 15 is derived as in Equation 73 below.

z[5]=outMatrix6×6[0], z[6+j]=outMatrix6×6[j+1]+outMatrix5×5[j] with j=0 . . . 4, z[11+j]=outMatrix6×6[5−j]−outMatrix5×5[4−j] with j=0 . . . 4 [Equation 73]

If not (if nTbS is 32), the following steps are applied.
1. A variable v[j] for j=0 . . . 31 is derived by the following process.
Variables v[12] and v[25] are derived as in Equation 74 below.

$$v[12]=(-u[0]*122-u[1]*75+(1<<6))>>7$$

$$v[25]=(-u[0]*75+u[1]*122+(1<<6))>>7 \quad [\text{Equation 74}]$$

TABLE 35 transMatrix5x5[ m ][ n ]=

$$\begin{Bmatrix} \{ 128 & 128 & 128 & 128 & 128 \} \\ \{ 128 & 40 & -104 & -104 & 40 \} \\ \{ 0 & -122 & -75 & 75 & 122 \} \\ \{ 128 & -104 & 40 & 40 & -104 \} \\ \{ 0 & -75 & 122 & -122 & 75 \} \end{Bmatrix}$$

For i=0 . . . 4, the following steps are applied.
1. A variable inMatrix5×5[k] for k=0 . . . 4 is u[(5*i)+k].
2. A variable outMatrix3×3[k] for k=0 . . . 4 is derived by Equation 75 below.

$$outMatrix5x5[k]=\Sigma_{j=0}^{4} \text{transMatrix5x5}[k][j]*inMatrix5x5[j] \text{ with } k=0 \ldots 4 \quad [\text{Equation 75}]$$

3. A variable v[j] for j=i, (i+6), (i+13), (i+19), (i+26) is derived by Equation 76 below.

$$v[i + (6*k) + ((k > 1)?1:0) + ((k == 4)?1:0)] = \qquad [\text{Equation 76}]$$
$$(outMatrix5x5[k] + (1 << 6)) >> 7 \text{ with } k = 0..4$$

2. Transformation matrices transMatrix 6×6 and transMatrix 7×7 are derived as in Tables 36 and 37 below.

TABLE 36 transMatrix6x6[ m ][ n ]=

$$\begin{Bmatrix} \{ -42 & -74 & -89 & -84 & -60 & -21 \} \\ \{ -74 & -84 & -21 & 60 & 89 & 42 \} \\ \{ -89 & -21 & 84 & 42 & -74 & -60 \} \\ \{ -84 & 60 & 42 & -89 & 21 & 74 \} \\ \{ -60 & 89 & -74 & 21 & 42 & -84 \} \\ \{ -21 & 42 & -60 & 74 & -84 & 89 \} \end{Bmatrix},$$

TABLE 37 transMatrix7x7[ m ][ n ]=

$$\begin{Bmatrix} \{ 90 & 90 & 90 & 90 & 90 & 90 & 90 \} \\ \{ 90 & 80 & 51 & 11 & -32 & -67 & -87 \} \\ \{ 90 & 51 & -32 & -87 & -67 & 11 & 80 \} \\ \{ 90 & 11 & -87 & -32 & 80 & 51 & -67 \} \\ \{ 90 & -32 & -67 & 80 & 11 & -87 & 51 \} \\ \{ 90 & -67 & 11 & 51 & -87 & 80 & -32 \} \\ \{ 90 & -87 & 80 & -67 & 51 & -32 & 11 \} \end{Bmatrix}$$

3. A variable z[i] for i=0 . . . 31 is derived as follows.
A variable z[i] for i=0 . . . 5 is derived as in Equation 77 below.

$$z[i]=\Sigma_{j=0}^{4} \text{transMatrix6x6}[i][j]*v[j] \text{ with } i=0 \ldots 5 \quad [\text{Equation 77}]$$

For I=0, 1, the following steps are applied.

1.—A variable outMatrix6×6[j] for j=0 . . . 5 and a variable outMatrix7×7[k] for k=0 . . . 6 are derived as in Equations 78 and 79 below.

$$outMatrix6x6[j] = \sum_{i=0}^{5} transMatrix6x6[j][i] * v[6 + (13 * 1) + i] \text{ with } j = 0..5$$ [Equation 78]

$$outMatrix7x7[k] = \sum_{i=0}^{6} transMatrix7x7[j][i] * v[12 + (13 * 1) + i] \text{ with } k = 0..6$$ [Equation 79]

2. —A variable z[i] for i=(6+(13*I)) . . . (18+(13*I)) is derived as in Equation 80 below.

z[6+(13*1)]=outMatrix7×7[0], z[7+(13*1)+j]=outMatrix6×6[j]+outMatrix7×7[j+1] with j=0 . . . 5, z[13+(13*1)+j]=−outMatrix6×6[5−j]+outMatrix7×7 [6−j] with j=0 . . . 5  [Equation 80]

A variable trafoSamplePermIdx[j] for j=0 . . . nTbS−1 and a variable trafoSamplePermSgn[j] for j=0 . . . nTbS−1 are derived as follows.

If nTbS is 16, the variable trafoSamplePermIdx[j] for j= 0 . . . nTbS−1 and the variable trafoSamplePermSgn[j] for j=0 . . . nTbS−1 are defined as in Table 38 below.

If nTbS is 32, the variable trafoSamplePermIdx[j] for j= 0 . . . nTbS−1 and the variable trafoSamplePermSgn[j] for j=0 . . . nTbS−1 are defined as in Table 39 below.

TABLE 38

| j | 0 | 1 | 2 | 3 | 4 | 5 | 6 | 7 |
|---|---|---|---|---|---|---|---|---|
| trafoSamplePermIdx[j] | 12 | 13 | 0 | 11 | 14 | 1 | 10 | 15 |
| trafoSamplePermSgn[j] | 1 | 1 | −1 | −1 | −1 | 1 | 1 | 1 |
| j | 8 | 9 | 10 | 11 | 12 | 13 | 14 | 15 |
| trafoSamplePermIdx[j] | 2 | 9 | 5 | 3 | 8 | 6 | 4 | 7 |
| trafoSamplePermSgn[j] | −1 | −1 | −1 | 1 | 1 | 1 | −1 | −1 |

TABLE 39

| j | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| trafoSamplePermIdx[j] | 27 | 16 | 17 | 26 | 0 | 28 | 15 | 18 | 25 | 1 | 29 | 14 | 6 | 24 | 2 | 30 |
| trafoSamplePermSgn[j] | −1 | −1 | −1 | −1 | −1 | 1 | 1 | 1 | 1 | 1 | −1 | −1 | −1 | −1 | −1 | 1 |
| J | 16 | 17 | 18 | 19 | 20 | 21 | 22 | 23 | 24 | 25 | 26 | 27 | 28 | 29 | 30 | 31 |
| trafoSamplePermIdx[j] | 13 | 7 | 23 | 3 | 31 | 12 | 8 | 22 | 4 | 19 | 11 | 9 | 21 | 5 | 20 | 10 |
| trafoSamplePermSgn[j] | 1 | 1 | 1 | 1 | −1 | −1 | −1 | −1 | −1 | 1 | 1 | 1 | 1 | 1 | −1 | −1 |

A list y[i] (i=0 . . . nTbS−1) of the transformed samples is derived as follows.

If trType is 1, Equation 81 below is applied.

u[j]=(sclTrCoeffPermSgn[j]>0)?x[sclTrCoeffPermIdx [j]]:−x[sclTrCoeffPermIdx[j]] with j=0 . . . nTbS−1.  [Equation 81]

If not (if trType is 2), Equation 82 below is applied.

u[j]=((sclTrCoeffPermSgn[nTbS−1−j])>0)?x[sclTrCoeffPermIdx[nTbS−1j]]:−x[sclTrCoeffPermIdx [nTbS−1−j]] with j=0 . . . nTbS−1.  [Equation 82]

Transformation matrix derivation process

Inputs of the process are as follows.

Variable nTbS representing a horizontal sample size of transformed coefficients, Transform kernel type trType.

An output of the process is a matrix transMatrix.

The transformation matrix transMatrix is derived based on trType and nTbs as follows:

If trType is 0, Tables 40 and 41, and Equations 83 and 84 below are applied.

In Table 40, transMatrix[m][n]=transMatrixCol0to15[m][n] with m=0 . . . 15, n=0 . . . 63 and in Table 41, transMatrix[m][n]=transMatrixCol16to31[m−16][n] with m=16 . . . 31, n=0 . . . 63. Table 40 shows transMatrixCol0to15[m][n] and Table 41 shows transMatrixCol16to31[m−16][n].

TABLE 40 transMatrixCol0to15=

{
| { | 64 | 64 | 64 | 64 | 64 | 64 | 64 | 64 | 64 | 64 | 64 | 64 | 64 | 64 | 64 | 64 | } |
|---|---|---|---|---|---|---|---|---|---|---|---|---|---|---|---|---|---|
| { | 91 | 90 | 90 | 90 | 88 | 87 | 86 | 84 | 83 | 81 | 79 | 7 | 73 | 71 | 69 | 65 | } |
| { | 90 | 90 | 88 | 85 | 82 | 78 | 73 | 67 | 61 | 54 | 46 | 38 | 31 | 22 | 13 | 4 | } |
| { | 90 | 88 | 84 | 79 | 71 | 62 | 52 | 41 | 28 | 15 | 2 | −11 | −24 | −37 | −48 | −59 | } |
| { | 90 | 87 | 80 | 70 | 57 | 43 | 25 | 9 | −9 | −25 | −43 | −57 | −70 | −80 | −87 | −90 | } |
| { | 90 | 84 | 73 | 59 | 41 | 20 | −2 | −24 | −44 | −62 | −77 | −86 | −90 | −90 | −83 | −71 | } |
| { | 90 | 82 | 67 | 46 | 22 | −4 | −31 | −54 | −73 | −85 | −90 | −88 | −78 | −61 | −38 | −13 | } |
| { | 90 | 79 | 59 | 33 | 2 | −28 | −56 | −77 | −88 | −90 | −81 | −62 | −37 | −7 | 24 | 52 | } |
| { | 89 | 75 | 50 | 18 | −18 | −50 | −75 | −89 | −89 | −75 | −50 | −18 | 18 | 50 | 75 | 89 | } |
| { | 88 | 71 | 41 | 2 | −37 | −69 | −87 | −90 | −73 | −44 | −7 | 33 | 65 | 86 | 90 | 77 | } |
| { | 88 | 67 | 31 | −13 | −54 | −82 | −90 | −78 | −46 | −4 | 38 | 73 | 90 | 85 | 61 | 22 | } |
| { | 87 | 62 | 20 | −28 | −69 | −90 | −84 | −56 | −11 | 37 | 73 | 90 | 81 | 48 | 2 | −44 | } |
| { | 87 | 57 | 9 | −43 | −80 | −90 | −70 | −25 | 25 | 70 | 90 | 80 | 43 | −9 | −57 | −87 | } |
| { | 86 | 52 | −2 | −56 | −87 | −84 | −48 | 7 | 59 | 88 | 83 | 44 | −11 | −62 | −90 | −81 | } |
| { | 85 | 46 | −13 | −67 | −90 | −73 | −22 | 38 | 82 | 88 | 54 | −4 | −61 | −90 | −78 | −31 | } |
| { | 84 | 41 | −24 | −77 | −90 | −56 | 7 | 65 | 91 | 69 | 11 | −52 | −88 | −79 | −28 | 37 | } |
| { | 83 | 36 | −36 | −83 | −83 | −36 | 36 | 83 | 83 | 36 | −36 | −83 | −83 | −36 | 36 | 83 | } |
| { | 83 | 28 | −44 | −88 | −73 | −11 | 59 | 91 | 62 | −7 | −71 | −90 | −48 | 24 | 81 | 84 | } |
| { | 82 | 22 | −54 | −90 | −61 | 13 | 78 | 85 | 31 | −46 | −90 | −67 | 4 | 73 | 88 | 38 | } |
| { | 81 | 15 | −62 | −90 | −44 | 37 | 88 | 69 | −7 | −77 | −84 | −24 | 56 | 91 | 52 | −28 | } |
| { | 80 | 9 | −70 | −87 | −25 | 57 | 90 | 43 | −43 | −90 | −57 | 25 | 87 | 70 | −9 | −80 | } |
| { | 79 | 2 | −77 | −81 | −7 | 73 | 83 | 11 | −71 | −84 | −15 | 69 | 86 | 20 | −65 | −87 | } |
| { | 78 | −4 | −82 | −73 | 13 | 85 | 67 | −22 | −88 | −61 | 31 | 90 | 54 | −38 | −90 | −46 | } |
| { | 77 | −11 | −86 | −62 | 33 | 90 | 44 | −52 | −90 | −24 | 69 | 83 | 2 | −81 | −71 | 20 | } |
| { | 75 | −18 | −89 | −50 | 50 | 89 | 18 | −75 | −75 | 18 | 89 | 50 | −50 | −89 | −18 | 75 | } |
| { | 73 | −24 | −90 | −37 | 65 | 81 | −11 | −88 | −48 | 56 | 86 | 2 | −84 | −59 | 44 | 90 | } |
| { | 73 | −31 | −90 | −22 | 78 | 67 | −38 | −90 | −13 | 82 | 61 | −46 | −88 | −4 | 85 | 54 | } |
| { | 71 | −37 | −90 | −7 | 86 | 48 | −62 | −79 | 24 | 91 | 20 | −81 | −59 | 52 | 84 | −11 | } |
| { | 70 | −43 | −87 | 9 | 90 | 25 | −80 | −57 | 57 | 80 | −25 | −90 | −9 | 87 | 43 | −70 | } |
| { | 69 | −48 | −83 | 24 | 90 | 2 | −90 | −28 | 81 | 52 | −65 | −71 | 44 | 84 | −20 | −90 | } |
| { | 67 | −54 | −78 | 38 | 85 | −22 | −90 | 4 | 90 | 13 | −88 | −31 | 82 | 46 | −73 | −61 | } |
| { | 65 | −59 | −71 | 52 | 77 | −44 | 81 | 37 | 84 | −28 | −87 | 20 | 90 | −11 | −90 | 2 | } |
| { | 64 | −64 | −64 | 64 | 64 | −64 | −64 | 64 | 64 | −64 | −64 | 64 | 64 | −64 | −64 | 64 | } |
| { | 62 | −69 | −56 | 73 | 48 | −79 | −41 | 83 | 33 | −86 | −24 | 88 | 15 | −90 | −7 | 91 | } |
| { | 61 | −73 | −46 | 82 | 31 | −88 | −13 | 90 | −4 | −90 | 22 | 85 | −38 | −78 | 54 | 67 | } |
| { | 59 | −77 | −37 | 87 | 11 | −91 | 15 | 86 | −41 | −73 | 62 | 56 | −79 | −33 | 88 | 7 | } |
| { | 57 | −80 | −25 | 90 | −9 | −87 | 43 | 70 | −70 | −43 | 87 | 9 | −90 | 25 | 80 | −57 | } |
| { | 56 | −83 | −15 | 90 | −28 | −77 | 65 | 44 | −87 | −2 | 88 | −41 | −69 | 73 | 33 | −90 | } |
| { | 54 | −85 | −4 | 88 | −46 | −61 | 82 | 13 | −90 | 38 | 67 | −78 | −22 | 90 | −31 | −73 | } |
| { | 52 | −87 | 7 | 83 | −62 | −41 | 90 | −20 | −77 | 71 | 28 | −91 | 33 | 69 | −79 | −15 | } |
| { | 50 | −89 | 18 | 75 | −75 | −18 | 89 | −50 | −50 | 89 | −18 | −75 | 75 | 18 | −89 | 50 | } |
| { | 48 | −90 | 28 | 65 | −84 | 7 | 79 | −73 | −15 | 87 | −59 | −37 | 91 | −41 | −56 | 88 | } |
| { | 46 | −90 | 38 | 54 | −90 | 31 | 61 | −88 | 22 | 67 | −85 | 13 | 73 | −82 | 4 | 78 | } |
| { | 44 | −91 | 48 | 41 | −90 | 52 | 37 | −90 | 56 | 33 | −90 | 59 | 28 | −88 | 62 | 24 | } |
| { | 43 | −90 | 57 | 25 | −87 | 70 | 9 | −80 | 80 | −9 | −70 | 87 | −25 | −57 | 90 | −43 | } |
| { | 41 | −90 | 65 | 11 | −79 | 83 | −20 | −59 | 90 | −48 | −33 | 87 | −71 | −2 | 73 | −86 | } |
| { | 38 | −88 | 73 | −4 | −67 | 90 | −46 | −31 | 85 | −78 | 13 | 61 | −90 | 54 | 22 | −82 | } |
| { | 37 | −86 | 79 | −20 | −52 | 90 | −69 | 2 | 65 | −90 | 56 | 15 | −77 | 87 | −41 | −33 | } |
| { | 36 | −83 | 83 | −36 | −36 | 83 | −83 | 36 | 36 | −83 | 83 | −36 | −36 | 83 | −83 | 36 | } |
| { | 33 | −81 | 87 | −48 | −15 | 71 | −90 | 62 | −2 | −59 | 90 | −73 | 20 | 44 | −86 | 83 | } |
| { | 31 | −78 | 90 | −61 | 4 | 54 | −88 | 82 | −38 | −22 | 73 | −90 | 67 | −13 | −46 | 85 | } |
| { | 28 | −73 | 91 | −71 | 24 | 33 | −77 | 90 | −69 | 20 | 37 | −79 | 90 | −65 | 15 | 41 | } |
| { | 25 | −70 | 90 | −80 | 43 | 9 | −57 | 87 | −87 | 51 | −9 | −43 | 80 | −90 | 70 | −25 | } |
| { | 24 | −65 | 8 | −86 | 59 | −15 | −33 | 71 | −90 | 83 | −52 | 7 | 41 | −77 | 91 | −79 | } |
| { | 22 | −61 | 85 | −90 | 73 | −38 | −4 | 46 | −78 | 90 | −82 | 54 | −13 | −31 | 67 | −88 | } |
| { | 20 | −56 | 81 | −91 | 83 | −59 | 24 | 15 | −52 | 79 | −90 | 84 | −62 | 28 | 11 | −48 | } |
| { | 18 | −50 | 75 | −89 | 89 | −75 | 50 | −18 | −18 | 50 | −75 | 89 | −89 | 75 | −50 | 18 | } |
| { | 15 | −44 | 69 | −84 | 91 | −86 | 71 | −48 | 20 | 11 | −41 | 65 | −83 | 90 | −87 | 73 | } |
| { | 13 | −38 | 61 | −78 | 88 | −90 | 85 | −73 | 54 | −31 | 4 | 22 | −46 | 67 | −82 | 90 | } |
| { | 11 | −33 | 52 | −69 | 81 | −88 | 91 | −87 | 79 | −65 | 48 | −28 | 7 | 15 | −37 | 56 | } |
| { | 9 | −25 | 43 | −57 | 70 | −80 | 87 | −90 | 90 | −87 | 80 | −70 | 57 | −43 | 25 | −9 | } |
| { | 7 | −20 | 33 | −44 | 56 | −65 | 73 | −81 | 86 | −90 | 91 | −90 | 87 | −83 | 77 | −69 | } |
| { | 4 | −13 | 22 | −31 | 38 | −46 | 54 | −61 | 67 | −73 | 78 | −82 | 85 | −88 | 90 | −90 | } |
| { | 2 | −7 | 11 | −15 | 20 | −24 | 28 | −33 | 37 | −41 | 44 | −48 | 52 | −56 | 59 | −62 | } |

},

TABLE 41 transMatrixCol16to31=

{
| { | 64 | 64 | 64 | 64 | 64 | 64 | 64 | 64 | 64 | 64 | 64 | 64 | 64 | 64 | 64 | 64 | } |
|---|---|---|---|---|---|---|---|---|---|---|---|---|---|---|---|---|---|
| { | 62 | 59 | 56 | 52 | 48 | 44 | 41 | 37 | 33 | 28 | 24 | 20 | 15 | 11 | 7 | 2 | } |
| { | −4 | −13 | −22 | −31 | −38 | −46 | −54 | −61 | −67 | −73 | −78 | −82 | 85 | 88 | −90 | −90 | } |

TABLE 41-continued transMatrixCol16to31=

| | | | | | | | | | | | | | | | |
|---|---|---|---|---|---|---|---|---|---|---|---|---|---|---|---|
| { −69 | −77 | −83 | −87 | −90 | −91 | −90 | −86 | −81 | −73 | −65 | −56 | −44 | −33 | −20 | −7 } |
| { 90 | 87 | 80 | 70 | 57 | 43 | 25 | 9 | 9 | 25 | 43 | 57 | 70 | 80 | 87 | 90 } |
| { −56 | −37 | −15 | 7 | 28 | 48 | 65 | 79 | 87 | 91 | 88 | 81 | 69 | 52 | 33 | 11 } |
| { 13 | 38 | 61 | 78 | 88 | 90 | 85 | 73 | 54 | 31 | 4 | −22 | −46 | −67 | −82 | 90 } |
| { 73 | 87 | 90 | 83 | 65 | 41 | 11 | −20 | −48 | −71 | −86 | −91 | −84 | −69 | −44 | −15 } |
| { 89 | 75 | 50 | 18 | −18 | −50 | −75 | −89 | −89 | −75 | −50 | −18 | 113 | 50 | 75 | 89 } |
| { 48 | 11 | −28 | −62 | −84 | −90 | −79 | −52 | −15 | 24 | 59 | 83 | 91 | 81 | 56 | 20 } |
| { −22 | −61 | −85 | −90 | −73 | −38 | 4 | 46 | 78 | 90 | 82 | 54 | 13 | −31 | −67 | −88 } |
| { −79 | −91 | −77 | −41 | 7 | 52 | 83 | 90 | 71 | 33 | −15 | −59 | −86 | −88 | −65 | −24 } |
| { −87 | −57 | −9 | 43 | 80 | 90 | 70 | 25 | −25 | −70 | −90 | −80 | −43 | 9 | 57 | 87 } |
| { −41 | 15 | 65 | 90 | 79 | 37 | −20 | −69 | −90 | −77 | −33 | 24 | 71 | 91 | 73 | 28 } |
| { 31 | 78 | 90 | 61 | 4 | −54 | −88 | −82 | −38 | 22 | 73 | 90 | 67 | 13 | −46 | −85 } |
| { 83 | 86 | 44 | −20 | −73 | −90 | −59 | 2 | 62 | 90 | 71 | 15 | −48 | −87 | −81 | −33 } |
| { 83 | 36 | −36 | −83 | −83 | −36 | 36 | 83 | 83 | 36 | −36 | −83 | −83 | −36 | 36 | 83 } |
| { 31 | −4 | −87 | −77 | −15 | 56 | 90 | 65 | −2 | −69 | −90 | −52 | 20 | 79 | 86 | 37 } |
| { −38 | −88 | −73 | −4 | 67 | 90 | 46 | −31 | −85 | −78 | −13 | 61 | 90 | 54 | −22 | −82 } |
| { −86 | −73 | −2 | 71 | 87 | 33 | −48 | −90 | −59 | 20 | 83 | 79 | 11 | −65 | −90 | −41 } |
| { −80 | −9 | 70 | 87 | 25 | −57 | −90 | −43 | 43 | 90 | 57 | −25 | −87 | −70 | 9 | 80 } |
| { −24 | 62 | 88 | 28 | −59 | −90 | −33 | 56 | 90 | 37 | −52 | −90 | −41 | 48 | 91 | 44 } |
| { 46 | 90 | 38 | −54 | −90 | −31 | 61 | 88 | 22 | −67 | −85 | −13 | 73 | 82 | 4 | −78 } |
| { 88 | 56 | −41 | −91 | −37 | 59 | 87 | 15 | −73 | −79 | 7 | 84 | 65 | −28 | −90 | −48 } |
| { 75 | −18 | −89 | −50 | 50 | 89 | 18 | −75 | −75 | 18 | 89 | 50 | −50 | −89 | −18 | 75 } |
| { 15 | −79 | −69 | 33 | 91 | 28 | −71 | −77 | 20 | 90 | 41 | −62 | −83 | 7 | 87 | 52 } |
| { −54 | −85 | 4 | 88 | 46 | −61 | −52 | 13 | 90 | 38 | −67 | −78 | 22 | 90 | 31 | −73 } |
| { −90 | −33 | 73 | 69 | −41 | −88 | −2 | 87 | 44 | −65 | −77 | 28 | 90 | 15 | −83 | −56 } |
| { −70 | 43 | 87 | −9 | −90 | −25 | 80 | 57 | −57 | −80 | 25 | 90 | 9 | −87 | −43 | 70 } |
| { −7 | 88 | 33 | −79 | −56 | 62 | 73 | −41 | −86 | 15 | 91 | 11 | −87 | −37 | 77 | 59 } |
| { 61 | 73 | −46 | −82 | 31 | 88 | −13 | −90 | −4 | 90 | 22 | −85 | −38 | 78 | 54 | −67 } |
| { 91 | 7 | −90 | −15 | 88 | 24 | −86 | −33 | 83 | 41 | −79 | −48 | 73 | 56 | −69 | −62 } |
| { 64 | 64 | 64 | 64 | 64 | 64 | 64 | 64 | 64 | 64 | 64 | 64 | 64 | 64 | 64 | 64 } |
| { −2 | −90 | 11 | 90 | −20 | −87 | 28 | 84 | −37 | −81 | 44 | 77 | −52 | −71 | 59 | 65 } |
| { −67 | −54 | 78 | 38 | −85 | −22 | 90 | 4 | −90 | 13 | 88 | −31 | −82 | 46 | 73 | −61 } |
| { −90 | 20 | 84 | −44 | −71 | 65 | 52 | −81 | −28 | 90 | 2 | −90 | 24 | 83 | −48 | −69 } |
| { −57 | 80 | 25 | −90 | 9 | 87 | −43 | −70 | 70 | 43 | −87 | −9 | 90 | −25 | −80 | 57 } |
| { 11 | 84 | −52 | −59 | 81 | 20 | −91 | 24 | 79 | −62 | −48 | 86 | 7 | −90 | 37 | 71 } |
| { 79 | 31 | −90 | 22 | 78 | −67 | −38 | 90 | −13 | −82 | 61 | 46 | −88 | 4 | 85 | −54 } |
| { 90 | −44 | −59 | 85 | 2 | −86 | 56 | 48 | −88 | 11 | 81 | −65 | −37 | 90 | −24 | −73 } |
| { 50 | −89 | 18 | 75 | −75 | −18 | 89 | −50 | −50 | 89 | −18 | −75 | 75 | 18 | −89 | 50 } |
| { −20 | −71 | 81 | 2 | −83 | 69 | 24 | −90 | 52 | 44 | −90 | 33 | 62 | −86 | 11 | 77 } |
| { −78 | −4 | 82 | −73 | −13 | 85 | −67 | −22 | 88 | −61 | −31 | 90 | −54 | −38 | 90 | −46 } |
| { −87 | 65 | 20 | −86 | 69 | 15 | −84 | 71 | 77 | −83 | 73 | 7 | −81 | 77 | 2 | −79 } |
| { −43 | 90 | −57 | −25 | 87 | −70 | −9 | 80 | −80 | 9 | 70 | −87 | 25 | 57 | −90 | 43 } |
| { 28 | 52 | −91 | 56 | 24 | −84 | 77 | −7 | −69 | 88 | −37 | −44 | 90 | −62 | −15 | 81 } |
| { 82 | −22 | −54 | 90 | −61 | −13 | 78 | −85 | 31 | 46 | −90 | 67 | 4 | −73 | 88 | −38 } |
| { 84 | −81 | 24 | 48 | −90 | 71 | −7 | −62 | 91 | −59 | −11 | 73 | −88 | 44 | 28 | −83 } |
| { 36 | −83 | 83 | −36 | −36 | 83 | −83 | 36 | 36 | −83 | 83 | −36 | −36 | 83 | −83 | 36 } |
| { −37 | −28 | 79 | −88 | 52 | 11 | −69 | 91 | −65 | 7 | 56 | −90 | 77 | −24 | −41 | 84 } |
| { −85 | 46 | 13 | −67 | 90 | −73 | 22 | 38 | −82 | 88 | −54 | −4 | 61 | −90 | 78 | −31 } |
| { −81 | 90 | −62 | 11 | 44 | −83 | 88 | −59 | 7 | 48 | −84 | 87 | −56 | 2 | 52 | −86 } |
| { −25 | 70 | −90 | 80 | −43 | −9 | 57 | −87 | 87 | −57 | 9 | 43 | −80 | 90 | −70 | 25 } |
| { 44 | 2 | −48 | 81 | −90 | 73 | −37 | −11 | 56 | −84 | 90 | −69 | 28 | 20 | −62 | 87 } |
| { 88 | −67 | 31 | 13 | −54 | 82 | −90 | 78 | −46 | 4 | 38 | −73 | 90 | −85 | 61 | −22 } |
| { 77 | −90 | 86 | −65 | 33 | 7 | −44 | 73 | −90 | 87 | −69 | 37 | 2 | −41 | 71 | −88 } |
| { 18 | −50 | 75 | −89 | 89 | −75 | 50 | −18 | −18 | 50 | −75 | 89 | −89 | 75 | −50 | 18 } |
| { −52 | 24 | 7 | −37 | 62 | −81 | 90 | −88 | 77 | −56 | 28 | 2 | −33 | 59 | −79 | 90 } |
| { −90 | 82 | −67 | 46 | −22 | −4 | 31 | −54 | 73 | −85 | 90 | −88 | 78 | −61 | 38 | −13 } |
| { −71 | 83 | −90 | 90 | −86 | 77 | −62 | 44 | −24 | 2 | 20 | −41 | 59 | −73 | 84 | −90 } |
| { −9 | 25 | −43 | 57 | −70 | 80 | −87 | 90 | −90 | 87 | −80 | 70 | −57 | 43 | −25 | 9 } |
| { 59 | −48 | 37 | −24 | 11 | 2 | −15 | 28 | −41 | 52 | −62 | 71 | −79 | 84 | −88 | 90 } |
| { 90 | −90 | 88 | −85 | 82 | −78 | 73 | −67 | 61 | −54 | 46 | −38 | 31 | −22 | 13 | −4 } |
| { 65 | −69 | 71 | −73 | 77 | −79 | 81 | −83 | 84 | −86 | 87 | −88 | 90 | −90 | 90 | −91 } |
| }, | | | | | | | | | | | | | | | | transMatrix[*m*][*n*]=(*n* & 1?−1:1)*
 transMatrixCol16to31[47−*m*][*n*] with *m*=32 . . . 47,*n*=0 . . . 63   [Equation 83]

transMatrix[*m*][*n*]=(*n* & 1?−1:1)*
 transMatrixCol0to15[63−*m*][*n*] with *m*=48 . . . 63,*n*=0 . . . 63   [Equation 84]

If not, when trType is 1 and nTbS is 4, Table 42 below is applied.

TABLE 42 transMatrix[ m ][ n ]=

| | | | |
|---|---|---|---|
| { | | | |
| { 29 | 55 | 74 | 84 } |
| { 74 | 74 | 0 | −74 } |
| { 84 | −29 | −74 | 55 } |
| { 55 | −84 | 74 | −29 } |
| }, | | | |

If not, when trType is 1 and nTbS is 8, Table 43 below is applied.

TABLE 43 transMatrix[ m ][ n ]=

{
{   17    32    46    60    71    78    85    86 }
{   46    78    86    71    32    17   -60   -85 }
{   71    85    32   -46   -86   -60    17    78 }
{   85    46   -60   -78    17    86    32   -71 }
{   86   -17   -85    32    78   -46   -71    60 }
{   78   -71   -17    85   -60   -32    86   -46 }
{   60   -86    71   -17   -46    85   -78    32 }
{   32   -60    78   -86    85   -71    46   -17 }
},

If not, when trType is 2 and nTbS is 4, Table 44 below is applied.

TABLE 44 transMatrix[ m ][ n ]=

{
{   84    74    55    29 }
{   74     0   -74   -74 }
{   55   -74   -29    84 }
{   29   -74    84   -55 }
},

If not, when trType is 2 and nTbS is 8, Table 45 below is applied.

TABLE 45 transMatrix[ m ][ n ]=

{
{   86    85    78    71    60    46    32    17 }
{   85    60    17   -32   -71   -86   -78   -46 }
{   78    17   -60   -86   -46    32    85    71 }
{   71   -32   -86   -17    78    60   -46   -85 }
{   60   -71   -46    78    32   -85    17    86 }
{   46    86    32    60    85    17    71   -78 }
{   32   -78    85    46    17    71    86    60 }
{   17   -46    71   -85    86   -78    60   -32 }
},

The decoding device 200 and the encoding device 100 to which the disclosure is applied may be included in a digital device. The digital devices encompass all kinds or types of digital devices capable of performing at least one of transmission, reception, processing, and output of, e.g., data, content, or services. Processing data, content, or services by a digital device includes encoding and/or decoding the data, content, or services. Such a digital device may be paired or connected with other digital device or an external server via a wired/wireless network, transmitting or receiving data or, as necessary, converting data.

The digital devices may include, e.g., network TVs, hybrid broadcast broadband TVs, smart TVs, internet protocol televisions (IPTVs), personal computers, or other standing devices or mobile or handheld devices, such as personal digital assistants (PDAs), smartphones, tablet PCs, or laptop computers.

As used herein, "wired/wireless network" collectively refers to communication networks supporting various communication standards or protocols for data communication and/or mutual connection between digital devices or between a digital device and an external server. Such wired/wireless networks may include communication networks currently supported or to be supported in the future and communication protocols for such communication networks and may be formed by, e.g., communication standards for wired connection, including USB (Universal Serial Bus), CVBS (Composite Video Banking Sync), component, S-video (analog), DVI (Digital Visual Interface), HDMI (High Definition Multimedia Interface), RGB, or D-SUB and communication standards for wireless connection, including Bluetooth, RFID (Radio Frequency Identification), IrDA (infrared Data Association), UWB (Ultra-Wideband), ZigBee, DLNA (Digital Living Network Alliance), WLAN (Wireless LAN) (Wi-Fi), Wibro (Wireless broadband), Wimax (World Interoperability for Microwave Access), HSDPA (High Speed Downlink Packet Access), LTE (Long Term Evolution), or Wi-Fi Direct.

Hereinafter, when simply referred to as a digital device in the disclosure, it may mean either or both a stationary device or/and a mobile device depending on the context.

Meanwhile, the digital device is an intelligent device that supports, e.g., broadcast reception, computer functions, and at least one external input, and may support, e.g., e-mail, web browsing, banking, games, or applications via the above-described wired/wireless network. Further, the digital device may include an interface for supporting at least one input or control means (hereinafter, input means), such as a handwriting input device, a touch screen, and a spatial remote control. The digital device may use a standardized general-purpose operating system (OS). For example, the digital device may add, delete, amend, and update various applications on general-purpose OS kernel, thereby configuring and providing a user-friendlier environment.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

INDUSTRIAL APPLICABILITY

Hereinabove, the preferred embodiments of the present disclosure are disclosed for an illustrative purpose and hereinafter, modifications, changes, substitutions, or additions of various other embodiments will be made within the technical spirit and the technical scope of the present disclosure disclosed in the appended claims by those skilled in the art.

The invention claimed is:

1. A method for processing a video signal by using a transform, the method comprising:
acquiring a transform index related to one of a plurality of transform combinations including combinations of one or more transform kernels for transforming of a current block of the video signal;
deriving a transform combination including a horizontal transform and a vertical transform related to the transform index; and
applying each of the vertical transform and the horizontal transform to the current block,
wherein the transform kernels include Discrete Sine Transform Type-7 (DST-7) or Discrete Cosine Transform Type-8 (DCT-8),
wherein the DST-7 or DCT-8 is designed based on a discrete Fourier transform (DFT) to which a scale value in a form of a power of 2 related to a bit length of a transform coefficient is applied,
wherein a coefficient of the DFT to which the scale value is applied is approximated by a shift operation based on the scale value,
wherein when a width of the current block is N, the DST-7 or DCT-8 is derived based on a 2N+1 point DFT, and
wherein when the width of the current block is 16, the DST-7 or DCT-8 is derived based on a 33 point DFT, and the 33-point DFT includes a 3-point 2D DFT as a first stage DFT and a 11-point 2D DFT as a second stage DFT.

2. The method of claim 1, wherein the applying of each of the vertical transform and the horizontal transform of the transform combination to the current block includes
generating a preprocessed vector generated through a first permutation of an input vector including coefficients of the current block arranged in a row or column direction,
applying a first stage DFT applied to some coefficients of the preprocessed vector to the preprocessed vector at a plurality of times,
applying a second stage DFT, applied to some coefficients of an intermediate vector to which the first stage DFT is applied, to the intermediate vector to which the first stage DFT is applied at a plurality of times, and
generating a postprocessed vector through a second permutation for a vector to which the second stage DFT is applied.

3. The method of claim 2, wherein
the first stage DFT or the second stage DFT includes a first type DFT outputting, from first input data having a first length, first output data having the first length and a second DFT outputting, from second input data having a second length different from the first length, second output data having the second length.

4. The method of claim 1, wherein when a size of the current block is 32×32, the DST-7 or DCT-8 is derived based on a 65-point DFT, and
the 65-point DFT includes a 5-point 2D DFT as a first stage DFT and a 13-point 2D DFT as a second stage DFT.

5. A device for processing a video signal by using a transform, the device comprising:
a memory storing the video signal; and
a processor connected to the memory,
wherein the processor is configured to
acquire a transform index related to one of a plurality of transform combinations including combinations of one or more transform kernels for transforming of a current block of the video signal,
derive a transform combination including a horizontal transform and a vertical transform related to the transform index, and
apply each of the vertical transform and the horizontal transform of the transform combination to the current block,
wherein the transform kernels include Discrete Sine Transform Type-7 (DST-7) or Discrete Cosine Transform Type-8 (DCT-8),
wherein the DST-7 or DCT-8 is designed based on a discrete Fourier transform (DFT) to which a scale value in a form of a power of 2 related to a bit length of a transform coefficient is applied,
wherein a coefficient of the DFT to which the scale value is applied is approximated by a shift operation based on the scale value,
wherein when a width of the current block is N, the DST-7 or DCT-8 is derived based on a 2N+1 point DFT, and
wherein when the width of the current block is 16, the DST-7 or DCT-8 is derived based on a 33 point DFT, and the 33-point DFT includes a 3-point 2D DFT as a first stage DFT and a 11-point 2D DFT as a second stage DFT.

6. The device of claim 5, wherein the processor is configured to
generate a preprocessed vector generated through a first permutation of an input vector including coefficients of the current block arranged in a row or column direction,
apply a first stage DFT applied to some coefficients of the preprocessed vector to the preprocessed vector at a plurality of times,
apply a second stage DFT, applied to some coefficients of an intermediate vector to which the first stage DFT is applied, to the intermediate vector to which the first stage DFT is applied at a plurality of times, and
generate a postprocessed vector through a second permutation for a transform vector to which the second stage DFT is applied.

7. The device of claim 6, wherein the first stage DFT or the second stage DFT includes a first type DFT outputting, from first input data having a first length, first output data having the first length and a second DFT outputting, from second input data having a second length different from the first length, second output data having the second length.

8. The device of claim 5, wherein when the width of the current block is 32, the DST-7 or DCT-8 is derived based on a 65-point DFT, and
the 65-point DFT includes a 5-point 2D DFT as a first stage DFT and a 13-point 2D DFT as a second stage DFT.

9. A method for encoding a video signal by using a transform, the method comprising:
determining a plurality of transform combinations including combinations of one or more transform kernels for transforming of a current block of the video signal, the transform combinations including a horizontal transform and a vertical transform;
applying each of the vertical transform and the horizontal transform to the current block by using each of the plurality of transform combinations;
determining one of the plurality of transform combinations based on rate-distortion cost; and
generating a transform index related to the determined one of the plurality of transform combinations,
wherein the transform kernels include Discrete Sine Transform Type-7 (DST-7) or Discrete Cosine Transform Type-8 (DCT-8), wherein the DST-7 or DCT-8 is designed based on a discrete Fourier transform (DFT) to which a scale value in a form of a power of 2 related to a bit length of a transform coefficient is applied, wherein a coefficient of the DFT to which the scale value is applied is approximated by a shift operation based on the scale value, wherein when a width of the current block is N, the DST-7 or DCT-8 is derived based on a 2N+1 point DFT, and wherein when the width of the current block is 16, the DST-7 or DCT-8 is derived based on a 33 point DFT, and the 33-point DFT includes a 3-point 2D DFT as a first stage DFT and a 11-point 2D DFT as a second stage DFT.

10. The method of claim 9, wherein the applying of each of the vertical transform and the horizontal transform of the transform combination to the current block includes generating a preprocessed vector generated through a first permutation of an input vector including coefficients of the current block arranged in a row or column direction, applying a first stage DFT applied to some coefficients of the preprocessed vector to the preprocessed vector at a plurality of times, applying a second stage DFT, applied to some coefficients of an intermediate vector to which the first stage DFT is applied, to the intermediate vector to which the first stage DFT is applied at a plurality of times, and generating a postprocessed vector through a second permutation for a vector to which the second stage DFT is applied.

11. The method of claim 10, wherein the first stage DFT or the second stage DFT includes a first type DFT outputting, from first input data having a first length, first output data having the first length and a second DFT outputting, from second input data having a second length different from the first length, second output data having the second length.

12. The method of claim 9, wherein when a size of the current block is 32×32, the DST-7 or DCT-8 is derived based on a 65-point DFT, and the 65-point DFT includes a 5-point 2D DFT as a first stage DFT and a 13-point 2D DFT as a second stage DFT.

* * * * *